(12) United States Patent
Jung et al.

(10) Patent No.: US 10,514,816 B2
(45) Date of Patent: *Dec. 24, 2019

(54) ENHANCED USER ASSISTANCE

(75) Inventors: Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 1193 days.

This patent is subject to a terminal disclaimer.

(21) Appl. No.: 11/000,736

(22) Filed: Dec. 1, 2004

(65) Prior Publication Data

US 2006/0116979 A1    Jun. 1, 2006

(51) Int. Cl.
*G06F 9/451* (2018.01)
*G06F 3/0489* (2013.01)
*G06F 3/0481* (2013.01)

(52) U.S. Cl.
CPC ........ *G06F 3/0481* (2013.01); *G06F 3/04895* (2013.01); *G06F 9/453* (2018.02)

(58) Field of Classification Search
CPC .. G06F 9/4446; G06F 3/0481; G06F 3/04895; G06F 9/453
USPC .................. 715/705, 715, 713, 810
See application file for complete search history.

(56) References Cited

U.S. PATENT DOCUMENTS

| | | |
|---|---|---|
| 4,007,469 A | 2/1977 | Land et al. |
| 4,922,443 A | 5/1990 | Coetsier et al. |
| 5,023,934 A | 6/1991 | Wheeless |
| 5,146,557 A | 9/1992 | Yamrom et al. |
| 5,179,653 A * | 1/1993 | Fuller ............... G06F 3/0482 715/840 |
| 5,222,127 A | 6/1993 | Fukui |
| 5,247,575 A | 9/1993 | Sprague et al. |
| 5,282,061 A | 1/1994 | Farrell |
| 5,287,102 A | 2/1994 | McKiel, Jr. |
| 5,287,448 A | 2/1994 | Nicol et al. |
| 5,303,393 A | 4/1994 | Noreen et al. |
| 5,311,434 A | 5/1994 | Tamai |
| 5,388,251 A | 2/1995 | Makino et al. |
| 5,404,295 A | 4/1995 | Katz et al. |
| 5,410,326 A | 4/1995 | Goldstein |
| 5,442,759 A | 8/1995 | Chiang et al. |
| 5,452,222 A * | 9/1995 | Gray ............... G09B 23/183 376/156 |

(Continued)

FOREIGN PATENT DOCUMENTS

EP    2 708 850 A1    3/2014
GB    2 501 075 A    10/2013

(Continued)

OTHER PUBLICATIONS photo.net, "How to prevent condensation in camera/lens? What cause it?", https://www.photo.net/discuss/threads/how-to-prevent-condensation-in-camera-lens-what-cause-it.77624/, dated Nov. 2, 2003, printout pp. 1-2.*

(Continued)

*Primary Examiner* — Amy Ng
*Assistant Examiner* — William Wong
(74) *Attorney, Agent, or Firm* — Winston & Strawn LLP

(57) ABSTRACT

An apparatus, method, and system distinct from an item that provides user assistance for the item.

36 Claims, 42 Drawing Sheets

(56) References Cited

U.S. PATENT DOCUMENTS

| | | |
|---|---|---|
| 5,475,835 A | 12/1995 | Hickey |
| 5,524,140 A | 6/1996 | Klausner et al. |
| 5,561,705 A | 10/1996 | Allard et al. |
| 5,568,536 A | 10/1996 | Tiller et al. |
| 5,572,576 A | 11/1996 | Klausner et al. |
| 5,612,669 A | 3/1997 | Allen et al. |
| 5,648,897 A | 7/1997 | Johnson et al. |
| 5,654,688 A | 8/1997 | Allen et al. |
| 5,663,704 A | 9/1997 | Allen et al. |
| 5,729,191 A | 3/1998 | Allen et al. |
| 5,802,467 A | 9/1998 | Salazar et al. |
| 5,802,492 A | 9/1998 | DeLorme et al. |
| 5,805,672 A | 9/1998 | Barkat et al. |
| 5,812,977 A | 9/1998 | Douglas |
| 5,818,329 A | 10/1998 | Allen |
| 5,825,355 A * | 10/1998 | Palmer et al. .............. 715/712 |
| 5,877,757 A | 3/1999 | Baldwin et al. |
| 5,887,171 A | 3/1999 | Tada et al. |
| 5,890,905 A | 4/1999 | Bergman |
| 5,898,400 A | 4/1999 | Jones et al. |
| 5,910,800 A | 6/1999 | Shields et al. |
| 5,920,697 A | 7/1999 | Masters et al. |
| 5,923,325 A | 7/1999 | Barber et al. |
| 5,933,139 A * | 8/1999 | Feigner .............. G06F 9/4446 |
| | | 715/708 |
| 5,936,611 A | 8/1999 | Yoshida |
| 5,938,721 A | 8/1999 | Dussell et al. |
| 5,940,007 A | 8/1999 | Brinkmeyer et al. |
| 5,965,858 A | 10/1999 | Suzuki et al. |
| 5,982,277 A | 11/1999 | Flick |
| 5,985,858 A | 11/1999 | Miyata et al. |
| 5,991,739 A | 11/1999 | Cupps et al. |
| 6,005,299 A * | 12/1999 | Hengst .............. G01C 21/3664 |
| | | 200/519 |
| 6,005,613 A | 12/1999 | Endsley et al. |
| 6,021,403 A | 2/2000 | Horvitz et al. |
| 6,068,485 A | 5/2000 | Linebarger et al. |
| 6,083,104 A | 7/2000 | Choi |
| 6,107,938 A | 8/2000 | Du et al. |
| 6,112,181 A | 8/2000 | Shear et al. |
| 6,130,606 A | 10/2000 | Flick |
| 6,160,926 A * | 12/2000 | Dow .............. G06F 9/4446 |
| | | 382/313 |
| 6,167,255 A * | 12/2000 | Kennedy et al. .......... 455/414.1 |
| 6,169,902 B1 | 1/2001 | Kawamoto |
| 6,182,006 B1 | 1/2001 | Meek |
| 6,184,780 B1 | 2/2001 | Allen et al. |
| 6,230,170 B1 | 5/2001 | Zellweger et al. |
| 6,253,058 B1 | 6/2001 | Murasaki et al. |
| 6,256,378 B1 | 7/2001 | Iggulden et al. |
| 6,259,362 B1 | 7/2001 | Lin |
| 6,259,409 B1 | 7/2001 | Fulton et al. |
| 6,271,835 B1 | 8/2001 | Hoeksma |
| 6,308,120 B1 | 10/2001 | Good |
| 6,321,158 B1 | 11/2001 | DeLorme et al. |
| 6,344,793 B1 | 2/2002 | Geck et al. |
| 6,366,198 B1 | 4/2002 | Allen et al. |
| 6,377,825 B1 | 4/2002 | Kennedy et al. |
| 6,385,541 B1 | 5/2002 | Blumberg et al. |
| 6,462,660 B1 | 10/2002 | Cannon et al. |
| 6,463,343 B1 | 10/2002 | Emens et al. |
| 6,466,899 B1 | 10/2002 | Yano et al. |
| 6,480,098 B2 | 11/2002 | Flick |
| 6,490,493 B1 | 12/2002 | Dharnipragada |
| 6,526,355 B1 | 2/2003 | Ni et al. |
| 6,542,163 B2 | 4/2003 | Gorbet et al. |
| 6,542,814 B2 | 4/2003 | Polidi et al. |
| 6,556,899 B1 | 4/2003 | Harvey et al. |
| 6,584,496 B1 | 6/2003 | Ludtke |
| 6,608,650 B1 * | 8/2003 | Torres .............. H04N 5/232 |
| | | 348/231.3 |
| 6,611,739 B1 | 8/2003 | Harvey et al. |
| 6,628,233 B2 | 9/2003 | Knockeart et al. |
| 6,639,550 B2 | 10/2003 | Knockeart et al. |
| 6,647,328 B2 | 11/2003 | Walker |
| 6,650,902 B1 | 11/2003 | Richton |
| 6,651,053 B1 | 11/2003 | Rothschild |
| 6,664,924 B2 | 12/2003 | Knockeart et al. |
| 6,680,694 B1 | 1/2004 | Knockeart et al. |
| 6,681,174 B1 | 1/2004 | Harvey et al. |
| 6,707,421 B1 | 3/2004 | Drury et al. |
| 6,711,474 B1 | 3/2004 | Treyz et al. |
| 6,727,830 B2 | 4/2004 | Lui et al. |
| 6,784,832 B2 | 8/2004 | Knockeart et al. |
| 6,788,313 B1 | 9/2004 | Heil |
| 6,795,011 B1 | 9/2004 | Berthoud et al. |
| 6,799,205 B2 | 9/2004 | Ludtke |
| 6,812,888 B2 | 11/2004 | Drury et al. |
| 6,816,881 B1 | 11/2004 | Mohindra et al. |
| 6,819,986 B2 | 11/2004 | Hong et al. |
| 6,823,188 B1 | 11/2004 | Stern |
| 6,829,668 B2 | 12/2004 | Keskar et al. |
| 6,832,092 B1 | 12/2004 | Suarez et al. |
| 6,845,486 B2 | 1/2005 | Yamada et al. |
| 6,873,840 B1 | 3/2005 | Von Alten |
| 6,874,037 B1 | 3/2005 | Abram et al. |
| 6,879,828 B2 | 4/2005 | Virtanen et al. |
| 6,882,712 B1 | 4/2005 | Iggulden et al. |
| 6,892,936 B2 | 5/2005 | Riggert et al. .............. 235/375 |
| 6,904,565 B1 | 6/2005 | Lentz |
| 6,909,398 B2 | 6/2005 | Knockeart et al. |
| 6,919,792 B1 | 7/2005 | Battini et al. |
| 6,920,612 B2 * | 7/2005 | Makinen .............. 715/705 |
| 6,967,576 B2 | 11/2005 | Hayes et al. |
| 6,968,272 B2 | 11/2005 | Knockeart et al. |
| 6,970,783 B2 | 11/2005 | Knockeart et al. |
| 6,980,092 B2 | 12/2005 | Turnbull et al. |
| 7,023,379 B2 | 4/2006 | Turnbull |
| 7,036,076 B2 | 4/2006 | Anwar |
| 7,043,691 B1 | 5/2006 | Kwon et al. |
| 7,055,737 B1 | 6/2006 | Tobin et al. |
| 7,065,348 B1 | 6/2006 | Aoki |
| 7,068,163 B2 | 6/2006 | Sari et al. |
| 7,082,365 B2 | 7/2006 | Sheha et al. |
| 7,103,556 B2 | 9/2006 | Del Rey et al. |
| 7,107,081 B1 | 9/2006 | Fujisaki |
| 7,129,927 B2 | 10/2006 | Mattsson |
| 7,135,962 B2 | 11/2006 | Durbin et al. |
| 7,142,096 B2 | 11/2006 | Eisenman |
| 7,155,674 B2 | 12/2006 | Breen et al. |
| 7,158,006 B2 | 1/2007 | Lee et al. |
| 7,200,801 B2 | 4/2007 | Agassi et al. |
| 7,202,783 B2 | 4/2007 | Want et al. |
| 7,212,827 B1 | 5/2007 | Vesschl |
| 7,224,262 B2 | 5/2007 | Simon et al. |
| 7,231,496 B2 | 6/2007 | Curtis |
| 7,240,067 B2 | 7/2007 | Timmons |
| 7,245,258 B2 | 7/2007 | Velhal et al. |
| 7,254,779 B1 | 8/2007 | Rezvani et al. |
| 7,259,357 B2 | 8/2007 | Walker |
| 7,277,884 B2 | 10/2007 | Vadai et al. |
| 7,286,857 B1 | 10/2007 | Walker et al. |
| 7,293,034 B2 | 11/2007 | Paya et al. |
| 7,312,712 B1 | 12/2007 | Worrall |
| 7,327,226 B2 | 2/2008 | Turnbull et al. |
| 7,332,998 B2 | 2/2008 | Beehler et al. |
| 7,346,015 B2 | 3/2008 | Shipman |
| 7,446,655 B2 | 11/2008 | Jha et al. |
| 7,457,628 B2 | 11/2008 | Blumberg et al. |
| 7,490,763 B2 | 2/2009 | Keohane et al. |
| 7,548,697 B2 | 6/2009 | Hudson et al. |
| 7,643,913 B2 | 1/2010 | Taki et al. |
| 7,664,736 B2 | 2/2010 | Jung et al. |
| 7,684,321 B2 | 3/2010 | Muirhead et al. |
| 7,694,881 B2 | 4/2010 | Jung et al. |
| 7,725,077 B2 | 5/2010 | Jung et al. |
| 7,798,401 B2 | 9/2010 | Jung et al. |
| 7,840,427 B2 | 11/2010 | O'Sullivan |
| 7,876,706 B2 | 1/2011 | Ekl et al. |
| 7,899,468 B2 | 3/2011 | Lohtia et al. |
| 7,922,086 B2 | 4/2011 | Jung et al. |
| 7,957,871 B1 | 6/2011 | Echeruo |
| 8,009,121 B1 | 8/2011 | Stuart et al. |
| 8,046,004 B2 | 10/2011 | Tsuchiya |

(56) References Cited

U.S. PATENT DOCUMENTS

| | | |
|---|---|---|
| 8,126,400 B2 | 2/2012 | Jung et al. |
| 8,180,293 B2 | 5/2012 | Jung et al. |
| 8,271,876 B2 | 9/2012 | Brugler et al. |
| 8,282,003 B2 | 10/2012 | Jung et al. |
| 8,284,034 B2 | 10/2012 | Stewart et al. |
| 8,358,976 B2 | 1/2013 | Jung et al. |
| 8,406,791 B1 | 3/2013 | Daily et al. |
| 8,504,090 B2 | 8/2013 | Klein et al. |
| 8,538,331 B2 | 9/2013 | Jung et al. |
| 8,626,366 B2 | 1/2014 | Noffsinger et al. |
| 8,660,498 B2 | 2/2014 | Gurney et al. |
| 8,688,532 B2 | 4/2014 | Khunger et al. |
| 8,712,857 B1 | 4/2014 | Adornato et al. |
| 8,762,839 B2 | 6/2014 | Jung et al. |
| 8,775,070 B1 | 7/2014 | Bhatia |
| 8,831,677 B2 | 9/2014 | Villa-Real |
| 9,038,899 B2 | 5/2015 | Jung et al. |
| 9,307,577 B2 | 4/2016 | Jung et al. |
| 9,483,744 B2 | 11/2016 | Lord et al. |
| 9,488,484 B2 | 11/2016 | Lord et al. |
| 9,552,559 B2 | 1/2017 | Lord et al. |
| 9,569,740 B2 | 2/2017 | Lord et al. |
| 9,599,481 B2 | 3/2017 | Lord et al. |
| 9,621,701 B2 | 4/2017 | Jung et al. |
| 9,671,239 B2 | 6/2017 | Lord et al. |
| 9,689,694 B2 | 6/2017 | Lord et al. |
| 9,715,667 B2 | 7/2017 | Lord et al. |
| 9,767,423 B2 | 9/2017 | Lord et al. |
| 9,886,671 B2 | 2/2018 | Lord et al. |
| 9,939,279 B2 | 4/2018 | Pan et al. |
| 9,946,978 B2 | 4/2018 | Francis |
| 9,959,512 B2 | 5/2018 | Camp et al. |
| 2001/0025558 A1 | 10/2001 | Ishida |
| 2001/0049277 A1 | 12/2001 | Meyer et al. |
| 2001/0050611 A1 | 12/2001 | Achterholt |
| 2001/0052858 A1 | 12/2001 | Vincent et al. |
| 2001/0055976 A1 | 12/2001 | Crouch et al. |
| 2002/0002552 A1 | 1/2002 | Schultz et al. |
| 2002/0004703 A1 | 1/2002 | Gaspard |
| 2002/0007225 A1 | 1/2002 | Costello et al. .............. 700/99 |
| 2002/0019881 A1 | 2/2002 | Bokhari et al. |
| 2002/0021288 A1 | 2/2002 | Schug |
| 2002/0022961 A1 | 2/2002 | Sepanaho |
| 2002/0023144 A1 | 2/2002 | Linyard et al. |
| 2002/0032497 A1 | 3/2002 | Jorgenson et al. |
| 2002/0032510 A1 | 3/2002 | Turnbull et al. |
| 2002/0038348 A1 | 3/2002 | Malone et al. |
| 2002/0062280 A1 | 5/2002 | Zachariassen et al. |
| 2002/0069030 A1 | 6/2002 | Xydis |
| 2002/0072347 A1 | 6/2002 | Dunko et al. |
| 2002/0075243 A1 | 6/2002 | Newton |
| 2002/0083025 A1 | 6/2002 | Robarts et al. |
| 2002/0084893 A1 | 7/2002 | Eisenman |
| 2002/0087279 A1 | 7/2002 | Hall |
| 2002/0105550 A1 | 8/2002 | Biebesheimer et al. |
| 2002/0105582 A1 | 8/2002 | Ikeda |
| 2002/0107610 A1 | 8/2002 | Kaehler et al. |
| 2002/0120459 A1 | 8/2002 | Dick et al. |
| 2002/0123880 A1 | 9/2002 | Brown |
| 2002/0130765 A1 | 9/2002 | Flick |
| 2002/0133545 A1 | 9/2002 | Fano et al. |
| 2002/0137505 A1 | 9/2002 | Eiche et al. |
| 2002/0152173 A1 | 10/2002 | Rudd |
| 2002/0164997 A1 | 11/2002 | Parry |
| 2002/0186144 A1 | 12/2002 | Meunier |
| 2003/0016238 A1 | 1/2003 | Sullivan et al. |
| 2003/0018428 A1 | 1/2003 | Knockeart et al. |
| 2003/0018742 A1 | 1/2003 | Imago ........................ 709/214 |
| 2003/0020759 A1 | 1/2003 | Cancilla et al. |
| 2003/0022701 A1 | 1/2003 | Gupta |
| 2003/0032426 A1 | 2/2003 | Gilbert et al. |
| 2003/0034998 A1 | 2/2003 | Kodosky et al. |
| 2003/0035075 A1 | 2/2003 | Butler et al. |
| 2003/0040944 A1 | 2/2003 | Hileman |
| 2003/0043178 A1 | 3/2003 | Gusler et al. |
| 2003/0048288 A1 | 3/2003 | Drif et al. |
| 2003/0055542 A1 | 3/2003 | Knockeart et al. |
| 2003/0055553 A1 | 3/2003 | Knockeart et al. |
| 2003/0055555 A1 | 3/2003 | Knockeart et al. |
| 2003/0058266 A1 | 3/2003 | Dunlap et al. |
| 2003/0058267 A1 | 3/2003 | Warren |
| 2003/0064805 A1 | 4/2003 | Wells |
| 2003/0067541 A1 | 4/2003 | Joao |
| 2003/0069673 A1 | 4/2003 | Hong et al. |
| 2003/0098876 A1 | 5/2003 | Makinen |
| 2003/0100964 A1 | 5/2003 | Kluge et al. |
| 2003/0101178 A1 | 5/2003 | Miyata et al. |
| 2003/0110035 A1 | 6/2003 | Thong et al. |
| 2003/0123446 A1 | 7/2003 | Muirhead et al. |
| 2003/0125057 A1 | 7/2003 | Pesola |
| 2003/0125963 A1 | 7/2003 | Haken |
| 2003/0132854 A1 | 7/2003 | Swan et al. |
| 2003/0160824 A1 | 8/2003 | Szumla |
| 2003/0186734 A1 | 10/2003 | LeMay et al. |
| 2003/0191820 A1 | 10/2003 | Ludtke |
| 2003/0192947 A1 | 10/2003 | Toedtli |
| 2003/0193404 A1 | 10/2003 | Joao |
| 2003/0206102 A1 | 11/2003 | Joao |
| 2003/0218629 A1 | 11/2003 | Terashima et al. |
| 2003/0222897 A1 | 12/2003 | Moore et al. |
| 2003/0227392 A1 | 12/2003 | Ebert et al. |
| 2004/0034651 A1 | 2/2004 | Gupta et al. |
| 2004/0049324 A1 | 3/2004 | Walker |
| 2004/0049336 A1 | 3/2004 | Knockeart et al. |
| 2004/0049337 A1 | 3/2004 | Knockeart et al. |
| 2004/0056797 A1 | 3/2004 | Knockeart et al. |
| 2004/0064245 A1 | 4/2004 | Knockeart et al. |
| 2004/0064248 A1 | 4/2004 | Holze et al. |
| 2004/0066330 A1 | 4/2004 | Knockeart et al. |
| 2004/0067773 A1 | 4/2004 | Rachabathuni et al. |
| 2004/0076444 A1 | 4/2004 | Badovinac et al. |
| 2004/0078721 A1 | 4/2004 | Williams |
| 2004/0088228 A1 | 5/2004 | Mercer et al. |
| 2004/0088696 A1 | 5/2004 | Kawano et al. |
| 2004/0090451 A1 | 5/2004 | Lay et al. |
| 2004/0093102 A1 | 5/2004 | Liiri et al. .................... 700/96 |
| 2004/0095480 A1 | 5/2004 | Battles et al. |
| 2004/0103153 A1 | 5/2004 | Chang et al. |
| 2004/0104842 A1 | 6/2004 | Drury et al. |
| 2004/0107043 A1 | 6/2004 | de Silva |
| 2004/0107144 A1 | 6/2004 | Short |
| 2004/0111273 A1 | 6/2004 | Sakagami et al. |
| 2004/0117131 A1 | 6/2004 | Peters et al. |
| 2004/0117634 A1 | 6/2004 | Letterer et al. ............... 713/182 |
| 2004/0121764 A1 | 6/2004 | Rivero |
| 2004/0128613 A1 | 7/2004 | Sinisi |
| 2004/0136574 A1 | 7/2004 | Kozakaya et al. |
| 2004/0139180 A1 | 7/2004 | White et al. |
| 2004/0162896 A1 | 8/2004 | Cen et al. |
| 2004/0174434 A1 | 9/2004 | Walker et al. |
| 2004/0179545 A1 | 9/2004 | Erola et al. |
| 2004/0183676 A1 | 9/2004 | Eisenman |
| 2004/0196179 A1 | 10/2004 | Turnbull |
| 2004/0201633 A1 | 10/2004 | Barsness et al. |
| 2004/0201867 A1 | 10/2004 | Katano |
| 2004/0203381 A1 | 10/2004 | Cahn et al. |
| 2004/0204129 A1 | 10/2004 | Payne et al. |
| 2004/0205191 A1 | 10/2004 | Smith et al. |
| 2004/0242224 A1 | 12/2004 | Janik et al. |
| 2004/0260407 A1 | 12/2004 | Wimsatt |
| 2004/0260470 A1 | 12/2004 | Rast |
| 2005/0006478 A1 | 1/2005 | Patel |
| 2005/0021225 A1 | 1/2005 | Kantarjiev et al. |
| 2005/0055287 A1 | 3/2005 | Schmidtberg et al. |
| 2005/0060436 A1 | 3/2005 | Kienhoefer |
| 2005/0064814 A1 | 3/2005 | Matsuo et al. |
| 2005/0073388 A1 | 4/2005 | Lee et al. |
| 2005/0076302 A1 | 4/2005 | Okamoto |
| 2005/0080879 A1 | 4/2005 | Kim et al. |
| 2005/0080902 A1 | 4/2005 | Parupudi et al. |
| 2005/0081152 A1 | 4/2005 | Commarford et al. |
| 2005/0088280 A1 | 4/2005 | Beehler et al. |
| 2005/0108044 A1 | 5/2005 | Koster |
| 2005/0136903 A1 | 6/2005 | Kashima et al. |

(56) References Cited

U.S. PATENT DOCUMENTS

| | | | |
|---|---|---|---|
| 2005/0154985 A1* | 7/2005 | Burkhart et al. | 715/705 |
| 2005/0160270 A1 | 7/2005 | Goldberg et al. | |
| 2005/0168071 A1 | 8/2005 | Durbin et al. | |
| 2005/0203752 A1 | 9/2005 | Shinada | |
| 2005/0219223 A1 | 10/2005 | Kotzin et al. | |
| 2005/0228869 A1 | 10/2005 | Imago | |
| 2005/0262062 A1 | 11/2005 | Xia | |
| 2005/0268234 A1 | 12/2005 | Rossi, Jr. et al. | |
| 2006/0026304 A1 | 2/2006 | Price | |
| 2006/0028428 A1 | 2/2006 | Dai et al. | |
| 2006/0031517 A1 | 2/2006 | Gossweiler et al. | |
| 2006/0055805 A1 | 3/2006 | Stockton et al. | |
| 2006/0061458 A1 | 3/2006 | Simon et al. | |
| 2006/0073815 A1 | 4/2006 | Pines et al. | |
| 2006/0076398 A1 | 4/2006 | Jung et al. | |
| 2006/0080188 A1 | 4/2006 | Jung et al. | |
| 2006/0081695 A1 | 4/2006 | Jung et al. | |
| 2006/0086781 A1 | 4/2006 | Jung et al. | |
| 2006/0090132 A1 | 4/2006 | Jung et al. | |
| 2006/0092033 A1 | 5/2006 | Hoff et al. | |
| 2006/0097855 A1 | 5/2006 | Turnbull et al. | |
| 2006/0100912 A1 | 5/2006 | Kumar et al. | |
| 2006/0115802 A1 | 6/2006 | Reynolds | |
| 2006/0116979 A1 | 6/2006 | Jung et al. | |
| 2006/0117001 A1 | 6/2006 | Jung et al. | |
| 2006/0157550 A1 | 7/2006 | Jung et al. | |
| 2006/0164239 A1 | 7/2006 | Loda | |
| 2006/0170687 A1 | 8/2006 | Nakamura et al. | |
| 2006/0173816 A1 | 8/2006 | Jung et al. | |
| 2006/0190428 A1 | 8/2006 | Jung et al. | |
| 2006/0206817 A1 | 9/2006 | Jung et al. | |
| 2006/0214813 A1 | 9/2006 | Witkowski et al. | |
| 2006/0224961 A1* | 10/2006 | Omi | G06F 3/04895 715/700 |
| 2006/0226949 A1 | 10/2006 | Reene | |
| 2006/0232377 A1 | 10/2006 | Witkowski | |
| 2006/0261931 A1 | 11/2006 | Cheng | |
| 2007/0005233 A1 | 1/2007 | Pinkus et al. | |
| 2007/0008189 A1 | 1/2007 | Amari et al. | |
| 2007/0027595 A1 | 2/2007 | Nou | |
| 2007/0027903 A1 | 2/2007 | Evans et al. | |
| 2007/0032225 A1 | 2/2007 | Konicek et al. | |
| 2007/0033414 A1 | 2/2007 | Dunko | |
| 2007/0038529 A1 | 2/2007 | Jung et al. | |
| 2007/0040013 A1 | 2/2007 | Jung et al. | |
| 2007/0064644 A1 | 3/2007 | Dowling et al. | |
| 2007/0152798 A1 | 7/2007 | Witkowski | |
| 2007/0176736 A1 | 8/2007 | Chuey et al. | |
| 2007/0197172 A1 | 8/2007 | Witkowski et al. | |
| 2007/0201381 A1 | 8/2007 | Ekl et al. | |
| 2007/0201382 A1 | 8/2007 | Ekl et al. | |
| 2007/0204021 A1 | 8/2007 | Ekl et al. | |
| 2007/0224937 A1 | 9/2007 | Jung et al. | |
| 2007/0224938 A1 | 9/2007 | Jung et al. | |
| 2007/0270159 A1 | 11/2007 | Lohtia et al. | |
| 2008/0027590 A1 | 1/2008 | Phillips et al. | |
| 2008/0061967 A1 | 3/2008 | Corrado | |
| 2008/0063400 A1 | 3/2008 | Hudson et al. | |
| 2008/0065274 A1 | 3/2008 | Taki et al. | |
| 2008/0068205 A1 | 3/2008 | Witkowski | |
| 2008/0086241 A1 | 4/2008 | Phillips et al. | |
| 2008/0091309 A1 | 4/2008 | Walker | |
| 2008/0103640 A1 | 5/2008 | Watanabe et al. | |
| 2008/0103655 A1 | 5/2008 | Turnbull et al. | |
| 2008/0129449 A1 | 6/2008 | Beehler et al. | |
| 2008/0143686 A1 | 6/2008 | Yeh et al. | |
| 2008/0164972 A1 | 7/2008 | Taki et al. | |
| 2008/0183376 A1 | 7/2008 | Knockeart et al. | |
| 2008/0195428 A1 | 8/2008 | O'Sullivan | |
| 2008/0229198 A1 | 9/2008 | Jung et al. | |
| 2008/0266254 A1 | 10/2008 | Robbins et al. | |
| 2008/0309451 A1 | 12/2008 | Zellweger et al. | |
| 2009/0005963 A1 | 1/2009 | Jarvinen | |
| 2009/0037033 A1 | 2/2009 | Phillips et al. | |
| 2009/0216600 A1 | 8/2009 | Hill | |
| 2009/0248587 A1 | 10/2009 | Van Buskirk | |
| 2010/0005153 A1 | 1/2010 | Tsao | |
| 2010/0146390 A1 | 6/2010 | Jung et al. | |
| 2010/0207812 A1 | 8/2010 | Demirdjian et al. | |
| 2010/0218095 A1 | 8/2010 | Jung et al. | |
| 2010/0223162 A1 | 9/2010 | Jung et al. | |
| 2010/0253507 A1 | 10/2010 | Jung et al. | |
| 2010/0255785 A1 | 10/2010 | Jung et al. | |
| 2010/0280748 A1 | 11/2010 | Mundinger et al. | |
| 2010/0280853 A1 | 11/2010 | Petralia et al. | |
| 2010/0280884 A1 | 11/2010 | Levine et al. | |
| 2010/0309011 A1 | 12/2010 | Jung et al. | |
| 2010/0332131 A1 | 12/2010 | Horvitz et al. | |
| 2011/0059693 A1 | 3/2011 | O'Sullivan | |
| 2011/0145089 A1 | 6/2011 | Khunger et al. | |
| 2011/0224893 A1 | 9/2011 | Scofield et al. | |
| 2011/0237287 A1 | 9/2011 | Klein et al. | |
| 2011/0257883 A1 | 10/2011 | Kuznetsov | |
| 2011/0288762 A1 | 11/2011 | Kuznetsov | |
| 2012/0041675 A1 | 2/2012 | Juliver et al. | |
| 2012/0109721 A1 | 5/2012 | Cebon et al. | |
| 2012/0112696 A1 | 5/2012 | Ikeda et al. | |
| 2012/0253654 A1 | 10/2012 | Sun et al. | |
| 2013/0054139 A1 | 2/2013 | Bodin et al. | |
| 2013/0095757 A1 | 4/2013 | Abdelsamie et al. | |
| 2013/0131909 A1 | 5/2013 | Cooper et al. | |
| 2013/0158861 A1 | 6/2013 | Lerenc | |
| 2013/0158869 A1 | 6/2013 | Lerenc | |
| 2013/0226365 A1 | 8/2013 | Brozovich | |
| 2013/0237156 A1 | 9/2013 | Jung et al. | |
| 2013/0237273 A1 | 9/2013 | Klein et al. | |
| 2013/0244713 A1 | 9/2013 | Klein et al. | |
| 2013/0244714 A1 | 9/2013 | Klein et al. | |
| 2013/0310101 A1 | 11/2013 | Klein et al. | |
| 2013/0344859 A1 | 12/2013 | Abramson et al. | |
| 2014/0012498 A1 | 1/2014 | Gustafson et al. | |
| 2014/0094998 A1 | 4/2014 | Cooper et al. | |
| 2014/0171013 A1 | 6/2014 | Varoglu et al. | |
| 2014/0173511 A1 | 6/2014 | Lehmann et al. | |
| 2014/0342670 A1 | 11/2014 | Kang et al. | |
| 2015/0006005 A1 | 1/2015 | Yu et al. | |
| 2015/0006072 A1 | 1/2015 | Goldberg et al. | |
| 2015/0019132 A1 | 1/2015 | Gusikhin et al. | |
| 2015/0025932 A1 | 1/2015 | Ross et al. | |
| 2015/0081362 A1 | 3/2015 | Chadwick et al. | |
| 2015/0094093 A1 | 4/2015 | Pierce et al. | |
| 2015/0141043 A1 | 5/2015 | Abramson et al. | |
| 2015/0161564 A1 | 6/2015 | Sweeney et al. | |
| 2015/0278759 A1 | 10/2015 | Harris et al. | |
| 2015/0294431 A1 | 10/2015 | Fiorucci et al. | |
| 2015/0312404 A1 | 10/2015 | Abramson et al. | |
| 2015/0317100 A1 | 11/2015 | Shimohata et al. | |
| 2015/0323333 A1 | 11/2015 | Lord et al. | |
| 2015/0323336 A1 | 11/2015 | Lord et al. | |
| 2015/0324717 A1 | 11/2015 | Lord et al. | |
| 2015/0324729 A1 | 11/2015 | Lord et al. | |
| 2015/0324735 A1 | 11/2015 | Lord et al. | |
| 2015/0324944 A1 | 11/2015 | Lord et al. | |
| 2015/0324945 A1 | 11/2015 | Lord et al. | |
| 2015/0325128 A1 | 11/2015 | Lord et al. | |
| 2016/0034845 A1 | 2/2016 | Hiyama et al. | |
| 2016/0202079 A1 | 7/2016 | Konig et al. | |
| 2017/0223164 A1 | 8/2017 | Jung et al. | |

FOREIGN PATENT DOCUMENTS

| | | | |
|---|---|---|---|
| JP | 6-224832 A | 8/1994 | |
| JP | 2002-123349 | 4/2002 | |
| JP | 2003-030207 | 1/2003 | |
| JP | 2003-084954 | 3/2003 | |
| JP | 2003-128253 A | 5/2003 | |
| JP | 2003-228451 | 8/2003 | |
| JP | 2012-215921 A | 11/2012 | |
| JP | 2003-114897 | 4/2018 | G06F 17/30 |
| KR | 10-2007-0049336 A | 5/2007 | |
| KR | 10-2010-0053717 A | 5/2010 | |
| KR | 10-2013-0040430 A | 4/2013 | |

(56) References Cited

FOREIGN PATENT DOCUMENTS

| KR | 10-2013-0051265 A | 5/2013 |
|---|---|---|
| KR | 10-2014-0041665 A | 4/2014 |

OTHER PUBLICATIONS

Alexander, Keith; Gilliam, Tig; Gramling, Kathy; Grubelic, Chris; Kleinberger, Herb; Leng, Stephen; Moogimane, Dhaval; Sheedy, Chris; "IBM Business Consulting Services—Applying Auto-ID to Reduce Losses Associated with Shrink"; Auto-ID Center Massachusetts Institute of Technology; bearing dates of Nov. 1, 2002, Feb. 1, 2003, Jun. 2002 and Nov. 2002; pp. 1-56; Auto-ID Center IBM-AUTOID-BC-003; located at: http://quintessenz.org/rfid.docs/www.autoidcenter.org/publishedresearch/ibm-autoid-bc-003.pdf; printed on Feb. 3, 2005.
"Capabilities"; Profit Logic; pp. 1-2; located at: http://www.profitlogic.com/capabilities.htm; printed on Feb. 3, 2005.
Emigh, Jacqueline; "IBM Unleashes New RFID Middleware"; eWeek Enterprise News & Reviews—Attention Health Care Technology Experts; bearing dates of Dec. 16, 2004 and 2005; pp. 1-2; located at: http://www.eweek.com/print_article2/0,2533,a=141068,00.asp; printed on Feb. 3, 2005.
"EPC RFID-based Inventory Management Solution Delivers Faster, Better Goods Logistics"; Solution Architects; bearing a date of 2003; pp. 1-15; located at: www.intel.com/business/bss/solutions/blueprints/pdf/30034101.pdf; printed on Jan. 10, 2005.
"Get real time warehouse management with Cadence WMS." ; Cadre Cadence Warehouse Management System Software; pp. 1; located at: http://www.cadretech.com/warehouse_mgmt.html; printed on Jan. 10, 2005.
"IBM RFID solution for asset tracking and inventory management"; pp. 1-3; located at: http://www-1.ibm.com/industries/wireless/doc/content/solution/1025230104.html; printed on Feb. 3, 2005.
"IBM RFID solution for asset tracking and inventory management"; pp. 1-3; located at: http://www-1.ibm.com/industries/wireless/doc/content/solution/1025230204.html; printed on Feb. 3, 2005.
Kuchinskas, Susan; "IBM in Major RFID Expansion"; Jupiterimages; Sep. 27, 2004; pp. 1-2; located at: http://www.internetnews.com/wireless/print.php/3412991; printed on Feb. 3, 2005.
Kuchinskas, Susan; "IBM Takes on Flood of RFID Data"; Jupiterimages; Jul. 19, 2004; pp. 1-3; located at: http://www.internetnews.com/ent-news/print.php/3382621; printed on Feb. 3, 2005.
"Nordstrom: Inventory Management Transformation"; Accenture.com; bearing a date of 1995-2005; pp. 1-2; located at: http://www.accenture.com/xd/xd.asp?it=enweb&xd=industries%5Cproducts%5Cretail%5Ccase%5Creta_nordstrom.xml; printed on Feb. 3, 2005.
"Solutions"; Profit Logic; pp. 1-2; located at: http://www.profitlogic.com/solutions.htm; printed on Feb. 3, 2005.
The EPCglobal Network™: Overview of Design, Benefits, & Security; EPCglobal Inc.; Sep. 24, 2004; pp. 1-11; located at: http://www.epcglobalinc.org/news/position_papers.html; printed on Feb. 3, 2005.
U.S. Appl. No. 12/012,216, filed Jan. 30, 2008, Jung et al.
Heywood, Drew; "Drew Heywood's Windows 2000 Network Services"; bearing a date of Feb. 28, 2001; pp. 1-17; Sam's; located at http://proquest.safaribooksonline.com/print?xmlid=0672317419/ch01lev1sec4; printed on Mar. 13, 2008.
PCT International Search Report; International App. No. PCT/US05/38495; dated Jul. 9, 2008; pp. 1-2.
PCT International Search Report; International App. No. PCT/US05/38839; dated Jul. 7, 2008; pp. 1-3.
Excerpt from the Cambridge Dictionary Online; bearing a date of 2009; printed on Oct. 23, 2009; pp. 1-2; Cambridge University Press; located at http://dictionary.cambridge.org/define.asp?key=62453&dict=CALD; (as provided by examiner).
Japanese State Intellectual Property Office, Notice of Rejection; App. No. 2007-538180 (Based on PCT Patent Application No. PCT/US05/038495); dated May 31, 2011 (received by our Agent on May 31, 2011); pp. 1-2 (machine translation).
The State Intellectual Property Office of the People's Republic of China, Office Action; App. No. 2005-80044439.3; dated Oct. 19, 2011; 6 pages (translation not available).
Chinese State Intellectual Property Office, Decision of Final Rejection, App. No. 2005/800444393 (Based on PCT Patent Application No. PCT/US2005/038495); dated Oct. 13, 2010 (received by our Agent on Oct. 20, 2010); pp. 1-13.
U.S. Appl. No. 12/592,071, Jung et al.
U.S. Appl. No. 12/592,073, Jung et al.
U.S. Appl. No. 12/660,240, Jung et al.
U.S. Appl. No. 12/660,245, Jung et al.
European Patent Office, Supplementary European Search Report, Pursuant to Rule 62 EPC; App. No. EP 05824191;dated Sep. 15, 2010 (received by our Agent on Sep. 24, 2010); pp. 1-5.
Japanese State Intellectual Property Office, Office Action; App. No. 2007-538180 (Based on PCT Patent Application No. PCT/US05/038495);dated May 31, 2011 (received by our Agent on May 31, 2011); pp. 1-2 (Translation not available).
U.S. Appl. No. 12/798,451, Jung et al.
"Electronic Device"; Wikipedia; created on Jun. 29, 2015; printed on Jun. 8, 2015; pp. 1-2; located at: http://www.thefreedictionary.com/electronic+device.
"Input Device"; Wikipedia; bearing a date of Jun. 6, 2015; printed on Jun. 8, 2015; pp. 1-4; located at: http://en.wikipedia.org/wiki/Input_device.
Amey et al., "'Real-Time' Ridesharing—The Opportunities and Challenges of Utilizing Mobile Phone Technology to Improve Rideshare Services," Paper submitted to the 2011 Transportation Research Board Annual Meeting, Aug. 1, 2010, pp. 1-17.
Boufraied, "A Diagnostic Approach for Advanced Tracking of Commercial Vehicles With Time Window Constraints," IEEE Transactions on Intelligent Transportation Systems, 2013, vol. 14, No. 3, pp. 1470-1479.
Dillenburg et al., "The Intelligent Travel Assistant," IEEE 5th International Conference on Intelligent Transportation Systems, Sep. 3-6, 2002, pp. 691-696.
Duchon et al., "Distributed Cooperative On-Demand Transportation," 2011 IEEE $73^{rd}$ Vehicular Technology Conference, pp. 1-5.
Fougères et al., "A Push Service for Carpooling," 2012 IEEE International Conference on Green Computing and Communications, Conference on Internet of Things, and Conference on Cyber, Physical and Social Computing, pp. 685-691.
Garofalaki et al., "Transport Services within the IoT Ecosystem using Localisation Parameters," 2016 IEEE International Symposium on Signal Processing and Information Technology, pp. 1-6.
Guc et al., "Real-time, Scalable Route Planning Using a Stream-Processing Infrastructure," $13^{th}$ International IEEE Conference on Intelligent Transportation Systems, Sep. 19-22, 2010, pp. 986-991.
Lalos et al., "A Framework for Dynamic Car and Taxi Pools with the Use of Positioning Systems," IEEE Computer Society; Computation World: Future Computing, Service Computation, Cognitive, Adaptive, Content, Patterns, 2009, pp. 385-391.
Megalingam et al., "Automated Wireless Carpooling System for an Eco-Friendly Travel," 3rd International Conference on Electronics Computer Technology, IEEE 2011, pp. 325-329.
Morenz et al., "An Estimation-based Automatic Vehicle Location System for Public Transport Vehicles," Proceedings of the 11th International IEEE, Conference on Intelligent Transportation Systems, Oct. 12-15, 2008, pp. 850-856.
Shahzada et al., "Dynamic Vehicle Navigation: An A* Algorithm Based Approach Using Traffic and Road Information," 2011 IEEE International Conference on Computer Applications and Industrial Electronics, pp. 514-518.
Shengguang et al., "Internet of Things for Special Materials Transportation Vehicles," 2013 IEEE International Conference on Green Computing and Communications and IEEE Internet of Things and IEEE Cyber, Physical and Social Computing, pp. 1891-1894.
Vaughn-Nichols, "Will Mobile Computing's Future Be Location, Location, Location?," Computer, 42(2):14-17, Mar. 2009, IEEE Explore.
"Applications: eCash on the Move at Volkswagen," iButton Applications, Dallas Semiconductor MAXIM, dated 2006; pp. 1-2; printed

(56) References Cited

OTHER PUBLICATIONS on Feb. 27, 2006; located at http://www.maxim-ic.com/products/ibutton/applications/index.cfm?Action=DD&id=21; Maxim Integrated Products.

"Applications: Mass Transit in Istanbul, Turkey," and "Parking in Argentina," iButton Applications, Dallas Semiconductor MAXIM; dated 2006, pp. 1-3, printed on Feb. 27, 2006; located at: http://www.maxim-ic.com/products/ibutton/applications/index.cfm?Action=DD&id=8; Maxim Integrated Products.

Cameron et al., "Knuckletop Computing: The Java Ring," pp. 1-4; located at: http://java.sun.com/features/1998/03/rings.html.

"Cellport Announces First Universal, Hands-Free Cell Phone System for Cars," Intelligent Transportation Society of America; dated Jul. 16, 2001, pp. 1-2, printed on Feb. 24, 2006; located at: http://www.itsa.org/itsnews.nsf/key/5FAA?OpenDocument.

"City of Caen, France, to demonstrate simplicity of Near Field Communication (NFC) technology," dated Oct. 18, 2005; pp. 1-3, printed on Mar. 20, 2006; located at: http://www.semiconductors.philips.com/news/content/file_1193.html; Koninklijke Philips Electronics N.V.

"Ecma welcomes ISO/IEC adoption of NFC Standard for short range wireless communication," Ecma International; dated Dec. 8, 2003; pp. 1-3; printed on Feb. 24, 2006; located at: http://www.ecma-international.org/news/Ecma-340-NFCIP-1.htm.

Kiser, "Newall Electronics Introduces Wearable DRO Technology," Industrial Product News Online; pp. 1-2; printed on Feb. 24, 2006; located at: http://www.ipnews.com/archives/dro/jan02/newall%5Felect.htm.

Lewis, "Put on your human-machine interface," Design News; dated Aug. 20, 2001 and 1997-2006; pp. 1-4; printed on Feb. 24, 2006; located at: http//designnews.com/article/CA150040.html; Reed Business Information.

"Near Field Communication: Encyclopedia," What You Need to Know About; dated 2006; pp. 1-3; printed on Mar. 3, 2006; located at: http://experts.about.com/e/n/ne/Near_Field_Communication.htm; About, Inc.

"Near Field Communication," Wikipedia; dated Feb. 17, 2006; pp. 1-2; printed on Feb. 24, 2006; located at: http://en.wikipedia.org/wiki/Near_Field_Communication.

"Near Field Communication, White Paper," dated 2005; pp. 1-9; located at: http://www.ecma-international.org/activities/Communications/tc32-tg19-2005-012.pdf; ECMA International.

"Near field communication set for full-scale trial," dated Oct. 20, 2005, pp. 1-3; printed on Mar. 20, 2006; located at: http://www.electronicstalk.com/news/phi/phi328.html; Pro-Talk Ltd, UK.

"Philips, Samsung and Telefonica Moviles Espana Demonstrate Simplicity of Near Field Communication Technology at 3GSM World Congress; 200 Attendees Can Enjoy Easy Payment and Convenient Access at Fira de Barcelona Convention Center," dated Feb. 7, 2006; pp. 1-4; printed on Mar. 20, 2006; located at: http://home.Businesswire.com/portal/site/google/index.jsp?ndmView=news_view&newsId=20060207005492&newsLang=en; BusinessWire.

"Secure Website Logon and Transactions," iButton Applications; dated 2004; pp. 1-2; printed on Mar. 3, 2006; located at: http://72.14.207.104/search?q=cache:4JM396tN_ToJ:db.maxim-ic.com/ibutton/applications/index.cfm; Maxim/Dallas Semiconductor Corp.

Swedberg, "Developing RFID-Enabled Phones," RFID Journal; dated Jul. 9, 2004 and 2002-2006; pp. 1-3; printed on Mar. 20, 2006; located at: http://www.rfidjournal.com/article/articleview/2020/1/1/; RFID Journal, LLC.

Thomson, "Industry giants tout touch computing," Computing, dated Mar. 19, 2004 and 1995-2006; pp. 1-2; printed on Feb. 24, 2006; located at: http://www.computing.co.uk/vnunet/news/2124597/industry-giants-tout-touch-computing; vnu business publications.

"About Near Field Communication," undated; pp. 1-2; NFC-Forum; located at: http://www.nfc-forum.org/aboutnfc/.

Oswald, "blinkx Looks to Make Search Automatic," BetaNews; dated Mar. 7, 2006 and 1998-2006; pp. 1-6; printed on Mar. 22, 2006; BetaNews, Inc.; located at: http://www.betanews.com/article/blinkx_Looks_to_Make_Search_Automatic/1141754474.

"Welcome," NFC-Forum; dated 2005; pp. 1-2; printed on May 31, 2006; located at: http://www.nfc-forum.org/home; NFC Forum.

* cited by examiner

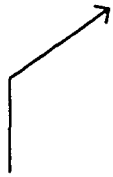

972 A computer-readable medium product for providing assistance with an item.

974 Computer-executable instructions comprising:
a) receive a query related to the item through a first user interface of an electronic device associatable with an item, wherein the item is distinct from the electronic device; and
b) provide an assistance correlating to the query through a second user interface of the electronic device.

1451 Apparatus for providing user assistance with an item.

1452 First associatable means for receiving a selection corresponding to an aspect of an item, wherein the item is distinct from the first means.

1454 Second means for receiving a selection corresponding to an assistance request related to the aspect of the item, wherein the item is distinct from the second means.

1456 Third means for providing an assistance correlating to the assistance request related to the aspect of the item, wherein the item is distinct from the third means.

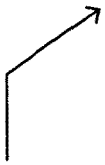

1572 A computer-readable medium product for providing assistance with an item.

1574 Computer-executable instructions comprising:
a. receive a selection corresponding to the item through a first user interface operably coupled to an electronic device and associatable with the item, wherein the item is distinct from the electronic device;
b. receive a selection corresponding to an assistance request related to the item through a second user interface operably coupled to the electronic device; and
c. provide an assistance correlating to the assistance request related to the item through a third user interface operably coupled to the electronic device.

ENHANCED USER ASSISTANCE

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending United States patent application entitled PROVIDING ASSISTANCE, naming Edward K. Y. Jung, Royce A. Levien, Mark A. Malamud, and John D. Rinaldo, Jr., as inventors, filed Sep. 30, 2004, Ser. No. 10/955,966.

2. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,476.

3. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,555.

3. For purposes of the USPTO extra-statutory requirements, the present application constitutes a continuation in part of currently co-pending United States patent application entitled ENHANCED CONTEXTUAL USER ASSISTANCE, naming Edward K. Y. Jung, Royce A. Levien, Mark A. Malamud, and John D. Rinaldo, Jr., as inventors, filed Oct. 27, 2004, Ser. No. 10/974,561.

4. For purposes of the USPTO extra-statutory requirements, the present application constitutes a continuation in part of currently co-pending United States patent application entitled ENHANCED USER ASSISTANCE, naming Edward K. Y. Jung, Royce A. Levien, Mark A. Malamud, and John D. Rinaldo, Jr., as inventors, filed Oct. 29, 2004, Ser. No. 10/978,243.

5. For purposes of the USPTO extra-statutory requirements, the present application constitutes a continuation in part of currently U.S. patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,687, now abandoned.

In an event of any inconsistencies between the instant application and an application incorporated by reference, the instant application controls.

SUMMARY

An embodiment provides a method. The method includes receiving a selection corresponding to an item through a first user interface operably coupled to an electronic device and associated with the item, wherein the item is distinct from the electronic device. The method also includes receiving a selection corresponding to an assistance request related to the item through a second user interface operably coupled to the electronic device, and providing an assistance correlating to the assistance request related to the item through a third user interface operably coupled to the electronic device. The method may further include sensing a context of the item, and the providing an assistance correlating to the query may include providing an assistance correlating to the query and the sensed context of the item. The method may further include receiving an input responsive to the provided assistance. The method may further include providing another assistance correlating to the received input responsive to the provided assistance. In addition to the foregoing, other method embodiments are described in the claims, drawings, and text forming a part of the present application.

A further embodiment provides a computer-readable medium product. The computer-readable medium product includes computer-executable instructions operable to receive a selection corresponding to the item through a first user interface operably coupled to an electronic device and associatable with the item, wherein the item is distinct from the electronic device. The computer-readable medium product further includes computer-executable instructions operable to receive a selection corresponding to an assistance request related to the item through a second user interface operably coupled to the electronic device, and provide an assistance correlating to the assistance request related to the item through a third user interface operably coupled to the electronic device. In addition to the foregoing, other computer-readable medium product embodiments are described in the claims, drawings, and text forming a part of the present application.

An embodiment provides a method. The method includes activating a help mode in an electronic device distinct from an item, and receiving a user selection corresponding to an aspect of the item through a first receiving portion of the electronic device associated with the aspect. The method further includes receiving a user selection corresponding to a tutorial request through a second receiving portion of the electronic device. The method also includes broadcasting a tutorial correlating with the tutorial request that includes information related to the selected aspect of the item through an indicator portion of the electronic device. In addition to the foregoing, other method embodiments are described in the claims, drawings, and text forming a part of the present application.

Another embodiment provides an apparatus. The apparatus includes an electronic device including a first receiver portion associatable with an aspect of an item, a second receiver portion, an indicator portion, and instructions. The instructions when implemented in the electronic device cause the electronic device to receive a user selection of the aspect of the item through the first receiving portion, receive a user selection corresponding to a tutorial request through a second receiving portion of the electronic device, and broadcast a tutorial that includes information related to the selected aspect of the item through the indicator portion. In addition to the foregoing, other apparatus embodiments are described in the claims, drawings, and text forming a part of the present application.

In addition to the foregoing, various other method and/or system embodiments are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 23 illustrates a partial view of an exemplary computer-readable medium product that may serve as an illustrative environment of and/or for subject matter technologies that provide user assistance for an item;

FIG. 34 illustrates a partial view of an exemplary apparatus that may serve as an illustrative environment of and/or for subject matter technologies that provide user assistance for an item;

FIG. 40 illustrates a partial view of product that includes an exemplary computer-readable medium product that may serve as an illustrative environment of and/or for subject matter technologies that provide user assistance for an item;

DETAILED DESCRIPTION

Figure 1:
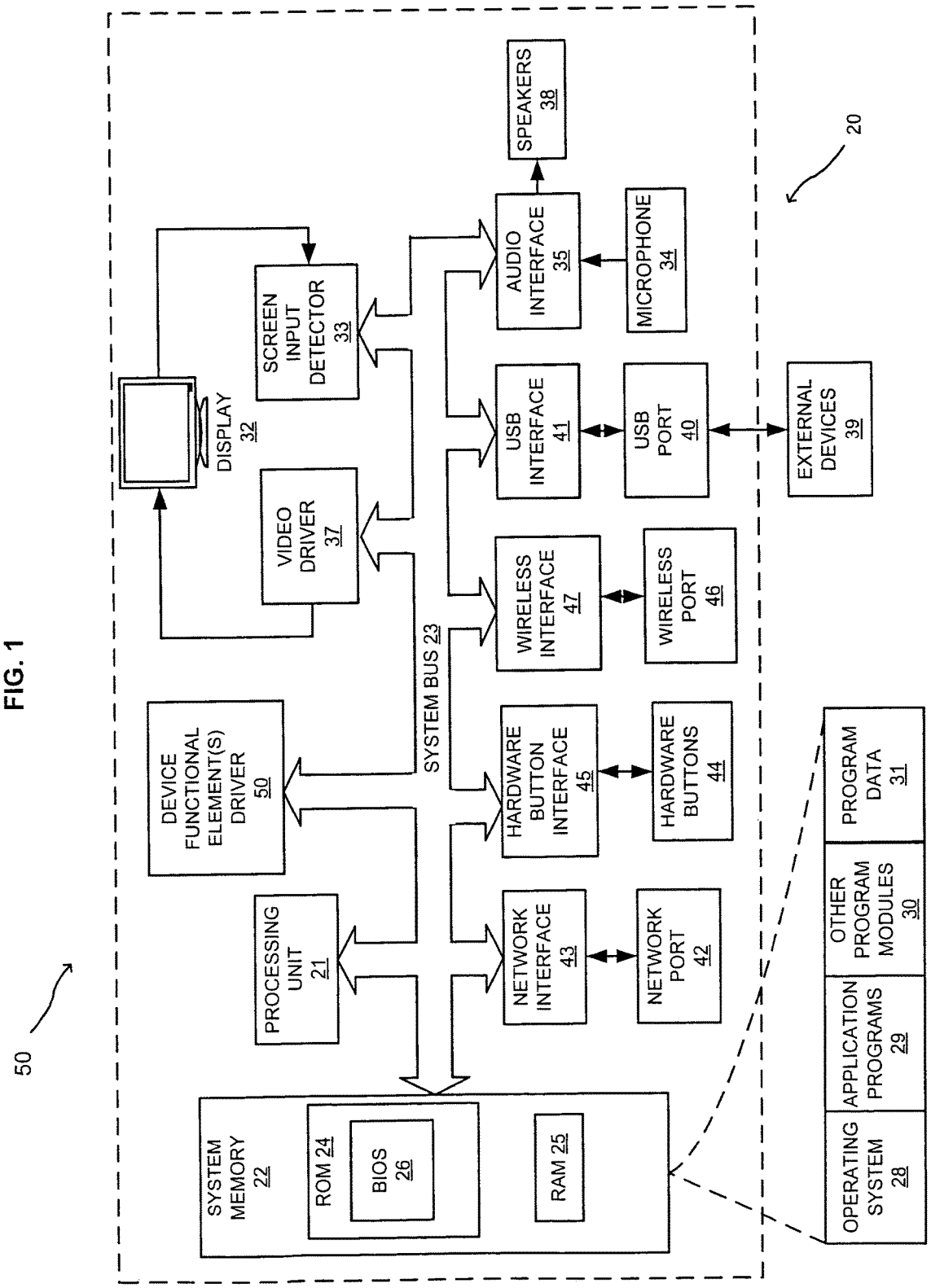
FIG. 1 illustrates an exemplary system in which embodiments may be implemented, including a thin computing device and a functional element of an electronic device.

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Features, functionality, and options of computing devices, such as personal computers, and the larger systems of which they may be a part, such as cars, airplanes, submarines, and aircraft carriers, have rapidly advanced and evolved as technology provides increased processor speeds, storage capacity, connectivity, and interconnectivity, all at decreased cost. Additionally, rapid advances have been made in inter-connectability and interoperability of computing devices and other devices at a consumer level, such as handheld devices and cell phones, at a system and large system level. These advances are intended to provide a user with many benefits. However, realization of these benefits may require that a user read and re-read manuals.

When new, a user may or many not take the trouble to read a manual. Manuals are sometimes considered too complex and troublesome to comprehend. As a result, the advances may be unused and the user dissatisfied. A user may benefit from being able to input a selection relevant to a need or question through a user interface associated with a computer or a system, and then let an assistance manager guide them from there using the same or another user interface.

Additionally, manuals are sometimes lost, misplaced, or unavailable, such as for example, when traveling. A user may further benefit by being able to obtain assistance directly from the computer of a nature often provided by a comprehensive user manual.

Further, as a result of rapidly advancing computer technology, computing devices are become smaller, more powerful, and cheaper. The advancing computing technology is moving beyond the personal computer and into everyday items and devices, providing embedded technology and connectivity. Almost any thing or item, from buildings to clothing, from telephones to tools, from appliances to cars, from homes to the human body, from personal information devices to a common a coffee mug, can have an embedded electronic device that includes a computing device. The embedded electronic device typically improves performance and capacity of a basic functionality of the item, and may connect the item with a network of other items or the Internet. These items with embedded electronic devices may be described using a variety of names, which may not have a bright line distinction between them. Commonly used names include a limited resource computing device, limited capacity computing device, ubiquitous computing device, pervasive computing device, digital appliance, and Internet appliance. Such items may be collectively referred to herein from time-to-time as "pervasive computing," or a "pervasive computing device" for economy of words and to aid in reading and understanding embodiments disclosed herein.

Pervasive computing provides increased functionality, it often requires increased interaction between a user and a previously dumb device. Pervasive computing devices, such as conventional telephones, cell phones, smart phones, pocket organizers, and personal digital assistants, often present a user with widely varying user interface protocols. This may contribute to user confusion about an aspect of the pervasive computing device they are viewing, such as a particular button. As a result, simply finding appropriate aspects of the device related to a portion of the user manual may be difficult or impossible. Like a computer user, a pervasive computing device user may benefit from interactive assistance.

Rapidly advancing technology may also provide an opportunity for increased interaction between traditionally dumb items and user manuals. Many dumb items have become more complex and sophisticated to meet user demand. For example, simply adjusting an ergonomic chair requires complex instructions and location of knobs placed at odd locations. User manuals have correspondingly become more complex and sometimes confusing. As a result, simply finding appropriate aspects of the item related to a portion of the user manual may be difficult or impossible. A user may benefit from interactive assistance with these traditionally dumb items.

FIG. 1 and the following discussion are intended to provide a brief, general description of an environment in which embodiments may be implemented. FIG. 1 illustrates an exemplary system that includes a thin computing device 20 that interfaces with an electronic device that includes one or more functional elements. For example, the electronic device may include any item having electrical and/or electronic components playing a role in a functionality of the item, such as a limited resource computing device, a digital camera, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33). The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device 20 may be designed to include a user interface having a physical keyboard (not shown).

The device functional elements (not shown) are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and a camera capturing and saving an image.

Figure 2:
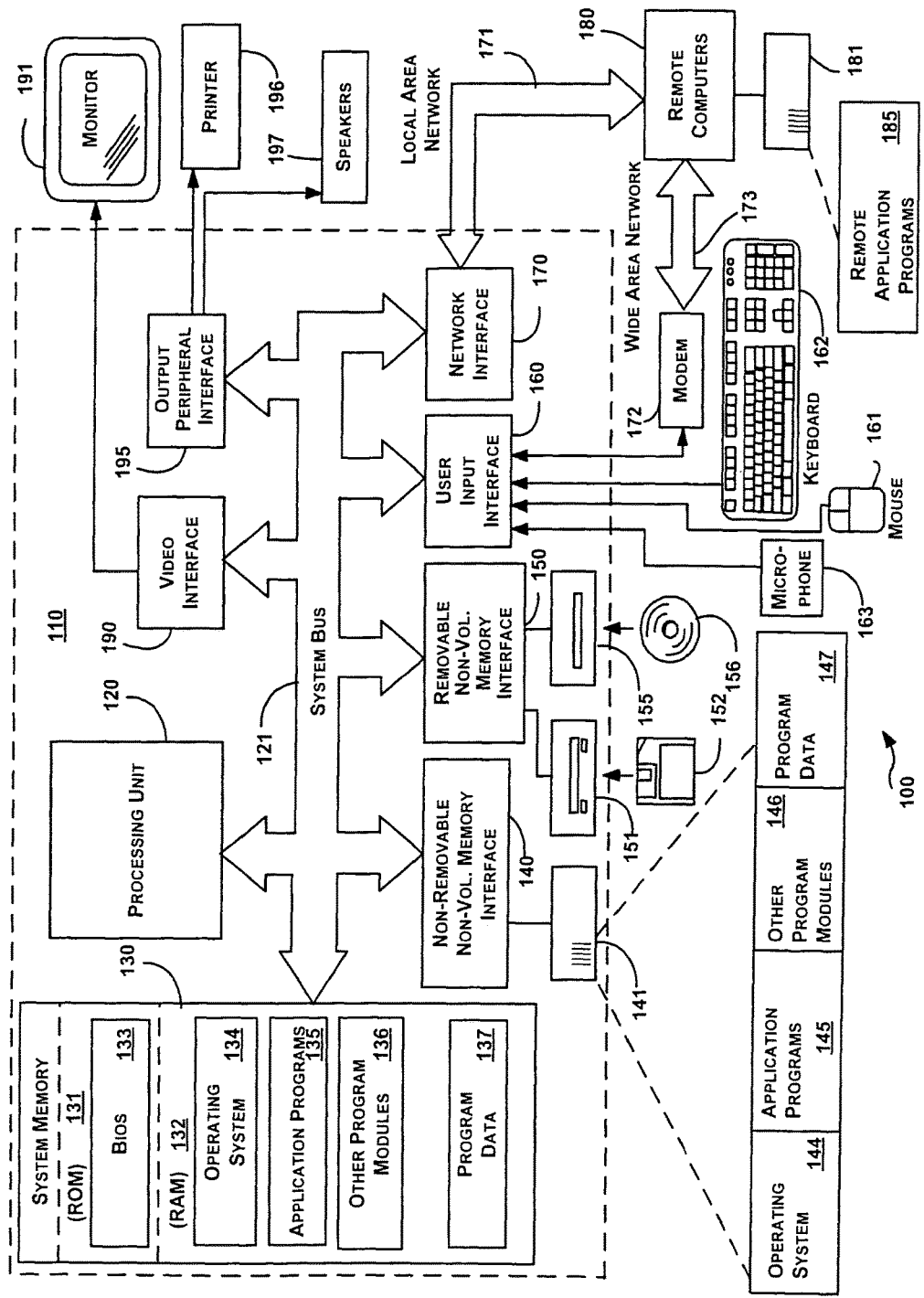
FIG. 2 illustrates another exemplary system in which embodiments may be implemented, including a general-purpose computing device.

FIG. 2 illustrates another exemplary system in which embodiments of may be implemented. FIG. 2 illustrates an electronic device that may correspond in whole or part to a general-purpose computing device, shown as a computer 100. Components of the computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 100 typically includes a variety of computer-readable media. Computer-readable media can be any available media that can be accessed by the computer 100 and include both volatile and nonvolatile media, removable and non-removable media. By way of example, and not limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computer 100. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 100, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computer 100 may also include other removable/non-removable, volatile/nonvolatile computer storage media. By way of example only, FIG. 2 illustrates a non-removable non-volatile memory interface (hard disk interface) 140 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer-readable instructions, data structures, program modules, and other data for the computer 100. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computer 100 through input devices such as a microphone 163, keyboard 162 and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 100, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 100, or portions thereof, may be stored in a remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, embodiments will be described with reference to acts and symbolic representations of operations that are performed by one or more computing devices, such a computing device 20 of FIG. 1 and/or computer 100 of FIG. 2, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 illustrate an example of a suitable environment on which embodiments may be implemented. The computing device 20 of FIG. 1 and/or computer 100 of FIG. 2 are examples of a suitable environment and are not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, hand-held or laptop devices, personal digital assistants, multiprocessor systems, microprocessor-based systems, set top boxes, programmable consumer electronics, network PCs, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

Figure 3:
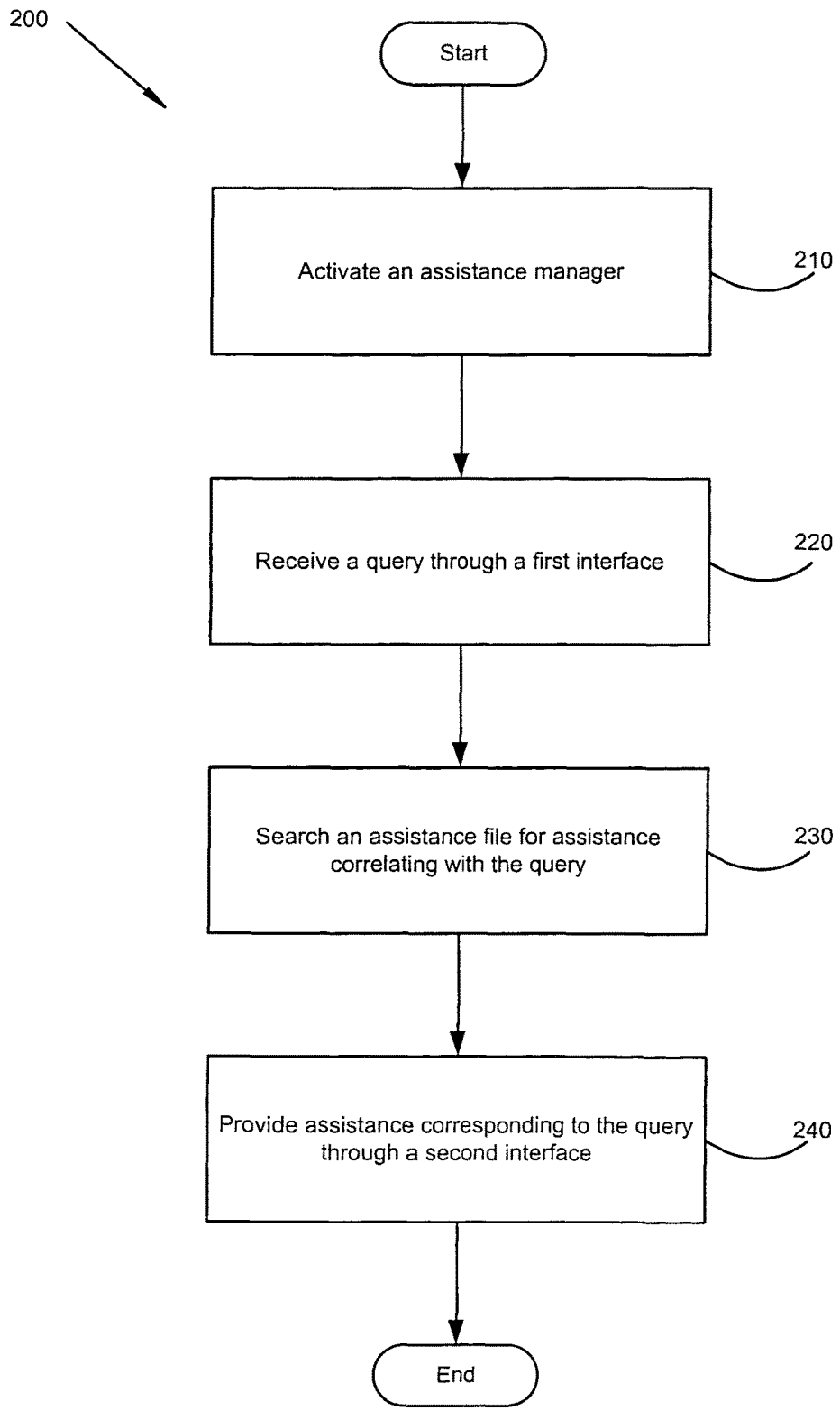
FIG. 3 is a flow diagram illustrating an exemplary operational flow that provides assistance.

FIG. 3 is a flow diagram illustrating an exemplary operational flow 200 that provides assistance. After a start operation, the operation moves to operation 210. At activation operation 210, an assistance manager is activated. The assistance manager typically includes instructions, such as computer-readable instructions, for example, a program, process, and/or application operating on an electronic device that implements the exemplary operational flow 200 that provides assistance.

At query operation 220, a query related to an electronic device is received through a first interface associated with the electronic device. The query may include a selection of an aspect of the electronic device as a subject of the query. The query may include any aspect of the electronic device for which a user might desire assistance, such as, a feature of the device, an element of the device, and a process associated with the device. The query related to the electronic device may include an assistance request related to the electronic device. The assistance request may include a request related to the electronic device in any manner, including the selected aspect of the electronic device. For example, the assistance request may include any request related to the electronic device, such as "show me," "demonstrate," and "guide me." The first interface may include a first user interface.

The electronic device may be incorporated into any type of appliance and/or item. In certain embodiments, the electronic device may include a computing device, such as a personal computer and a server. In other embodiments, the electronic device may include a limited resource computing device, an appliance, a pervasive computing device, and a digital appliance. Examples may include a PDA, a cell phone, a BLACKBERRY appliance, an on-board computing device, such as in a car, boat, and/or aircraft, an X-BOX, a home gateway, a set-top box, a point-of-sale terminal, a digital camera, a TIVO, and an automated teller machine. By way of further example, the electronic device may include a computing device and the query may relate to an aspect of the computing device. The electronic device may include an electrical appliance and the query may relate to an aspect of the electrical appliance. The electronic device may include a limited resource computing device and the query may relate to an aspect of the limited resource computing device. The electronic device may include a pervasive computing device and the query may relate to an aspect of the pervasive computing device. The electronic device may include a digital appliance and the query may relate to an aspect of the digital appliance.

At search operation 230, an assistance file is searched for an assistance response correlating to the query. Searching the assistance file may include searching an assistance file stored in a storage media associated with the electronic device, such as the system memory 22 of FIG. 1, or coupled with the electronic device. Alternatively, the assistance file may be stored and/or searched remotely and coupled with a functionality of the operation 230, such as by a network, such as a LAN, a WAN, or the Internet.

At assistance operation 240, an assistance response is provided correlating to the query through a second interface of the electronic device. In an embodiment, the assistance response provided may include visually providing an assistance with a physical element of the device, such as blinking a light associated with the physical element. For example, the physical element may be a physical button and the light may be a light emitting device incorporated into the button. In this example, the assistance may include blinking the LED associated with the button. In an alternative embodiment, the second interface may include an LED and a third interface may include a speaker. The provided assistance may include providing an audible assistance presentation from the speaker and blinking the LED appropriately during the presentation. The audible assistance presentation may include a spoken presentation that includes a word or words. The providing an assistance further may include tactilely providing an assistance presentation.

The provided assistance may include guidance through a process associated with the aspect of the device, a description of the aspect of the device, a showing how the aspect of the device operates, and/or an interactive tutorial. The assistance may be provided in any manner, such as a visual presentation, an audio presentation, a spoken presentation, a tactile presentation, and/or a combination of two or more of these manners of presentation.

In an embodiment, the second interface may be a second user interface. The second user interface may include a visual display, a graphical display, and a graphical user interface. The second user interface may include an audio display, such as an acoustic speaker. Further, the second user interface may include a tactile interface, such as a vibrating component. The operational flow then proceeds to an end operation.

The first interface and the second interface may be at least substantially similar, and the second user interface may include the first user interface. In an embodiment, the first interface and the second interface may comprise a same physical or virtual element of the electronic device. The first interface and the second interface may share a same physical or virtual element, but be separately activated when the physical or virtual element is in different activate modes or states. For example, an interface having a physical structure and in a first state may function as the first interface, and in a second state may function as the second interface. In this example, a single physical button interface may have a plurality of interface states. Continuing with these examples, a physical button associated with an electronic device may have normal operating function related to the electronic device. Upon activation of an assistance manager and entry into an assistance mode, the same physical button transitions to a first state and functions as the first interface that receives a query, such as at the query operation 220. Upon occurrence of an event, such as receipt of the query at the query operation 220, or finding an assistance correlating to the query at the search operation 230, the same physical button transitions to a second state. In the second state, the physical button functions as the second interface that provides assistance correlating to the query, such as at the provide operation 240.

In another example, an interface, such as a physical button, may function as a first interface when operated in a first mode and function as a second interface when operated in a second mode. In this example, a single physical button may function as a first interface when pressed quickly once and as a second interface when pressed slowly once. Continuing with this example, the single physical button may function as a first interface when pressed once and as a second interface when pressed twice in quick succession.

In an embodiment, the operational flow 200 that provides assistance may be considered to be an electronic-device assistance manager. The assistance manager may be implemented in any combination of hardware, software, and/or firmware configured to effect the operational flow 200 that provides assistance, depending upon the design choices of the system designer. A further embodiment includes a computer-readable media containing computer instructions which, when run on a computing device, cause the computing device to perform the operational flow 200 that provides assistance. The computer-readable media may include a computer storage media, which may be carried by a computer-readable carrier, such as a floppy disk. Alternatively, the computer-readable media may include a communications media.

Figure 4:
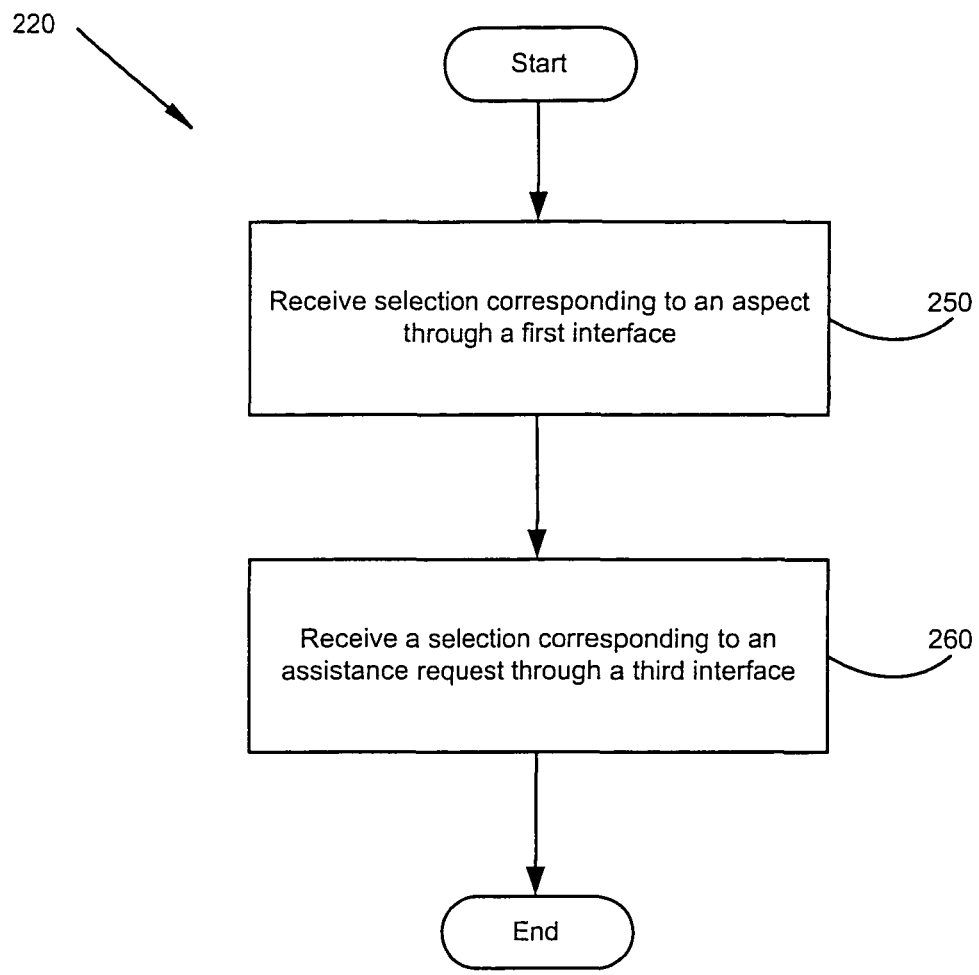
FIG. 4 is a flow diagram illustrating additional detail related to an alternative embodiment of the exemplary operational flow of FIG. 3.

FIG. 4 is a flow diagram illustrating additional detail related to an alternative embodiment of the exemplary query operation 220 of FIG. 3. At aspect selection operation 250, a selection corresponding to the electronic device is received through the first interface. As described in conjunction with query operation 220 of FIG. 3, the selection designates a subject matter of the query, and may include a selection of an aspect of the electronic device. The selection may include an aspect related to the electronic device, such as, a component associated with the device, a feature associated with the electronic device, a function associated with the electronic device, a program associated with the electronic device, and a process associated with the electronic device.

In an embodiment, the first interface may include a first user interface. In an embodiment, the selection may be received by detecting a touch to a first user interface associated with the electronic device, such as a button or a component. The touch may be received in any manner. For example, such as from a user body part physically contacting the first user interface, a user body part being proximate to the first user interface, and a user body part having an orientation to the first user interface. Similarly, for example, a touch may be received by a stylus physically contacting the first user interface, being proximate to the first user interface, and having an orientation to the first user interface.

The first user interface may be associated with an aspect of the electronic device, such as a physical association. Using a button for example, a first user interface may be included within a physical structure of a button, or the first user interface may be adjacent or proximate to the button. The association of a button or component and the first user interface may include a logical association. By a way of further example, an association may include a touch sensitive portion of a visual display surface. When the visual display surface displays an image or icon visually associated with an aspect of an electronic device, a touch to the displayed image or icon, or a portion of the visual display surface proximate to the displayed image or icon, may be detected and received as a selection through an interface logically associated with the electronic device, or an interface logically associated with an aspect of the electronic device.

In another embodiment, the selection may be received by detecting a sound or word. For example, the first user interface may include a microphone and processing capability to detect a sound or spoken word corresponding to a selection related to the electronic device, or to an aspect of the electronic device. For example, detecting a signal corresponding to the spoken words "lens cover" selects a lens cover of a digital camera, and is received as a selection related to the electronic device, or to the lens cover of the electronic device.

At assistance selection operation 260, a selection corresponding to an assistance request is received. In an embodiment, the selection is received through a third interface of the electronic device, and the third interface may include a third user interface. The receiving a selection corresponding to an assistance request associated with the selection may include detecting a touch to the third user interface. The third user interface may include a button. The third user interface may include at least one predetermined query. The selection corresponding to an assistance request may include a request for a description of functionality, a request for a description of process, a request for instruction, a request for information, and/or a request for guidance. The request for guidance may include a request for a guidance related to replicating a previous operation of the device. The receiving a selection corresponding to an assistance request may include receiving a selection corresponding to an assistance request selected from a plurality of selections.

At least two of first, second, and third user interfaces may be at least substantially similar. In an embodiment, and similar to the embodiment of the exemplary operational flow 200 that provides an assistance described in conjunction with FIG. 3, at least two of the first interface, the second interface, and the third interface may comprise a same physical or virtual device. At least two of the interfaces may share a same physical or virtual device, but be separately activated when the physical or virtual device is in a different mode or state.

Figure 5:
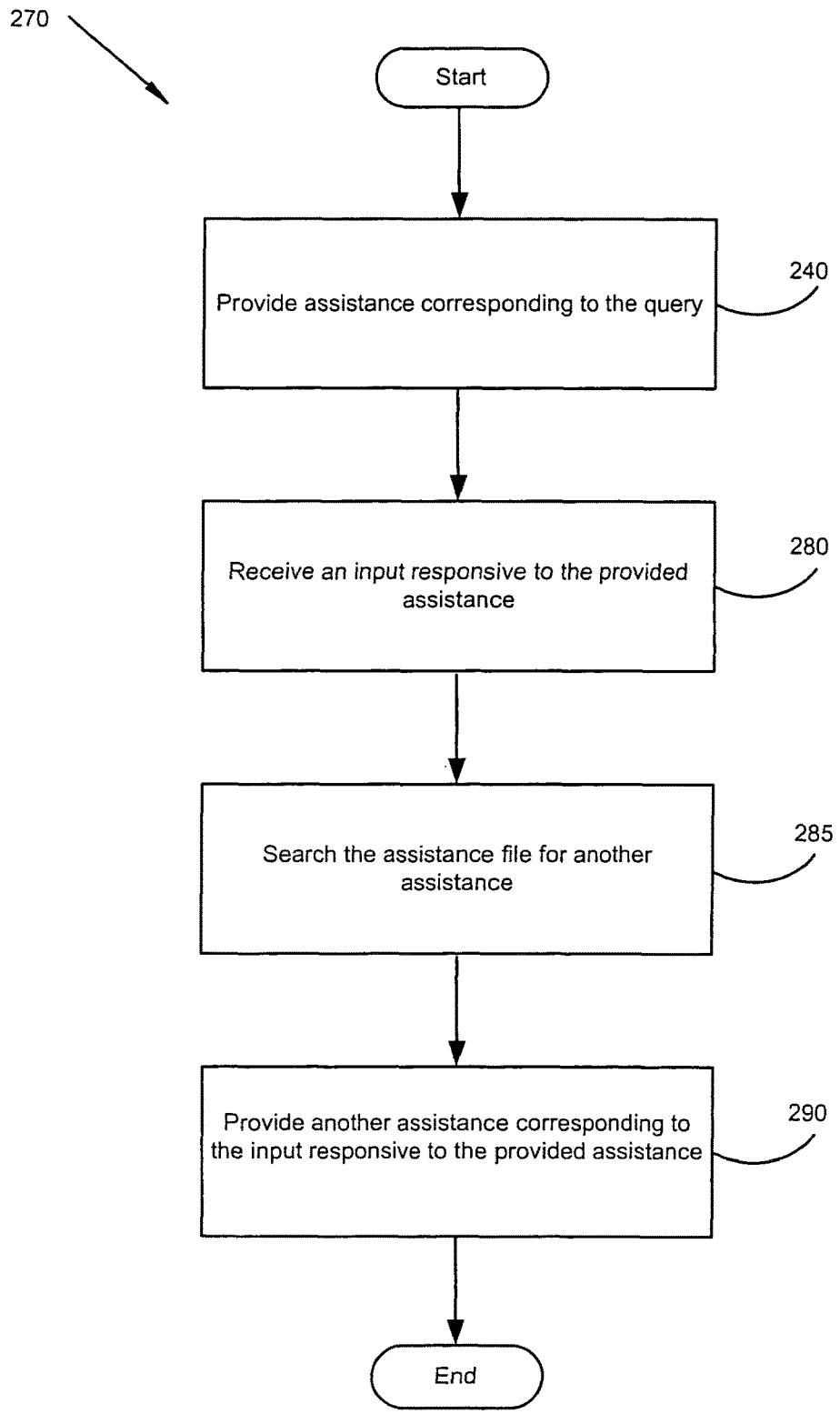
FIG. 5 is a flow diagram illustrating an exemplary operational flow supplementing the exemplary query operational flow that provides assistance described in conjunction with FIG. 3.

FIG. 5 is a flow diagram illustrating an exemplary operational flow 270 that provides an additional assistance, supplementing the exemplary operational flow 200 described in conjunction with FIG. 3. The exemplary operational flow 270 provides an additional assistance. After a start operation, and after the provide assistance operation 240 of FIG. 3, the exemplary operation 270 moves to a receive input operation 280. At the receive input operation 280, an input relating to the provide assistance operation 240 is received. The input may be received through any interface, including one or more of the user interfaces described in conjunction with the exemplary operational flow 200 and FIG. 3. In addition, the input may be received through an addition interface of the electronic device. The input relating to the provide assistance operation 240 may include a request for an additional assistance correlating to the assistance provided by the provide assistance operation 240. Alternatively, the input responsive to the provide assistance operation 240 may include a request that further correlates to the aspect of the device.

At a search operation 285, the assistance file is searched for another assistance response correlating to the input relating to the provide assistance operation 240. The assistance file may be searched in a manner substantially similar to the searching an assistance file at the search operation 230. At provide assistance operation 290, the another assistance is provided. The another assistance may be any type of assistance, including one or more of the types of assistance described above, and may include an interactive question and answer format, and a tutorial format. The exemplary operation 270 then moves to an end operation.

Figure 6:
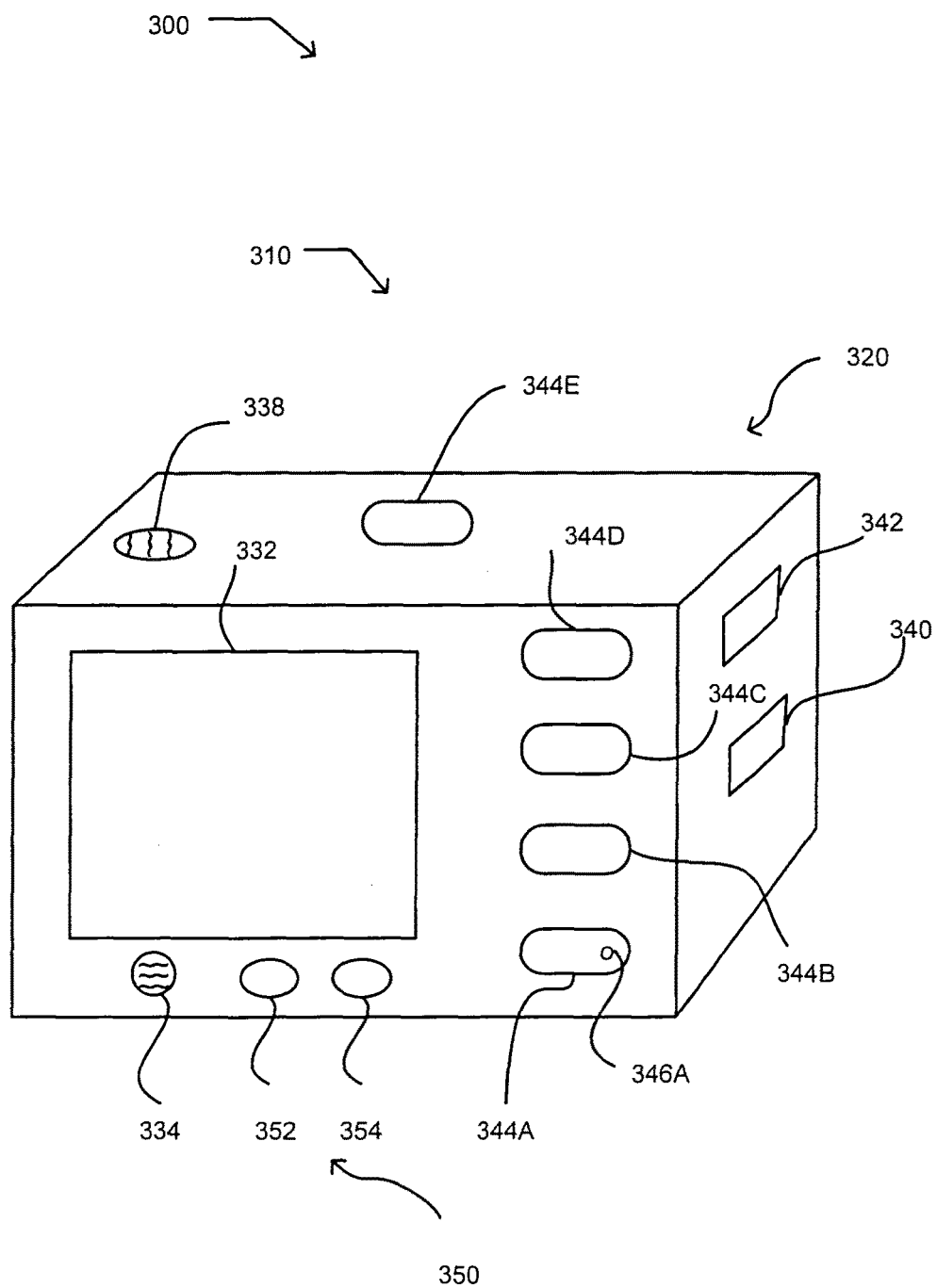
FIG. 6 illustrates an exemplary system in which embodiments may be implemented.

FIG. 6 illustrates an exemplary system 300 in which embodiments may be implemented. The system 300 includes a digital camera 310 having image capture and image storage functionality. The digital camera 310 includes a computing device (not shown), such as the thin computing device 20 described in conjunction with FIG. 1. The digital camera 310 also includes a plurality of interfaces 320. The plurality of interfaces 320 includes a display 332. In alternative embodiments, the display 332 may provide a textual, a visual display, and a graphical display. In a further embodiment, the display 332 may include touch screen functionality operable to accept a user input. The plurality of user interfaces 320 of the camera 310 also includes a microphone 334, a speaker 338, and a plurality of tangible buttons 344A-344E. One or more of the tangible buttons may include a light emitter, such as a light emitting device 346A. Further, one or more of the tangible buttons 344A-344E may include a vibrator operable to provide a tactile display. The display 332 and the tangible buttons 344A-344E may have any functionality appropriate to the digital camera. For example, button 344E may be assigned to operate a camera element, such as a shutter function. Button 344A may be assigned an "enter" function, and buttons 344B and 344C may be respectively assigned a scroll up and scroll down function relative to a menu displayed on the display 332. Button 344D may be assigned to operate another camera element, such as a lens zoom function. The digital camera 310 also includes context sensors 350, which may be selected, for example, to produce relevant information about an environment extrinsic to the digital camera. The context sensors 350 are illustrated as an external temperature sensor 352 and a light intensity sensor 354. The digital camera 310 further includes a USB port 340, and a network port 342.

The digital camera 310 also includes a system memory (not shown), such as the system memory 22 of the thin computing device 20 of FIG. 1. The system memory includes saved operating systems and programs necessary to operate the digital camera 310, and also includes an assistance manager operable to implement the operational flow 200 that provides assistance of FIG. 3. The system memory also includes an assistance file, which may be included in the assistance manager. The assistance file includes a body of assistance information intended to help a user in response to a plurality of user-selected requests related to the digital camera 310. The assistance manager and/or the assistance file may be provided by an original equipment manufacturer of the camera 310, or it may be provided by a third party.

The assistance manager includes operability to receive a query related to the digital camera 310 through an interface of the plurality of interfaces 320. For example, in an embodiment, detecting a user touch to the button 344D may be received as an instruction to activate the assistance manager, such as the assistance manager at operation number 210 of FIG. 3. Activation of the assistance manager transitions the user interfaces 320 to a first state. A detected subsequent user touch to another user interface of the plurality of user interfaces 320 may be received by the assistance manager a query related to the digital camera 310.

Alternatively, a detected subsequent user touch to another user interface of the plurality of user interfaces 320 may be received by the assistance manager as a selection corresponding to an aspect of the digital camera 310. The user touch may be detected by a user interface physically incorporated in the aspect of the digital camera 310 or proximate thereto.

In an alternative embodiment, the query may be received by detecting a signal responsive to a sound or voice received by the microphone 334. For example, a detection and recognition of a signal responsive to a spoken "help" command to the microphone 334 may be received as an instruction to activate the assistance manager. Further, a detection and recognition of a signal responsive to spoken words "shutter button" may be received by the assistance manager has a selection corresponding to an aspect of the digital camera 310.

The assistance manager includes operability to provide assistance, such as information, advice, guidance, and instructions, through at least one the plurality of interfaces 320 of the digital camera 310, such as the display 332, the tangible buttons 344A-344E, and the speaker 338. In an embodiment, the provided assistance may include any type of presentation, such as a visual presentation, an audio presentation, a spoken presentation, a tactile presentation, and a combination of two or more of the foregoing presentation modes. In another embodiment, the assistance file includes operability to provide interactive assistance with additional user inputs being received through the camera user interfaces 320.

An alternative embodiment implements the query operation 220 in two parts as described in conjunction with FIG. 4. Activation of the assistance manager transitions the user interfaces 320 to a first state. A detected subsequent user touch to another user interface of the plurality of user interfaces 320 may be received by the assistance manager as a received aspect selection operation 250, as described in conjunction with FIG. 4. On receiving the selection 250, the assistance manager transitions the user interfaces to a second state. A detected subsequent user touch to a user interface of the plurality of user interfaces 320 may be received as selection corresponding to an assistance request through the second user interface of the electronic device. For example, once the assistance manager transitions the user interfaces 320 to the second state, information may be displayed on the display 332 indicating assistance selections associated with the buttons 344A-344C. The buttons may be appropriately referenced by information displayed on the display 332, such as "show me," "demonstrate," and "guide me" respectively. A selection corresponding to an assistance request is received by the assistance manager as received selection corresponding to an assistance selection operation 260 as described in conjunction with FIG. 4.

In the above alternative environment, detection of a signal responsive to a sound or voice received by the microphone 334, the assistance selection operation 260 may be received by detection and recognition of a signal responsive to spoken commands received by the microphone, such as "show me," "demonstrate," and "guide me."

In operation of an embodiment, a user interested in receiving assistance related to the digital camera activates the assistance manager by a long touch to at least one interface of the plurality of interfaces 320. In this illustrative operation of an embodiment, the button 344D in a long-touch mode is designated as an assistance manager activation button. The assistance manager is activated in response to the button 344D receiving a long touch. The assistance manager transitions the buttons 344A-344E to a first state. The user inputs the selection corresponding to an aspect of the digital camera 310 by touching an interface associated with the aspect. For example, a user touch may be received at button 344E, the shutter button, by an interface normally associated with the shutter button. Because the assistance manager has been activated and the buttons are in a first state, the touch to the button 344E is received as an-input selection corresponding to an aspect of the digital camera, the shutter button. The assistance manager then transitions the buttons 344A-344E to a second state and displays a plurality of assistance requests which are visually associated with the buttons 344A-344C. The buttons 344A-344C may be appropriately reference by information displayed on the display 332, such as "show me," "demonstrate," and "guide me" respectively. The association may be by lead lines indicating a visual association between a respective word and their respective button. A user touch to one of the buttons 344A-344C is received by the assistance manager as a selection corresponding to an assistance request. For example, if the button 344A is visually associated with "demonstrate," a user touch detected at an interface associated with button 344A is received as a selection corresponding to an assistance request for a demonstration of the shutter button.

In an alternative embodiment, voice commands may be used to implement part or all of the operational flow 200 that provides assistance. Selections and inputs may be received from signals responsive to sounds and words detected by the microphone 334 and recognized. For example, the activation of the assistance manager program, the selection corresponding to an aspect of the digital camera 310, and the assistance request, may occur in response to a received sound, spoken word, and/or a spoken phrase. For example, a user may say "assistance manager" to activate the assistance manager, say "shutter button" as a selection corresponding to an aspect of the digital camera, and say "demonstration" as a selection corresponding to an assistance request.

The assistance manager searches the assistance file saved in the system memory of the thin computing device included in the digital camera 310 for an assistance correlating with the user-selected query for a demonstration of the shutter button. An assistance is provided correlating to the query through at least one interface of the plurality of interfaces 320.

The digital camera 310 provides assistance correlating to the user query through the user interfaces 320 of the digital camera. For example, the assistance may include providing in the display 332 a demonstrative visual presentation of the functions and capability of the shutter button 344E. The assistance may further include flashing the light emitter (not shown) associated with the shutter button 344E as appropriate to indicate when the shutter button should be pressed. The assistance may also provide a voice track through the speaker 338, the voice track may be coordinated with the visual presentation in the display 332 and flashing the light emitter associated with the shutter button 344E.

Figure 7:
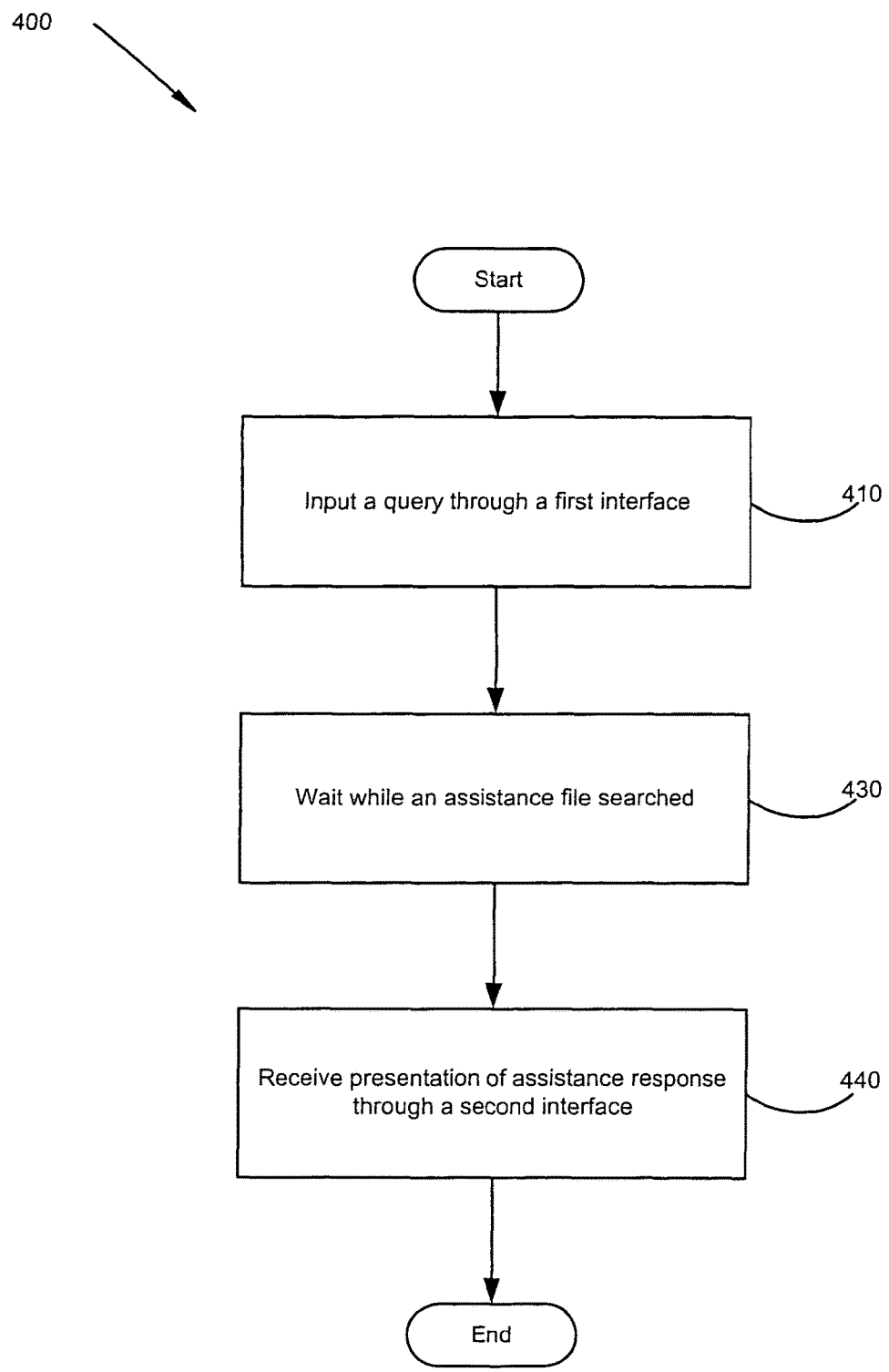
FIG. 7 is a flow diagram illustrating an exemplary operational flow that receives an assistance presentation.

FIG. 7 is a flow diagram illustrating an exemplary operational flow 400 that receives an assistance presentation. After a start operation, the operation moves to an input operation 410. At the input operation 410, a query related to an aspect of an electronic device is inputted through a first interface of the electronic device. The query may typically be inputted by a human user. At wait operation 430, an inputter waits while an assistance file is searched for an assistance response correlating to the input operation 410. At receive assistance operation 440, a presentation of the assistance response correlating to the query is received through a third interface of the electronic device.

At least one of the first and second interfaces may be user interfaces, and the first and second interfaces may be at least substantially similar. In an embodiment, and similar to the embodiment of the exemplary operational flow 200 that provides an assistance described in conjunction with FIG. 3, the first interface and the second interface may comprise a same physical or virtual device. The first and second interfaces may share a same physical or a same virtual device, but be separately activatable when the physical or virtual device is in a different activating mode or state.

Figure 8:
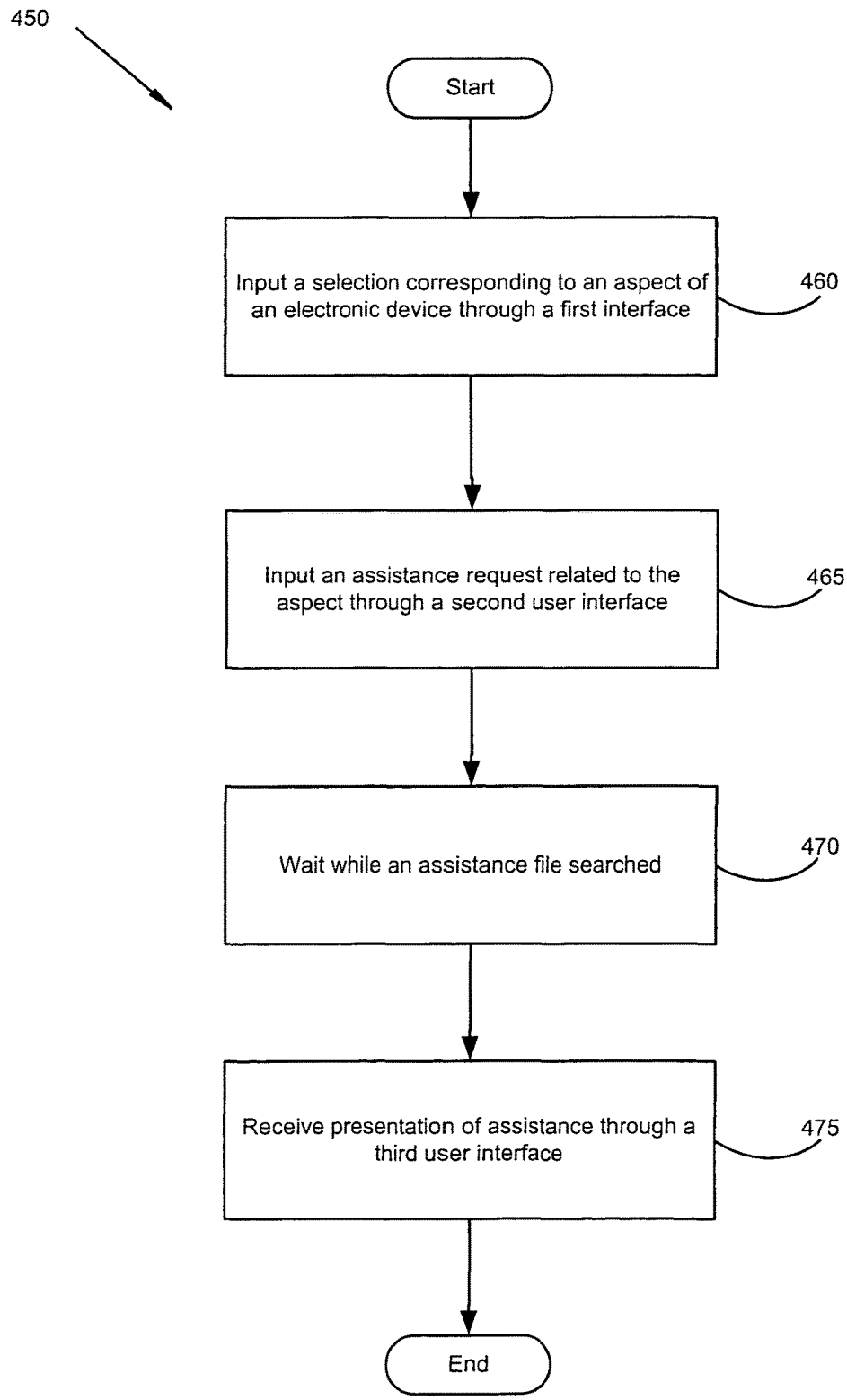
FIG. 8 is a flow diagram illustrating another exemplary operational flow that receives an assistance presentation.

FIG. 8 is a flow diagram illustrating an exemplary operational flow 450 that receives an assistance presentation. After a start operation, the operation moves to a selection operation 460. At selection operation 460, a selection corresponding an aspect of an electronic device is inputted through a first user interface associated with the electronic device. At request operation 465, an assistance request related to the aspect is inputted through a second user interface associated with the electronic device. The selection and request may typically be inputted by a human user. At wait operation 470, the inputter waits while an assistance file is searched for the assistance presentation correlating to the assistance request. At receive assistance operation 475, an assistance presentation correlating to the assistance request is received through a third user interface associated with the electronic device. The exemplary operational flow 450 then proceeds to an end operation.

Figure 9:
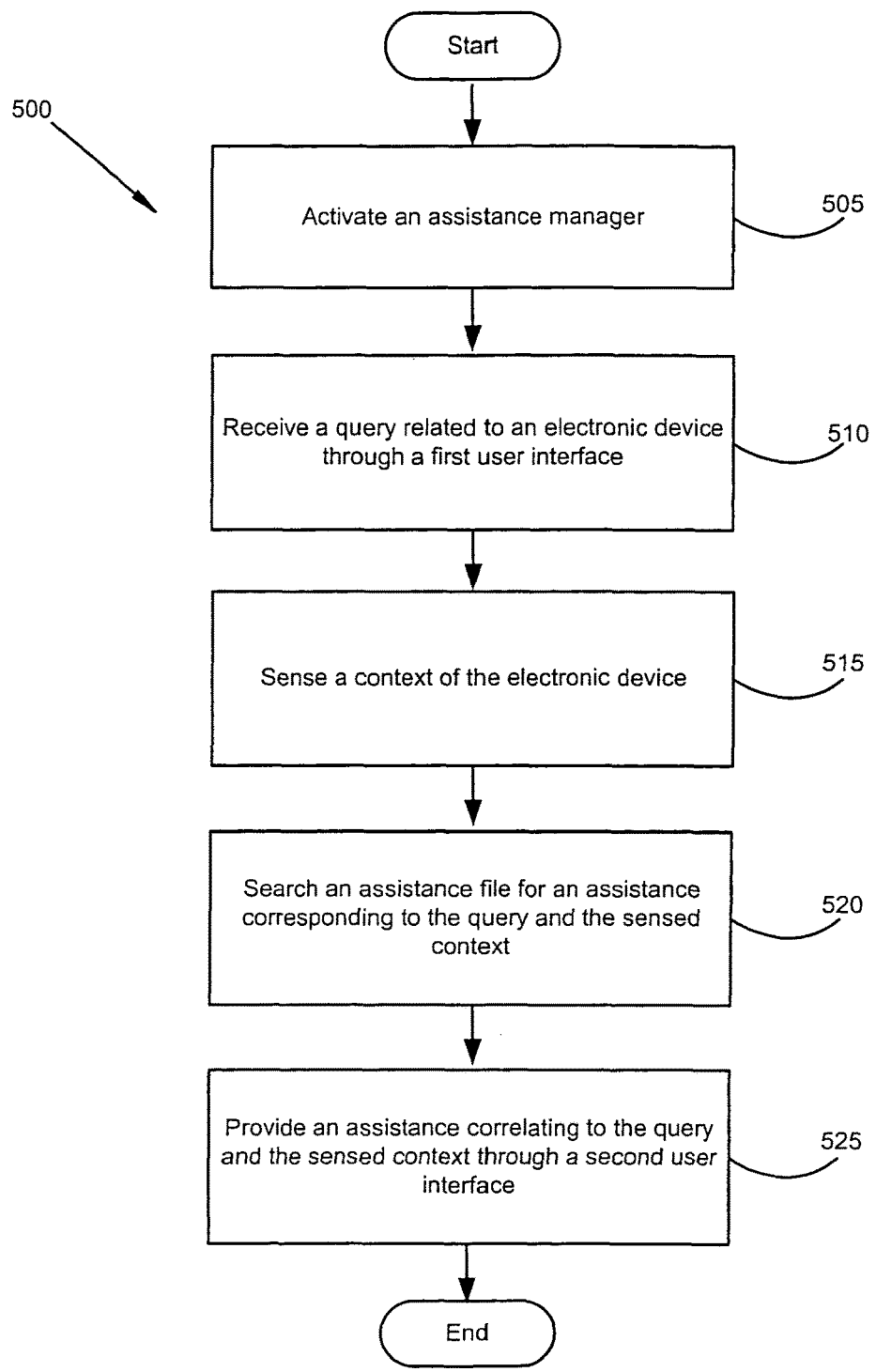
FIG. 9 is a flow diagram illustrating an exemplary operational flow that provides contextual assistance.

FIG. 9 is a flow diagram illustrating an exemplary operational flow 500 that provides contextual assistance. After a start operation, the operation moves to a help activation operation 505. At help activation operation 505, an assistance manager is activated. The assistance manager may include a circuit, a module, and/or instructions, such as computer-readable instructions, for example, a program, process, and/or application operating on an electronic device, that implement the exemplary operation 500 that provides assistance.

At query receive operation 510, a query related to an electronic device is received through a first user interface associated with the electronic device. In an embodiment, the first user interface may include a first user interface associated with an aspect of the electronic device. The association may include any form of association with the aspect of the electronic device, such as, for example, a physical association and a virtual association.

In a further embodiment, the first user interface may include a button. The button may include anything that accepts a user input expression. For example, the button may include a tangible button, and a virtual button. By way of further example, the receiving a selection of an aspect of the electronic device through a first user interface associated with the electronic device may include detecting a touch through a first user interface associated with the electronic device.

The query may be received in any manner through the first user interface. For example, the query may be received by detecting a touch to the first user interface, by detecting a sound through the first user interface, and/or by detecting a spoken word. The electronic device may include any type of electronic device. For example, an electronic device may include a computing device, a pervasive computing device, a limited resource computing device, and/or an electrical appliance. The query may include a query related to an aspect of the electronic device.

At context operation 515, a context of the electronic device is sensed. The sensed context may include any contextual parameter related to the electronic device. For example, the sensed context may include sensing a context extrinsic to the electronic device, an environment extrinsic to the electronic device, and/or a context intrinsic to the electronic device.

The intrinsic context may include any intrinsic context or state of the electronic device. For example, sensing a context intrinsic to the electronic device may include sensing a configuration context, a software context intrinsic to the electronic device, and/or a hardware context.

The query receive operation 510 may include receiving a query related to an electronic device and a sensed context of the electronic device. For example, a query may include a request for assistance correlating to taking a portrait where a sensed context at context operation 515 includes a sensed mountain background context.

At search operation 520, an assistance file is searched for an assistance correlating with the query and the sensed context. The assistance file may have any association with the electronic device. For example, the assistance file may be saved in a storage physically incorporated in the electronic device, a storage local to the electronic device, and saved in a storage accessible to the electronic device over a network.

At broadcast operation 525, an assistance correlating to the query and the sensed context is provided through a second user interface associated with the electronic device. The provided assistance may be any assistance correlating to both the query and the sensed context. For example, the provided assistance may include a guided response assistance, an interactive tutorial assistance, an assistance correlating with a physical element of the electronic device, a guidance correlating with a process associated with the electronic device, showing how an aspect of the device operates, and/or a description of an aspect of the electronic device. The provided assistance may be presented in any manner through the second user interface. For example, the provided assistance may include visually providing an assistance, such as blinking a light emitter associated with a physical element of the electronic device, or displaying text, graphics or pictures on a visual display associated with the electronic device. Further, the provided assistance may include audibly providing an assistance, such as a spoken assistance, and/or tactilely providing an assistance, such as by vibrating a physical element of the electronic device.

In an embodiment, the first user interface may include an element of the electronic device in a first state and the second user interface may include the element of the electronic device in a second state. In an alternative embodiment, the first user interface may include an element of the electronic device in a first mode and the second user interface may include the element of the electronic device in a second mode. The second user interface may include the first user interface.

The operational flow 500 then proceeds to an end operation.

In an embodiment, the exemplary operational flow 500 that provides contextual assistance may be considered to be an electronic device assistance manager. The assistance manager may be implemented in any combination of hardware, software, and/or firmware configured to effect the operational flow 500 that provides assistance, depending upon the design choices of the system designer. A farther embodiment includes a computer-readable media containing computer instructions which, when run on a computing device, cause the computing device to perform the operational flow 500 that provides assistance. The computer-readable media may include a computer storage media, which may be carried by a computer-readable carrier, such as a floppy disk. Alternatively, the computer-readable media may include a communications media.

The exemplary operational flow 500 that provides contextual assistance may be implemented in any device or item where enhanced contextual user assistance may be advantageously employed. For example, the exemplary operational flow 500 may be implemented in the system 300 described in conjunction with FIG. 6. The digital camera 310 of the system 300 includes context sensors 350, which are illustrated as the temperature sensor 352 and the light intensity sensor 354. In this example, the assistance manager includes operability to implement the exemplary operational flow 500. Continuing with the operational example described in conjunction with FIG. 6, a user interested in receiving assistance activates the assistance manager at help activation operation 505 by a long touch to the button 344D.

At query receive operation 510, the assistance manager operates in a manner similar to that described in conjunction with FIG. 6 for query operation 220 where a touch to the shutter button 344E is detected as a query. At context operation 515, the assistance manager operates to sense a context of the electronic device. In this example, the context is sensed through the external temperature sensor 352 and the light intensity sensor 354. If for example, the context of the digital camera 310 is a snowy environment on a sunny day, the external temperature sensor 352 would sense temperatures at or below freezing, and the light intensity sensor 354 would sense strong sunlight. By way of further example, if the context of the digital camera 310 is a tropical beach, the external temperature sensor 352 would sense a warm temperature and the light sensor 354 would sense bright sunlight. In another example, if the context of the digital camera 310 was indoors under incandescent lighting, the external temperature sensor 352 would sense a room temperature and the light sensor 354 would sense a light frequency pattern corresponding to incandescent lighting.

At the search operation 520, the assistance manager searches an assistance file for an assistance correlating to both the query related to the user selected shutter button 344E and the sensed context. Using the above example where the digital camera is in a snowy environment on a sunny day, the assistance manager program may search an assistance file for a user assistance correlating to selecting shutter speeds used in a bright sunlight and cold temperature environment.

At the broadcast operation 525, the assistance manager provides a user assistance correlating to the query and the sensed context through a second user interface of the digital camera 310. Using the above example of the snow scene, the provided assistance may include recommending a fast shutter speed. The provided assistance may include a recommendation to protect the camera lens from fogging in the cold environment. The second user interface may include any user interface associated with the electronic device, and may include a combination of two or more user interfaces. For example, in an embodiment, the second user interface includes a visual display. The visual display may include a visual display surface, such an liquid crystal display, and/or may include a light emitter, such as small light emitting diode incorporated in a physical button.

In a further embodiment, the query receive operation 510 may include receiving a query related to an electronic device and a sensed context of the electronic device. A context sensor may include a program operable to recognize certain extrinsic environments from images acquired through a lens of the digital camera 310. The assistance manage may receive an user query requesting assistance in taking a portrait in a context of "this background," and receive an image of "this background" resulting from the user capturing an image of "this background" through the lens of the digital camera 310. At the context operation 515, a recognition aspect of the assistance manager determines the context of "this background" from the user captured image. For example, if the recognition aspect of the assistance manager determines includes a mountain background, 515 includes a sensed mountain background context. Continuing with this embodiment, at the search operation 520, the assistance manager searches an assistance file for an assistance correlating to both the query related to the user selected shutter button 344E and the sensed extrinsic context acquired in response to a user action in capturing "this background" through the digital camera 310.

Figure 10:
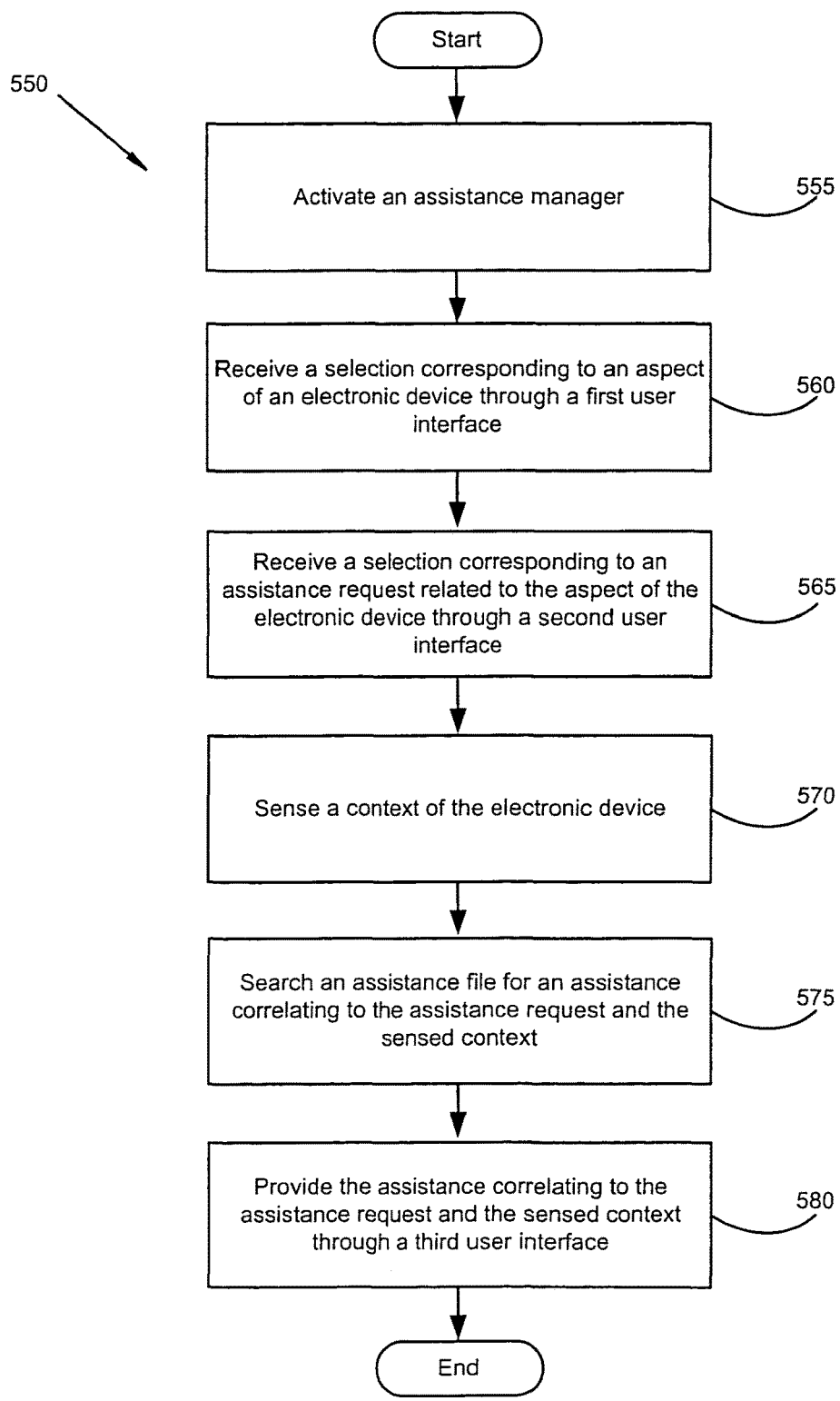
FIG. 10 is a flow diagram illustrating another exemplary operational flow that provides contextual assistance.

FIG. 10 is a flow diagram illustrating an exemplary operational flow 550 that provides contextual assistance. After a start operation, the operation moves to a help activation operation 555, where an assistance manager is activated. The assistance manager may include a circuit, a module, and/or instructions, such as computer-readable instructions, for example, a program, process, and/or application operating on an electronic device, that implement the exemplary operation 550 that provides assistance. At designation operation 560, a selection corresponding to an aspect of an electronic device is received through a first user interface of the electronic device. In an embodiment, the first user interface of the electronic device associated with the aspect. The selection corresponding to an aspect of an electronic device may be received through the first user interface in any manner. For example, the selection may be received by detecting a touch to the first user interface, and/or by detecting a sound through the first user interface, which may include detecting a spoken word.

At request operation 565, a selection corresponding to an assistance request related to the aspect of the electronic device is received through a second user interface of the electronic device. The first user interface and/or the second user interfaces may generally include any configuration, including configurations previously described. Several exemplary configurations are described in conjunction with the exemplary operational flows 200 and 270 of FIGS. 3 and 4 that provide assistance. The receiving a selection corresponding to an assistance request through a second user interface may generally be received in any manner, including any manner previously described that receives a selection through a user interface. In an alternative embodiment, the selection may include a selection corresponding to a predetermined assistance request related to the aspect of the electronic device. For example, predetermined assistance requests may include any request related to the electronic device, such as a group of "show me," "demonstrate," and "guide me." In this alternative embodiment, at request operation 565, a user selects at least one from among a group of predetermined assistance requests.

At context operation 570, a context of the electronic device is sensed. The context operation 570 may be substantially similar to the context operation 515 of the exemplary process 500 that provides an assistance described in conjunction with FIG. 9. At search operation 575, an assistance file is searched for an assistance correlating to the selection corresponding to an assistance request and the sensed context. The search operation 575 may be substantially similar to the search operation 520 of the exemplary process 500 that provides an assistance described in conjunction with FIG. 9.

At broadcast operation 580, the assistance correlating to the assistance request related to the aspect of the electronic device and the environmental context is provided through a third user interface of the electronic device. The broadcast operation 580 may be substantially similar to the help operation 525 of the exemplary process 500 that provides an assistance described in conjunction with FIG. 9. The three user interfaces may be related in any suitable, selected manner. For example, in an embodiment the first user interface includes an element of the electronic device in a first state, and the second user interface includes the element of the electronic device in a second state. In another embodiment, the first user interface includes an element of the electronic device in a first state, the second user interface includes the element of the electronic device in a second state, and the third user interface includes the element of the electronic device in a third state. In a further embodiment, one of the first user interface, the second user interface, and the third user interface includes an element of the electronic device in a first state, and another of the first user interface, the second user interface, and the third user interface include the element of the electronic device in a second state. In an embodiment, the first user interface includes an element of the electronic device in a first mode and the second user interface includes the element of the electronic device in a second mode. In another embodiment, the first user interface includes an element of the electronic device in a first mode, the second user interface includes the element of the electronic device in a second mode, and the third user interface includes the element of the electronic device in a third mode. In a further embodiment, one of the first user interface, the second user interface, and the third user interface include an element of the electronic device in a first mode, and another of the first user interface, the second user interface, and the third user interface include the element of the electronic device in a second mode.

In an alternative embodiment, the exemplary operational flow 550 that provides assistance further includes the exemplary operational flow 270, which provides additional assistance as described in conjunction with FIG. 3.

In an embodiment, the exemplary operational flow 550 that provides contextual assistance may be considered to be an electronic device assistance manager. The assistance manager may be implemented in any combination of hardware, software, and/or firmware configured to effect the operational flow 550 that provides assistance, depending upon the design choices of the system designer. A further embodiment includes a computer-readable media containing computer instructions which, when run on a computing device, cause the computing device to perform the operational flow 550 that provides assistance. The computer-readable media may include a computer storage media, which may be carried by a computer-readable carrier, such as a floppy disk. Alternatively, the computer-readable media may include a communications media.

The exemplary operational flow 550 that provides contextual assistance may be implemented in any device or item where enhanced contextual user assistance may be advantageously employed. For example, the exemplary operational flow 550 may be implemented in the system 300 described in conjunction with FIGS. 6 and 9.

Figure 11:
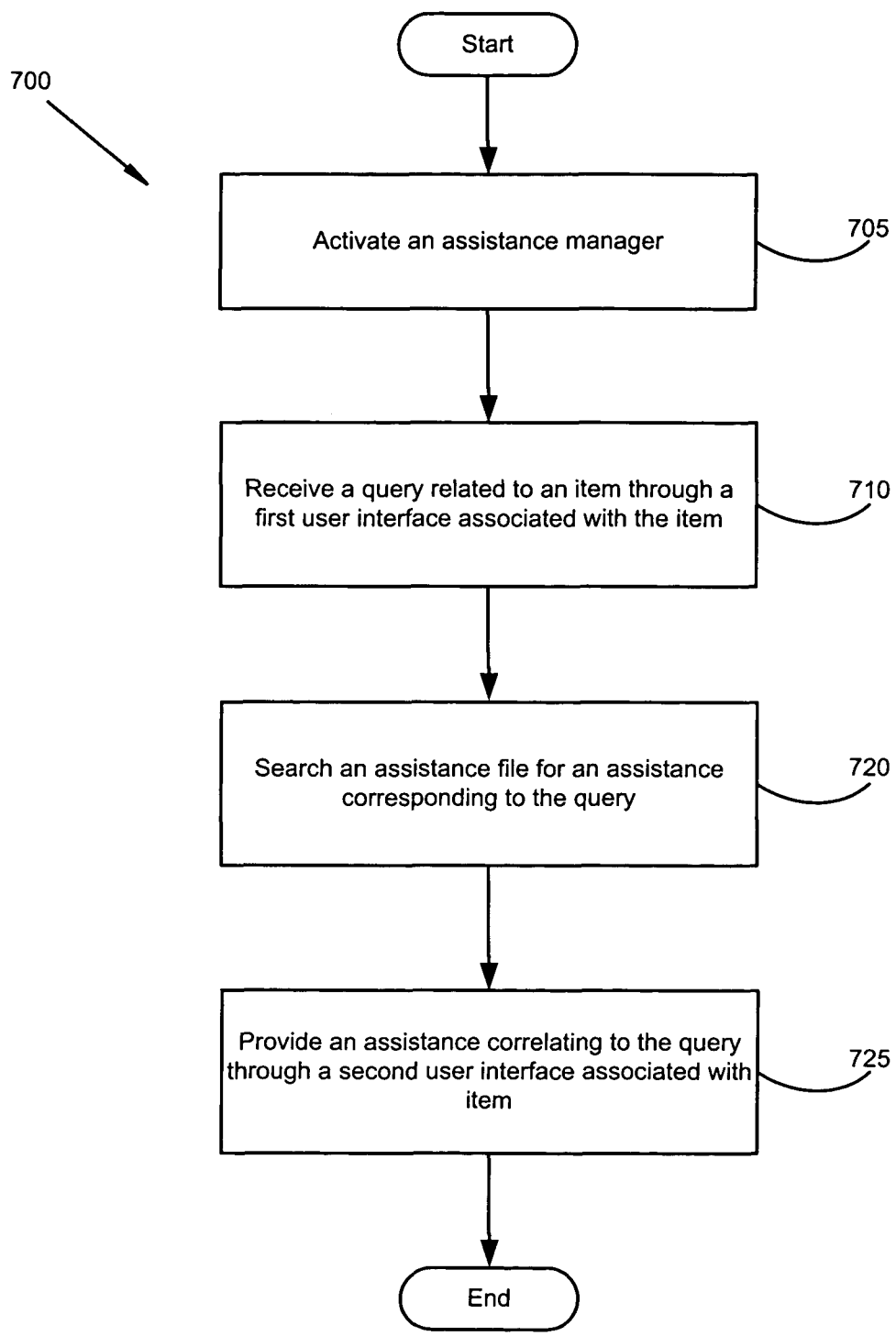
FIG. 11 is a flow diagram illustrating an exemplary operational flow that provides assistance.

FIG. 11 is a flow diagram illustrating an exemplary operational flow 700 that provides assistance. After a start operation, the operation moves to a help activation operation 705. At help activation operation 705, an assistance manager is activated.

At query operation 710, a query related to an item is received through a first user interface associated with the item. In an embodiment, the item includes a computing device. The first user interface may be further associated with the computing device. In an embodiment, the first user interface may include a first user interface associated with an aspect of the item. The association may include any form of association with the aspect of the item, such as, for example, a physical association and a virtual association.

The query may include a query related to an aspect of the item. The query may be received in any manner through the first user interface. For example, the query may be received by detecting a touch to the first user interface, by detecting a sound through the first user interface, and/or by detecting a spoken word.

In a further embodiment, the first user interface may include a button. The button may include anything that accepts a user input expression. For example, the button may include a tangible button, and a virtual button. By way of further example, the receiving a selection of an aspect of the item through a first user interface associated with the item may include detecting a touch through a first user interface associated with the item.

The item may include any type of item. For example, an embodiment may include a vehicle, such as an automobile, a boat, a ship, and/or an aircraft. By way of further example, other embodiments may include an appliance, such as a refrigerator, a stove, a microwave oven, and/or an HVAC system. By way of additional example, embodiments may include manufacturing equipment and/or processing equipment.

At search operation 720, an assistance file is searched for an assistance correlating with the query. The assistance file may have any association with the item. For example, in an embodiment, the assistance file may be saved in a digital storage physically incorporated in a computing device associated with the item.

At broadcast operation 725, an assistance correlating to the query is provided through a second user interface associated with the item. In an embodiment, the item includes a computing device, and the assistance correlating to the query may be provided through a second user interface associated with a computing device. The provided assistance may include any material and/or information that may be helpful to a user. For example, the provided assistance may include a guided response assistance, an interactive tutorial assistance, an assistance correlating with a physical element of the item, a guidance correlating with a process associated with the item, showing how an aspect of the device operates, and/or a description of an aspect of the item. The provided assistance may be presented in any manner through the second user interface. For example, the provided assistance may include visually providing an assistance, such as blinking a light emitter associated with a physical element of the item, or displaying text, graphics or pictures on a visual display associated with the item. Further, the provided assistance may include audibly providing an assistance, such as a spoken assistance, and/or tactilely providing an assistance, such as by vibrating a physical element of the item.

In an embodiment, the first user interface may include an element of the item in a first state and the second user interface may include the element of the item in a second state. In an alternative embodiment, the first user interface may include an element of the item in a first mode and the second user interface may include the element of the item in a second mode. The second user interface may include the first user interface.

The operational flow 700 then proceeds to an end operation.

In an embodiment, the exemplary operational flow 700 that provides assistance may be considered an assistance manager. The assistance manager may include a circuit, a module, and/or instructions, such as computer-readable instructions. For example, instructions may include a program, process, and/or application operating on a computing device that implement the exemplary operational flow 700 that provides assistance. The assistance manager may be implemented in any combination of hardware, software, and/or firmware configured to effect the operational flow 700 that provides assistance, depending upon the design choices of the system designer. A further embodiment includes a computer-readable media containing computer instructions which, when run on a computing device, cause the computing device to perform the operational flow 700 that provides assistance. The computer-readable media may include a computer storage media, which may be carried by a computer-readable carrier, such as a floppy disk. Alternatively, the computer-readable media may include a communications media.

Figure 12:
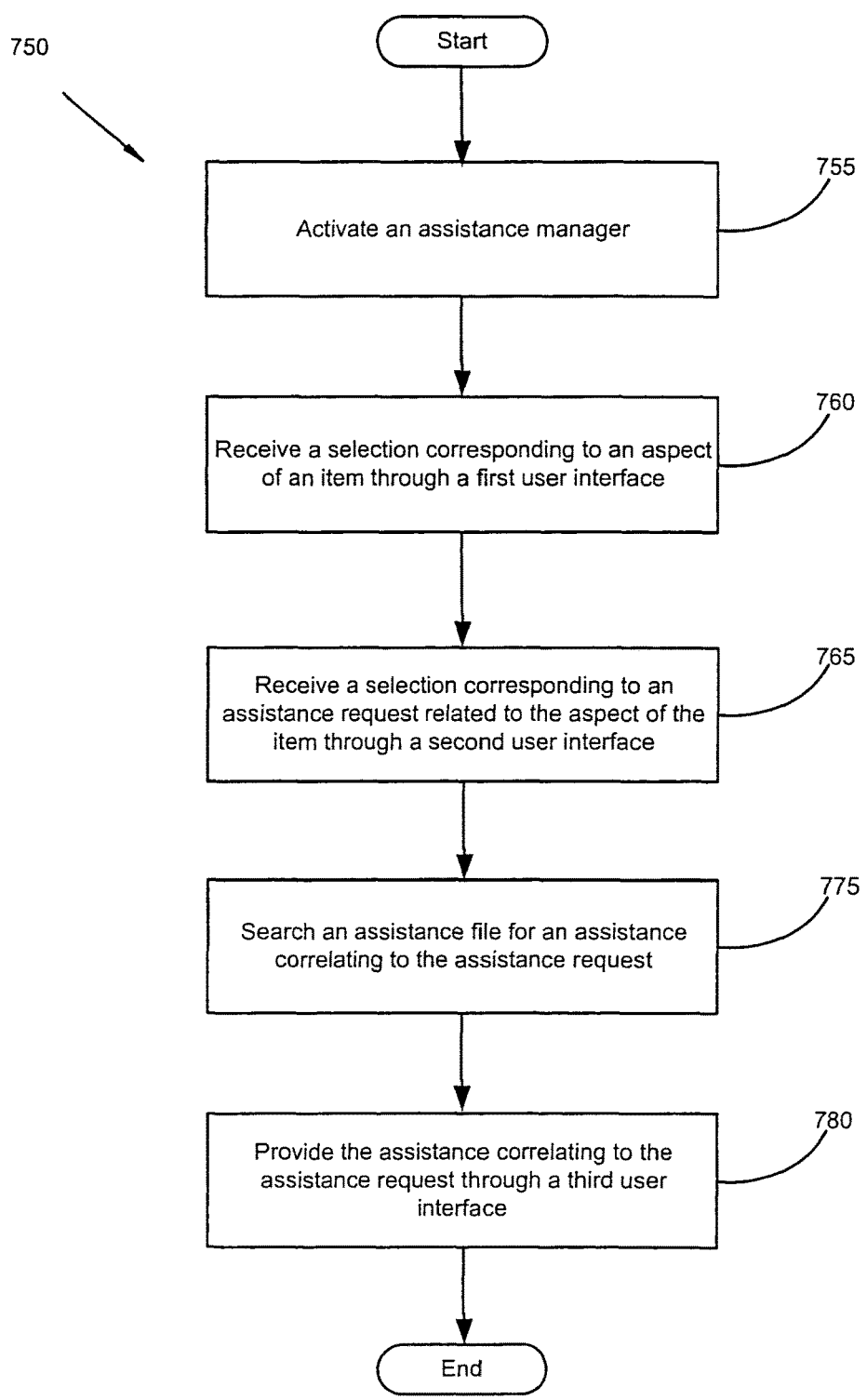
FIG. 12 is a flow diagram illustrating a further exemplary operational flow that provides assistance.

FIG. 12 is a flow diagram illustrating an exemplary operational flow 750 that provides assistance. After a start operation, the operation moves to a help activation operation 755, where an assistance manager is activated.

At a designation operation 760, a selection corresponding to an aspect of an item is received through a first user interface of the computing device. In an embodiment, the first user interface of the item may be associated with the aspect. In another embodiment, the item includes computing device and the aspect is associated with computing device. The selection corresponding to an aspect of an item may be received through the first user interface in any manner. For example, the selection may be received by detecting a touch to the first user interface, and/or by detecting a sound through the first user interface, which may include detecting a spoken word.

At request operation 765, a selection corresponding to an assistance request related to the aspect of the item is received through a second user interface of the item. The first user interface and/or the second user interface may generally include any configuration, including configurations previously described. Several exemplary configurations are described in conjunction with the exemplary operational flows 200 and 220 of FIGS. 3 and 4 that provide assistance. The receiving a selection corresponding to an assistance request through a second user interface may generally be received in any manner, including any manner previously described that receives a selection through a user interface. In an alternative embodiment, the selection may include a selection corresponding to a predetermined assistance request related to the aspect of the item. For example, predetermined assistance requests may include any request related to the item, such as a group of "show me," "demonstrate," and "guide me." In this alternative embodiment, at request operation 765, a user selects at least one from among a group of predetermined assistance requests.

At search operation 775, an assistance file is searched for an assistance correlating to the selection corresponding to the assistance request received at request operation 765. The search operation 775 may be substantially similar to the search operation 720 of the exemplary operational flow 700 that provides an assistance described in conjunction with FIG. 11.

At broadcast operation 780, the assistance correlating to the assistance request related to the aspect of the item is provided through a third user interface of the item. The broadcast operation 780 may be substantially similar to the broadcast operation 725 of the exemplary operational flow 700 that provides an assistance described in conjunction with FIG. 11. The three user interfaces may be related in any suitable, selected manner. For example, in an embodiment the first user interface includes an element of the item in a first state, and the second user interface includes the element of the item in a second state. In another embodiment, the first user interface includes an element of the item in a first state, the second user interface includes the element of the item in a second state, and the third user interface includes the element of the item in a third state. In a further embodiment, one of the first user interface, the second user interface, and the third user interface includes an element of the item in a first state, and another of the first user interface, the second user interface, and the third user interface include the element of the item in a second state. In an embodiment, the first user interface includes an element of the item in a first mode and the second user interface includes the element of the item in a second mode. In another embodiment, the first user interface includes an element of the item in a first mode, the second user interface includes the element of the item in a second mode, and the third user interface includes the element of the item in a third mode. In a further embodiment, one of the first user interface, the second user interface, and the third user interface include an element of the item in a first mode, and another of the first user interface, the second user interface, and the third user interface include the element of the item in a second mode.

In an alternative embodiment, the exemplary operational flow 750 that provides assistance may further include the exemplary operation 270, which provides additional assistance as described in conjunction with FIG. 5.

In an embodiment, the exemplary operational flow 750 that provides assistance may be considered an assistance manager. The assistance manager may include a circuit, a module, and/or instructions, such as computer-readable instructions. For example, instructions may include computer-readable instructions, such as, a program, process, and/or application operating on a computing device of an item that implements the exemplary operational flow 750 that provides assistance. The assistance manager may be implemented in any combination of hardware, software, and/or firmware configured to effect the operational flow 750 that provides assistance, depending upon the design choices of the system designer. A further embodiment includes a computer-readable media containing computer instructions which, when run on a computing device, cause the computing device to perform the operational flow 750 that provides assistance. The computer-readable media may include a computer storage media, which may be carried by a computer-readable carrier, such as a floppy disk. Alternatively, the computer-readable media may include a communications media. The exemplary operational flow 750 that provides assistance may be implemented in any item where enhanced user assistance may be advantageously employed.

Figure 13:
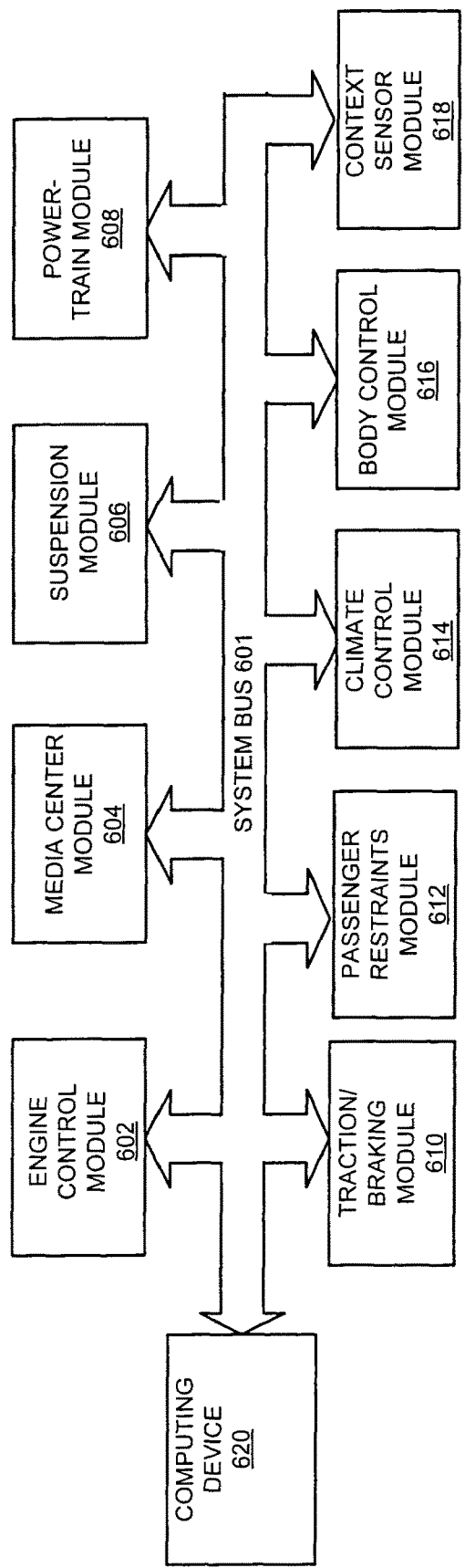
FIG. 13 illustrates an exemplary system in which embodiments of the exemplary operational flow illustrated in FIGS. 11 and 14 that provide assistance may be implemented.

FIG. 13 illustrates an exemplary system 600 representative of an item in which embodiments, such as the exemplary operational flow 700 and the exemplary operational flow 750, may be implemented. The exemplary system 600 of FIG. 13 illustrates a vehicular environment, such as an automobile, and/or a truck. The exemplary system 600 includes an engine control module 602, a media center module 604, a suspension module 606, a power train module 608, the traction/braking module 610, a passenger restraint module 612, a climate control module 614, a body control module 616, and a context sensor module 618. These modules are representative of any module or modules that may be used in a vehicular environment. One or more of these modules may have one or more user interfaces available to a driver, a passenger, and/or a service person. The exemplary system 600 also includes a computing device 620. The modules 602-618 and the computing device 620 are coupled by a system bus 601.

Figure 14:
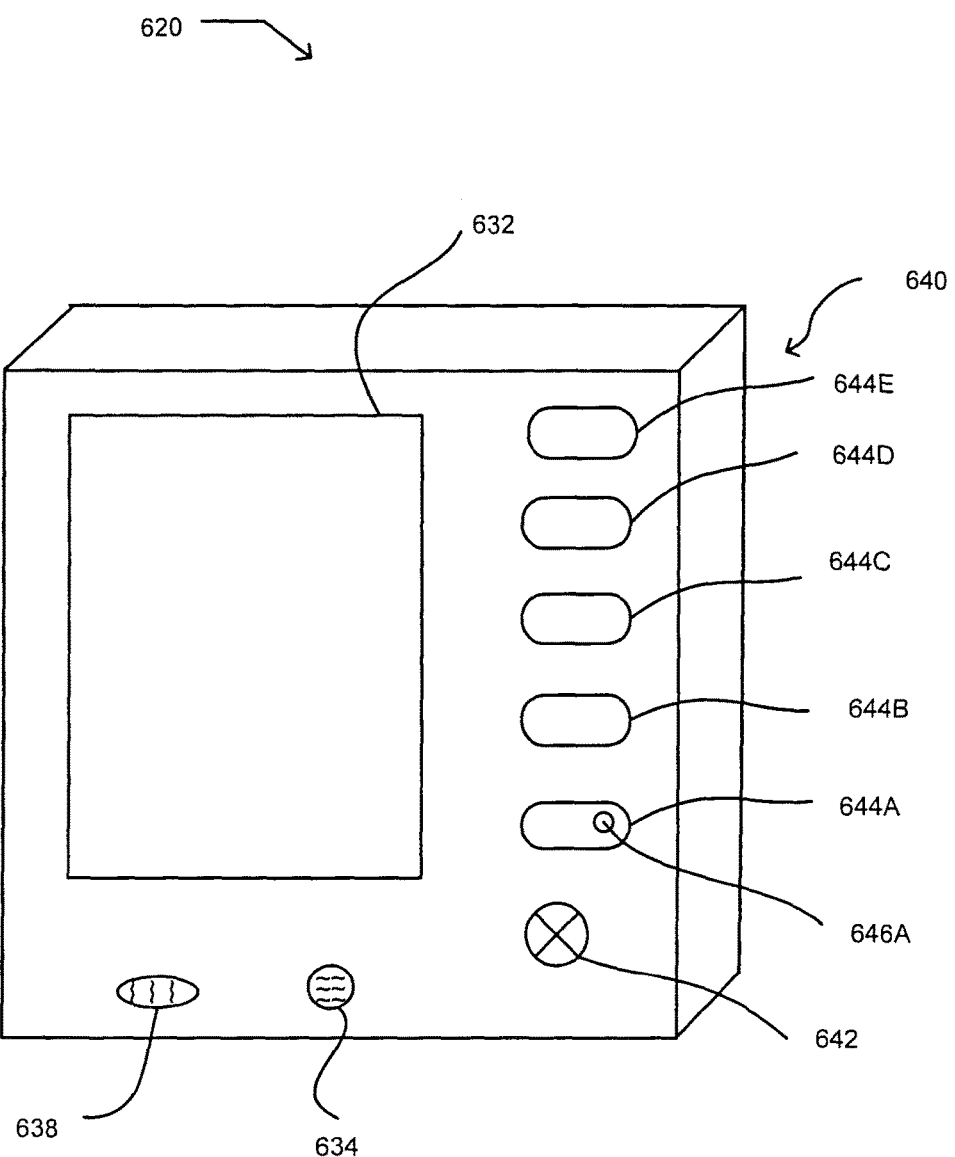
FIG. 14 illustrates user interfaces of the exemplary embodiment of the computing device of the exemplary system illustrated in FIG. 13.

FIG. 14 illustrates user interfaces 640 of an exemplary embodiment of the computing device 620 of the exemplary system 600. The computing device 620 may be any type of computing device. For example, the computing device 620 may include the thin computing device 20 described in conjunction with FIG. 1, and/or the computing device 100 described in conjunction with FIG. 2. In an alternative embodiment, the computing device 620 may be implemented as a part of another module, for example, such as the media center module 604.

The computing device 620 includes the plurality of user interfaces 640. The plurality of user interfaces 640 may include any number and type of interfaces. As illustrated in FIG. 14, an embodiment of the plurality of interfaces 640 includes a display 632. The display 632 may provide a textual, a visual display, and/or a graphical display. In a further embodiment, the display 632 may include touch screen functionality operable to accept a user input. Also as illustrated in FIG. 14, an embodiment of the plurality of user interfaces 640 also includes a microphone 634, a speaker 638, and a plurality of tangible buttons 644A-644E. One or more of the tangible buttons may include a light emitter, such as a light emitting device 646A. Further, one or more of the tangible buttons 644A-644E may include a vibrator operable to provide a tactile and/or audible display. The display 632 and the tangible buttons 644A-644E may have any functionality appropriate to the system 600. The user interface 640 also includes a cursor control 642 providing user navigation on the display 632. The computing device 620 may also include context sensors (not shown), which may be selected, for example, to produce relevant information about an environment extrinsic and/or intrinsic to the system 600. The computing device 620 may further include a USB port and a network port (not shown).

The computing device 620 also includes a system memory (not shown), such as the system memory 22 of the thin computing device 20 of FIG. 1. The system memory includes saved operating systems and programs necessary to operate the computing device 620, and also includes an assistance manager operable to implement operations that provide assistance, such as the exemplary operational flows 700 and 750 described in conjunction with FIGS. 11 and 12 respectively. In an embodiment, the system memory may also include saved operating systems and programs necessary to operate and/or interface with one or more of the modules of the system 600. For example, the system memory may include a program allowing user input to the suspension module 606 through one or more interfaces of the computing devices 620.

The system memory also includes an assistance file, which may be included in the assistance manager. The assistance file includes a body of assistance information intended to help a user in response to a plurality of user-selected requests related to the item, illustrated as the exemplary system 600. The assistance manager and/or the assistance file may be provided by an original equipment manufacturer of the exemplary system 600, or it may be provided by a third party.

The assistance manager includes operability to receive a query related to the system 600 through one or more user interfaces. The user interfaces of the system may include one or more user interfaces associated with one or more of the modules 602-618, and the plurality of user interfaces 640 associated with computing device 620.

For example, in an embodiment implementing a query operation, such as the operational flow 700 of FIG. 11, a user touch detected to the button 644E may be received as an instruction to activate the assistance manager, such as the assistance manager at operation 705 of FIG. 11. Activation of the assistance manager transitions the user interfaces 640 of the computing device 620 and/or one or more user interfaces of the modules 602-620 of the system 600, to a first state. When the user interfaces are in the first state, a detected user touch to a user interface of the plurality of user interfaces 640 and/or another of the modules 602-618 of the system 600, is received by the assistance manager as query related to the system 600.

In an alternative embodiment, the query may be received by detecting a signal responsive to a sound or voice received by the microphone 634. For example, a detection and recognition of a signal responsive to a spoken "help" command to the microphone 634 may be received as an instruction to activate the assistance manager. Further, a detection and recognition of a signal responsive to spoken words "traction control" may be received by the assistance manager as a query corresponding to the traction control module 610 aspect of the system 600.

The assistance manager includes operability to search an assistance file for an assistance corresponding to the query as previously described. The assistance manager further includes operability to provide assistance, such as information, advice, guidance, and instructions. The assistance may be provided through at least one of the plurality of interfaces 640 of the computing device 620, and/or at least one user interface associated with one or more of the modules 602-618. For example, the assistance may be provided through user interfaces of the computing device 620, such as the display 632, the tangible buttons 644A-644E, and the speaker 638. By way of further example, the assistance may be provided through a user interface associated with a module, such as the climate control module 614. Using the climate control module 614 as an illustrative example, an assistance may be provided by blinking a light associated with a user button on a console associated with the climate control system and the climate control module 614. In an embodiment, the provided assistance may include any type of presentation, such as a visual presentation, an audio presentation, a spoken presentation, a tactile presentation, and a combination of two or more of the foregoing presentation modes. In another embodiment, the assistance file includes operability to provide interactive assistance with additional user inputs being received through the user interfaces 640.

An alternative embodiment implements a two-part query operational flow, such as the operational flow 750 providing assistance described in conjunction with FIG. 12. Activation of the assistance manager transitions the user interfaces 640 of the computing device 620 and/or the system 600 to a first state. When in the first state, a detected touch to a user interface is received by the assistance manager as a received aspect selection operation 760, as described in conjunction with FIG. 12. On receiving the selection at the operation 760, the assistance manager transitions the user interfaces to a second state. When in the second state, a detected user touch to a user interface is received as selection corresponding to an assistance request 765, as described in conjunction with FIG. 12. In a further embodiment, for example, after the assistance manager transitions the user interfaces to the second state, information may be displayed on the display 632 indicating predetermined assistance selections associated with the buttons 644A-644E. In this example, three of the buttons may be appropriately referenced by information displayed on the display 632, such as "show me," "demonstrate," and "guide me" respectively. A selection corresponding to an assistance request is received by the assistance manager as a received selection corresponding to an assistance request operation 765 as described in conjunction with FIG. 12.

In an alternative embodiment of the assistance request operation 765, the assistance selection may be received by detecting a signal responsive to a sound or voice received by the microphone 634. The signal responsive is recognized and received as a selection corresponding to an assistance request at the assistance election operation 765. For example, a signal responsive to spoken commands, such as "show me," "demonstrate," and "guide me" may be recognized at the operation 765 as a selection corresponding to an assistance request embodied in a plain meaning of those words.

The assistance manager includes operability to search an assistance file for an assistance correlating to the query as previously described. The assistance manager further includes operability to provide assistance as previously described.

Figure 15:
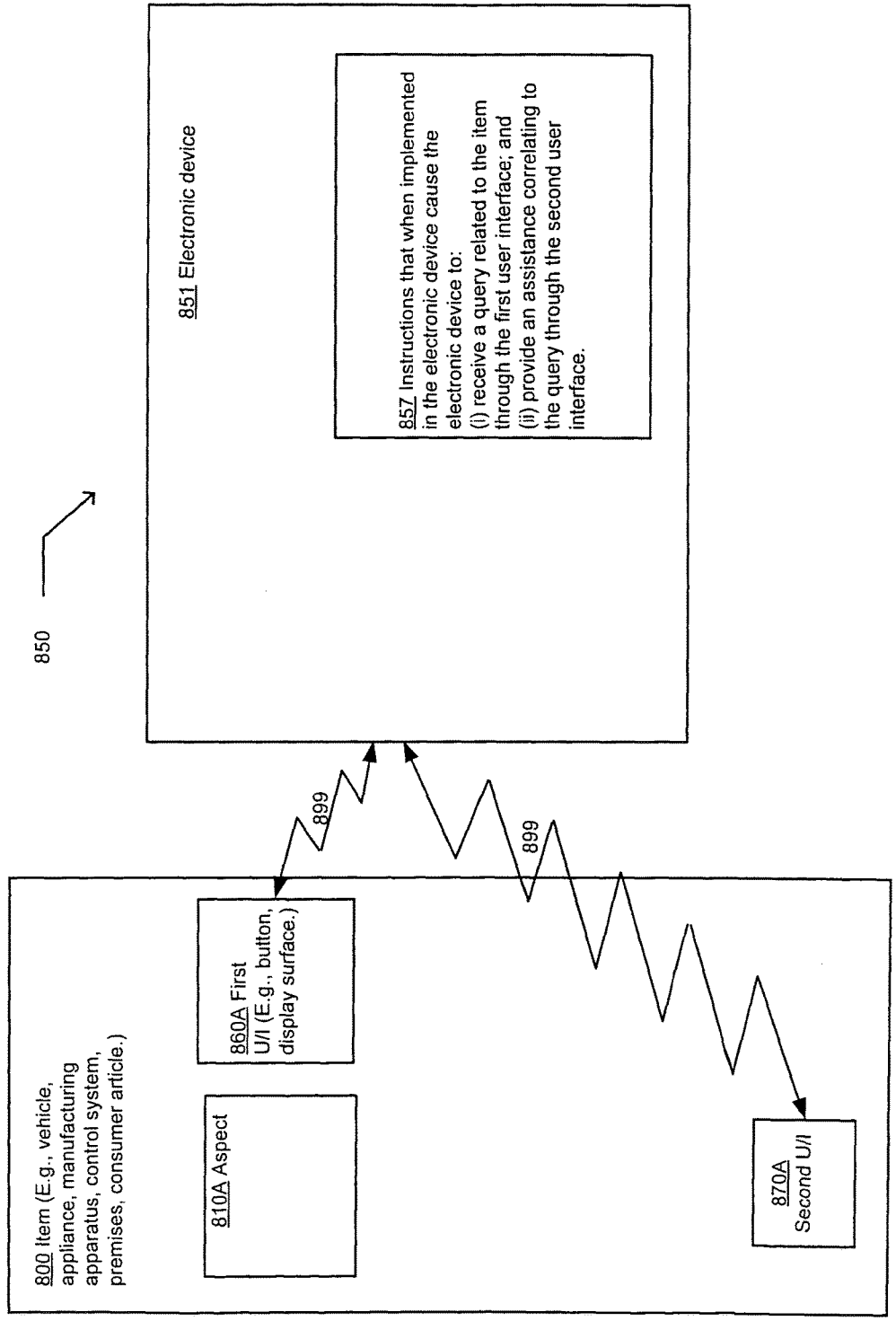
FIG. 15 illustrates a partial view of an exemplary apparatus 850 that may serve as an illustrative environment of and/or for subject matter technologies that provide user assistance for an item.

FIG. 15 illustrates a partial view of an exemplary apparatus 850 that may serve as an illustrative environment of and/or for subject matter technologies that provide user assistance for an item, illustrated as an item 800. The apparatus 850 is distinct from the item and includes an electronic device 851. In certain embodiments, the apparatus 850 is distinct from the item 800 because no persistent physical coupling exists between them. In certain other embodiments, the apparatus 850 is distinct from the item 800 because a no signal is communicated between them with respect to providing user assistance. The electronic device 851 includes a first user interface 860A that is associatable with the item 800, and a second user interface 870A. The electronic device 851 also includes instructions 857 that when implemented in the electronic device cause the electronic device to receive a query related to the item through the first user interface 860A and provide an assistance correlating to the query through the second user interface 870A.

The first user interface 860A and/or the second user interface 870A may generally include any suitable configuration or operability states and modes, including any of those previously described. For example, the first user interface and/or the second user interface may include states and modes previously described in several exemplary configurations described in conjunction with exemplary operational flows 200, 220, and 750 of FIGS. 3, 4, and 12 respectively.

Figure 16:
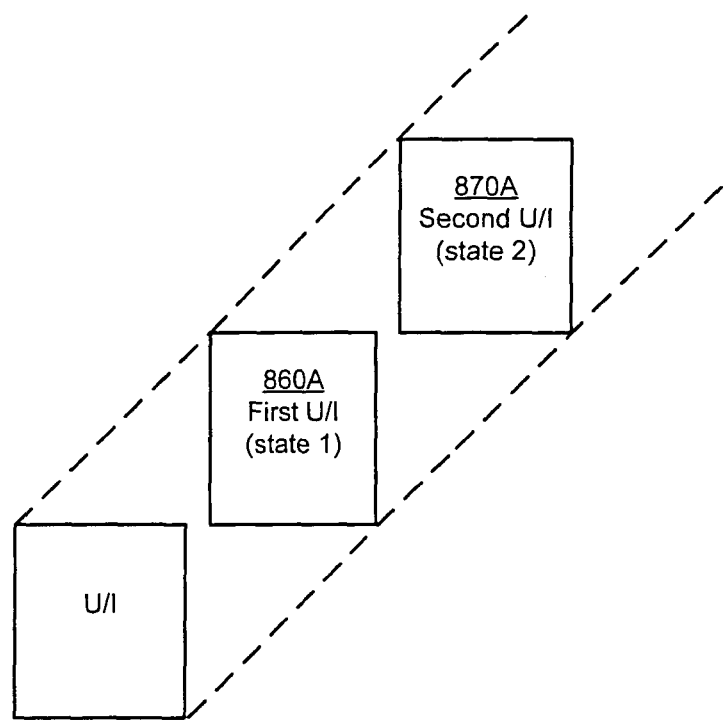
FIG. 16 illustrates an exemplary embodiments of states of a user interface U/I that may serve as an illustrative environment of and/or for subject matter technologies that provide user assistance for an item.

FIG. 16 illustrates an exemplary embodiment of states of a user interface U/I that may serve as an illustrative environment of and/or for subject matter technologies that provide user assistance for an item. The user interface U/I includes a plurality of states. In a pre-user assistance state, the user interface may have any function. If in an optional pre-assistance state, the user interface U/I transitions to a first state, which includes operability that receives a query related to the item 800. Using FIG. 15 as an example, the user interface U/I transitions to the first state, which is the first user interface 860A. After receiving a query through the user interface U/I while in the first state (first user interface 860A), the user interface transitions from the first state to a second state, which is the second user interface 870A. The second user interface 870A in the second state includes operability to provide an assistance.

Returning to FIG. 15, the first user interface 860A may be associatable with the item 800 in any manner. In an embodiment, the physical object of the apparatus 850 includes a configuration to be meaningfully associated with the item 800, and/or one or more aspects of the item, such as the aspect 810A. For example, the apparatus 850 may include a flexible, a semi-rigid, and/or a rigid structure physically mountable or associatable with the item 800. In certain embodiments, the association is physical, with the apparatus 850 being physically overlaid or applied to the item such that one or more receiving user interfaces of the apparatus are respectively proximate to and visually associable with the one or more aspects of the item. The apparatus 850 also includes one or more user interfaces, such as a visual display, a microphone, a speaker, and a plurality of tangible buttons which may be configured to be proximate to and associable with the one or more aspects of the item. In addition, one or more of the tangible buttons may include a light emitter, such as a light emitting device, and/or a vibrator operable to provide a tactile display.

In an embodiment, the first user interface 860A includes a first user interface physically associatable with the item 800. In another embodiment, the apparatus 850 include openings allowing the apparatus to be fitted proximate to aspects of the item 800, such as around knobs and around dials. The embodiment may include a configuration positioning the first user interface 860A proximate to one of the openings. For example, the first user interface 860A may be incorporated into a portion of the apparatus 850 associatable with the item 800, and proximate to an opening configured to frame the aspect 810A, thus operable to create a visual association between the first user interface 860A and the aspect 810A. In other embodiments, the association may include a logical association.

In another embodiment, the first user interface 860A may be associatable with the aspect 810A by a removable and/or releasable association with the aspect. For example, the removable association with the aspect 810A may include a releasable adhesive association, and/or a releasable magnetic association. The first user interface 860A may include a first user interface surface (not shown) associatable with the item 800. The first user interface 860A may include any type of user interface. For example, the first user interface 860A may include a touch receptive button associatable with an item. In an embodiment, the button may include a tangible button associatable with an item, and/or a virtual button associatable with an item. A virtual button associatable with an item may include a virtual button displayable on a display surface of the electronic device 851 that is associatable with the item 800.

The first user interface 860A and the second user interface 870A may be couplable with the electronic device 851 in any manner. FIG. 15 illustrates an embodiment including a wireless coupling 899. The wireless coupling 899 may include a radio frequency coupling, and/or an optical coupling. In an alternative embodiment, the first user interface 860A includes a first user interface electrically couplable with the electronic device (not shown).

The second user interface 870A may be associatable with the item 800 in any manner, including a matter of association similar to that described for the first user interface 860A. As with the first user interface 860A, the second user interface 870A maybe incorporated in an embodiment of the apparatus 850 that includes a structure physically mountable or associatable with the item 800. In an alternative embodiment, the user interface 870A may include a second user interface removably associatable with the item 800. In another embodiment, the second user interface 870A may be removably and physically associatable with the item 800. In a further embodiment, the second user interface may include a visual display, which may include a visual display surface. The visual display may include a light emitter. The second user interface 870A may include operability for a wired electrical coupling (not shown) and/or a wireless coupling 899 with the electronic device.

Figure 17:
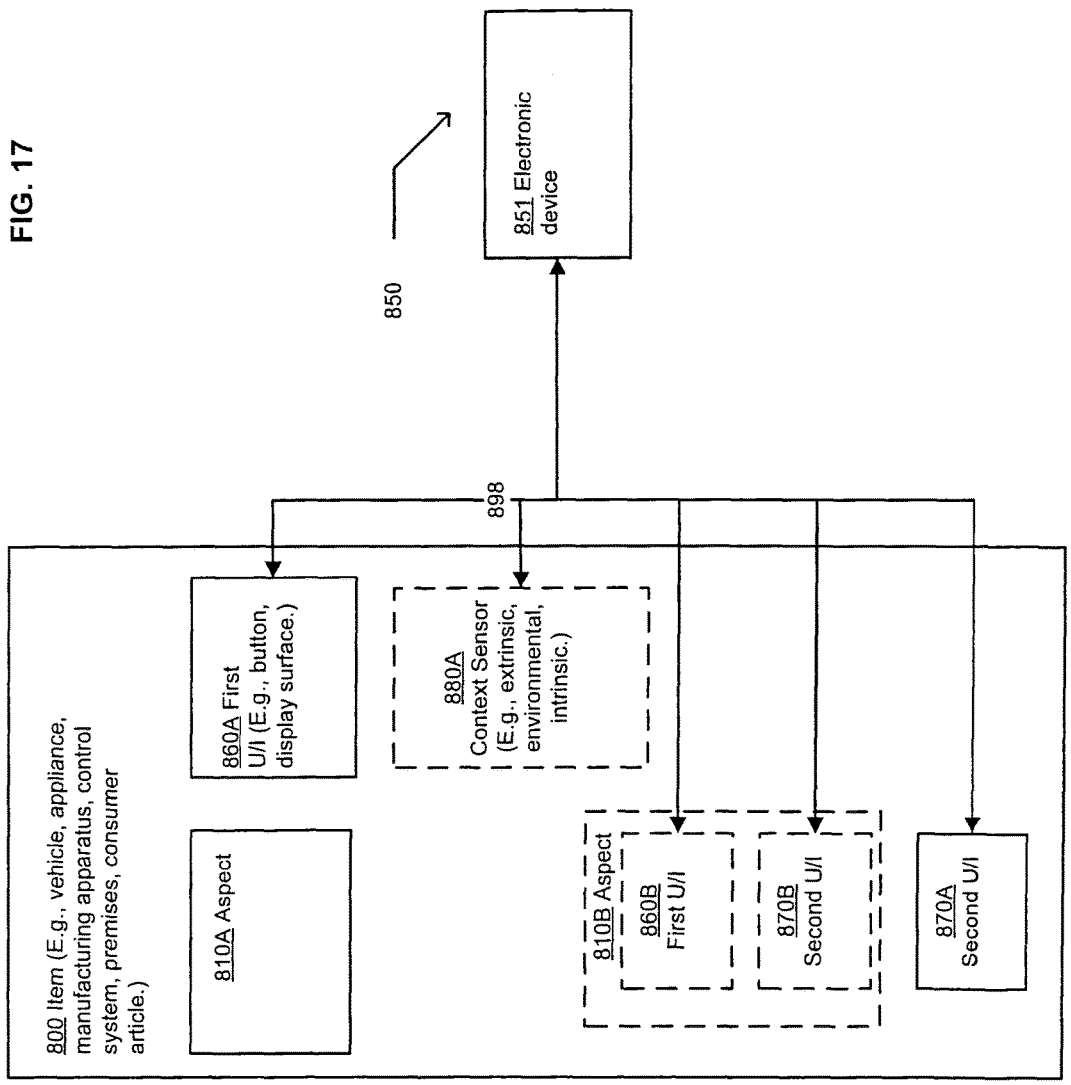
FIG. 17 illustrates an alternative embodiment of the apparatus of FIG. 16 that includes a first user interface and a second user interface both associatable with an aspect of the item.

FIG. 17 illustrates an alternative embodiment of the apparatus 850 of FIG. 15 that includes a first user interface 860B and a second user interface 870B both associatable with an aspect 810B of an item, illustrated as the item 800. In a further alternative embodiment, the second user interface 870B may include the first user interface 860B.

Also illustrated in FIG. 17 is an alternative embodiment of the electronic device 851 of FIG. 15 that includes an associatable context sensor 880A operable to sense a context of the item 800. The context sensor may include operability to sense a context of the item 800. For example, the context sensor 880A may include an operability to sense a context extrinsic to the item, an environment extrinsic to the item, and/or a context intrinsic to the item. In an alternative embodiment, the instructions 857 may further include an instruction to (iii) receive a context of the item from the context sensor; and wherein the instruction to (ii) provide an assistance correlating to the query includes provide an assistance correlating to the query and the context of the item (not shown).

The item 800 may include any type of item where user assistance may be advantageously employed. In an embodiment, the item 800 lacks operability to provide a desired level of user assistance for any reason. For example, the item 800 may be a "dumb item" completely lacking any operability to provide user assistance. In another embodiment, the item 800 may lack sufficient memory or computing power to provide a desired level or quality of user assistance. For example, the item 800 may include all or a part of a vehicle, an appliance, a manufacturing apparatus, a control system, a premises, a consumer article, and an HVAC system. Other examples of the item 800 may include all or a part of a complicated item or system, for example, such as is present in a manufacturing operation, in electrical transmission control grid, a soundboard of a recording studio, and in a planetarium.

A further embodiment relates to providing assistance with an item having one or more aspects for which assistance may be desired. The item includes the aspect 810A, which may be representative of any aspect of the item. For example, the aspect 810A may include a tangible element of the item 800, such as a button, a knob, a dial, and/or other tangible element visible to the user. By way of further example, the aspect 810A may include a program, a function, or other tangible or intangible element. In an embodiment, if the aspect 810A includes an intangible element or element not otherwise readily viewable to the user, the aspect may be representatively or virtually made viewable to the user. For example, the aspect may be made visible through an icon in a display screen for an iconic element or button portion of the item 800.

Further illustrated in FIG. 17 is an alternative embodiment of the apparatus 850 of FIG. 15. The electronic device 851 and at least one of the first user interface 860A, the first user interface 860B, the second user interface 870A, and the second user interface 870B may be electronically coupled with the apparatus through a wire connector coupling 898.

Figure 18:
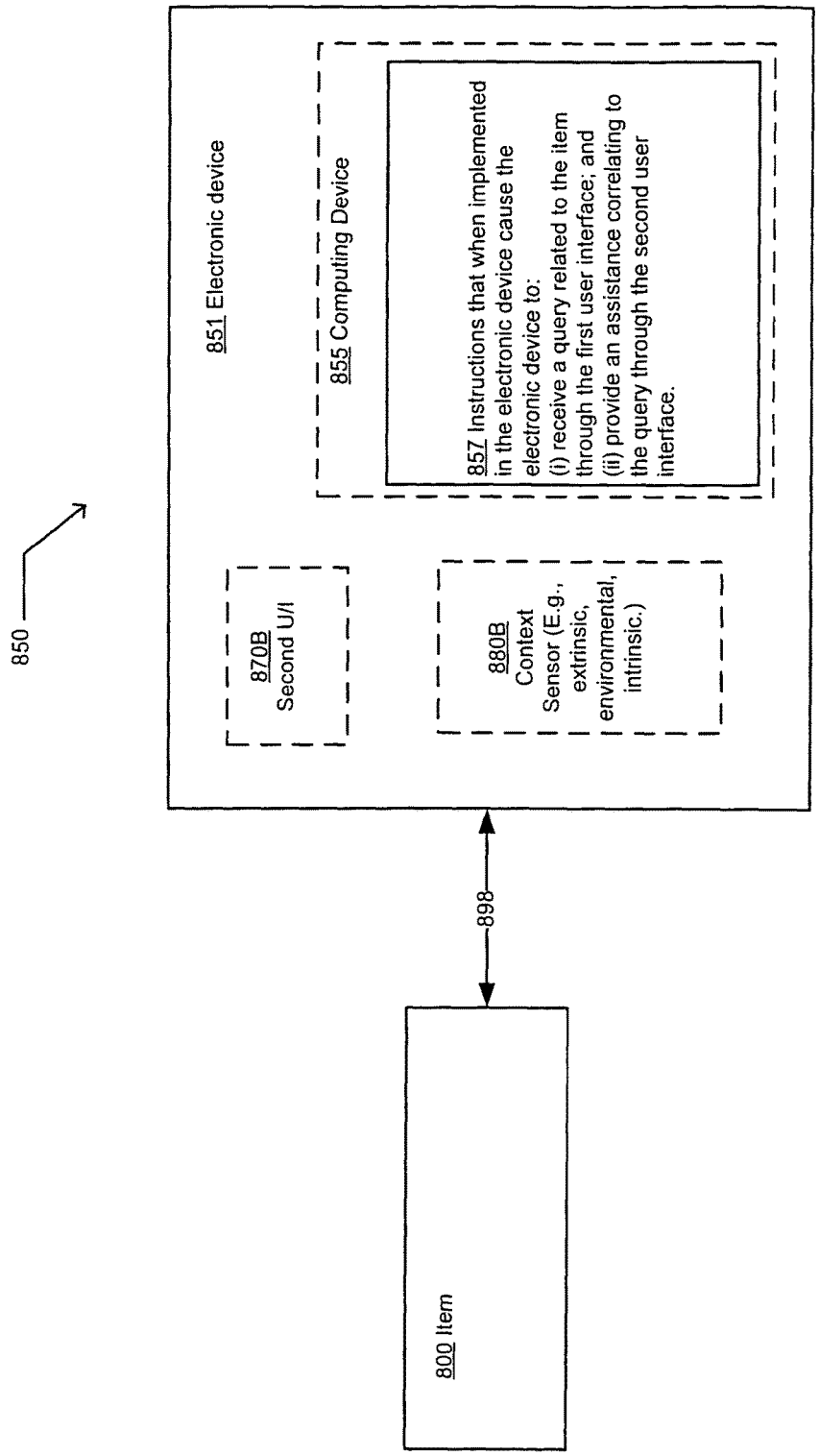
FIG. 18 illustrates an alternative embodiment of the apparatus of FIG. 15.

FIG. 18 illustrates an alternative embodiment of the apparatus 850 of FIG. 15. In this alternative embodiment, the electronic device 851 further includes a computing device 855. The computing device 855 may be any type of computing device suitable for providing user assistance. For example, the computing device 855 may include a thin computing device similar to the thin device 20 described in conjunction with FIG. 1. By way of further example, the computing device 855 may include a general-purpose computing device, such as the general-purpose computing device 100 described in conjunction with FIG. 2. In FIG. 18, the instructions 857 are saved in a computer-readable medium associated with the computing device 855. The alternative embodiment illustrated in FIG. 18 further includes a second user interface 870B incorporated in a portion of electronic device 851 not associated with the item 800. The alternative embodiment further includes a context sensor 880B also incorporated into portion of the electronic device 851 not associated with the item 800. The computing device 855 is further operably coupled to a first user interface, such as the first user interface 860A, and a second user interface, such as the second user interface 870A.

Following are a series of illustrations depicting implementations of processes. For ease of understanding, the illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. The style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 19:
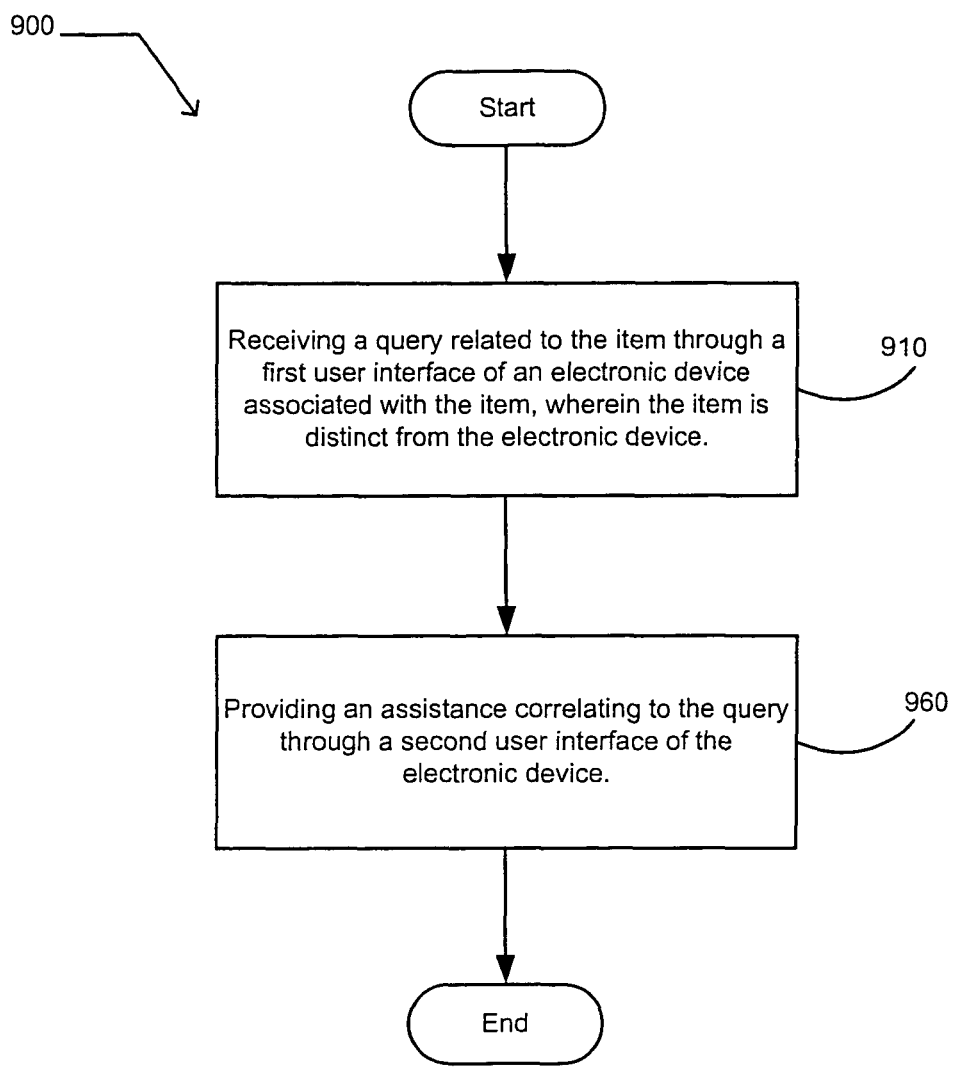
FIG. 19 illustrates an exemplary operational flow that provides user assistance for an item.

FIG. 19 illustrates an exemplary operational flow 900 that provides user assistance for an item. After a start operation, the operation moves to a reception operation 910 where a query related to the item is received through a first user interface of an electronic device associated with the item. The item is distinct from the electronic device. At a broadcast operation 960, an assistance correlating to the query is provided through a second user interface of the electronic device. As described in conjunction with FIG. 16, the first user interface may include an element in a first state and the second user interface may include the element in a second state. The first user interface may include an element of the electronic device in a first mode and the second user interface may include the element of the electronic device in a second mode. Further, the first user interface associated with the item may include a first user interface removably associated with the item. The operational flow 900 then proceeds to an end operation.

Figure 20:
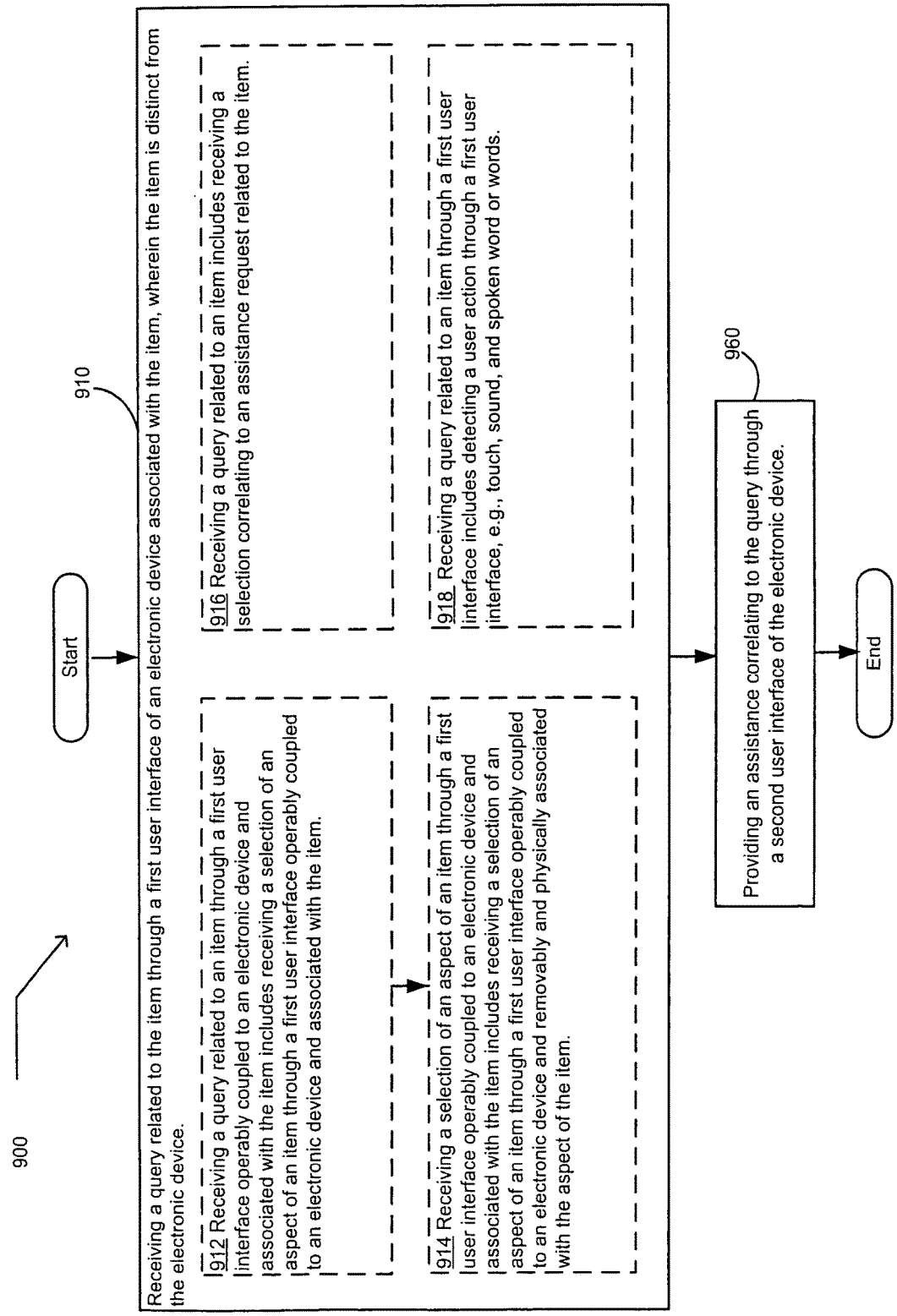
FIG. 20 illustrates an alternative embodiment of the exemplary operational flow of FIG. 19 that provides user assistance for an item.

FIG. 20 illustrates an alternative embodiment of the exemplary operational flow 900 of FIG. 19 that provides user assistance for an item. FIG. 20 illustrates an embodiment where the reception operation 910 may include at least one additional operation. Additional operations may include operation 912, operation 914, operation 916, and/or operation 918. For example, at operation 912, a selection of an aspect of an item is received through a first user interface operably coupled to the electronic device and associated with the item. At operation 914, a selection of an aspect of an item is received through a first user interface operably coupled to the electronic device and removably and physically associated with the aspect of the item. At operation 916, a selection correlating to an assistance request related to the item is received. At operation 918, the receiving a query related to an item through a first user interface may include detecting a user action through the first user interface. For example, a user action may be detected by detecting a touch, a sound, and/or a spoken word or words.

By way of further example, the item may include a vehicle and the reception operation 910 that receives a query may include receiving a query related to an aspect of the vehicle. In another example, the item may include an appliance and the reception operation 910 that receives a query may include receiving a query related to an aspect of the appliance. Further, the item may include a manufacturing apparatus and the reception operation 910 that receives a query may include receiving a query related the manufacturing apparatus. The item may include a control system and the reception operation 910 that receives a query may include receiving a query related to the control system.

Figure 21:
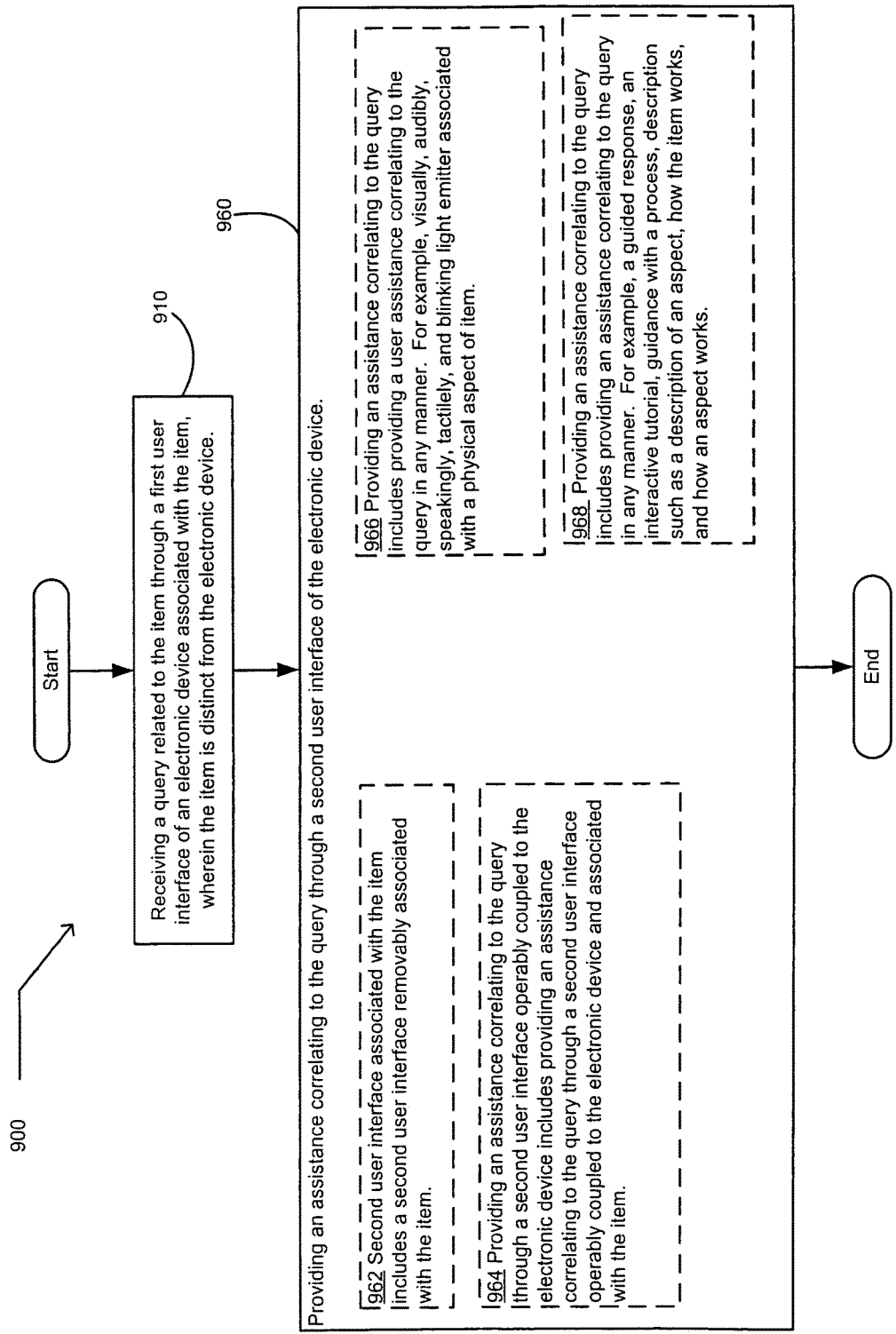
FIG. 21 illustrates an alternative embodiment of the exemplary operational flow of FIG. 19 that provides user assistance for an item.

FIG. 21 illustrates an alternative embodiment of the exemplary operational flow 900 of FIG. 19 that provides user assistance for an item. FIG. 21 illustrates an embodiment where the broadcast operation 960 may include may at least one additional operation. Additional operations may include operation 962, operation 964, operation 966, and/or operation 968. For example, at operation 962, the second user interface associated with the item may include a second user interface removably associated with the item. At operation 964, the providing an assistance correlating to the query through a second user interface operably coupled to the electronic device may include providing an assistance correlating to the query through a second user interface operably coupled to the electronic device and associated with the item. At operation 966, the providing an assistance correlating to the query may include providing a user assistance correlating to the query in any suitable manner. For example, the user assistance may be provided by visually providing an assistance correlating to the query, audibly providing an assistance correlating to the query, providing a spoken assistance correlating to the query, and/or tactilely providing an assistance correlating to the query. At operation 968, the providing an assistance may include providing a guided response assistance, providing an interactive tutorial assistance, providing an assistance correlating with a physical aspect of the item, blinking a light emitter associatable with the physical aspect, providing a guidance correlating with a process associated with the item, and/or providing a description of the item. The providing a description of an item may include providing a description of an aspect of the item. Additionally, the providing an assistance may include providing an assistance showing how the device operates, which may include providing an assistance showing how an aspect of the item operates.

Figure 22:
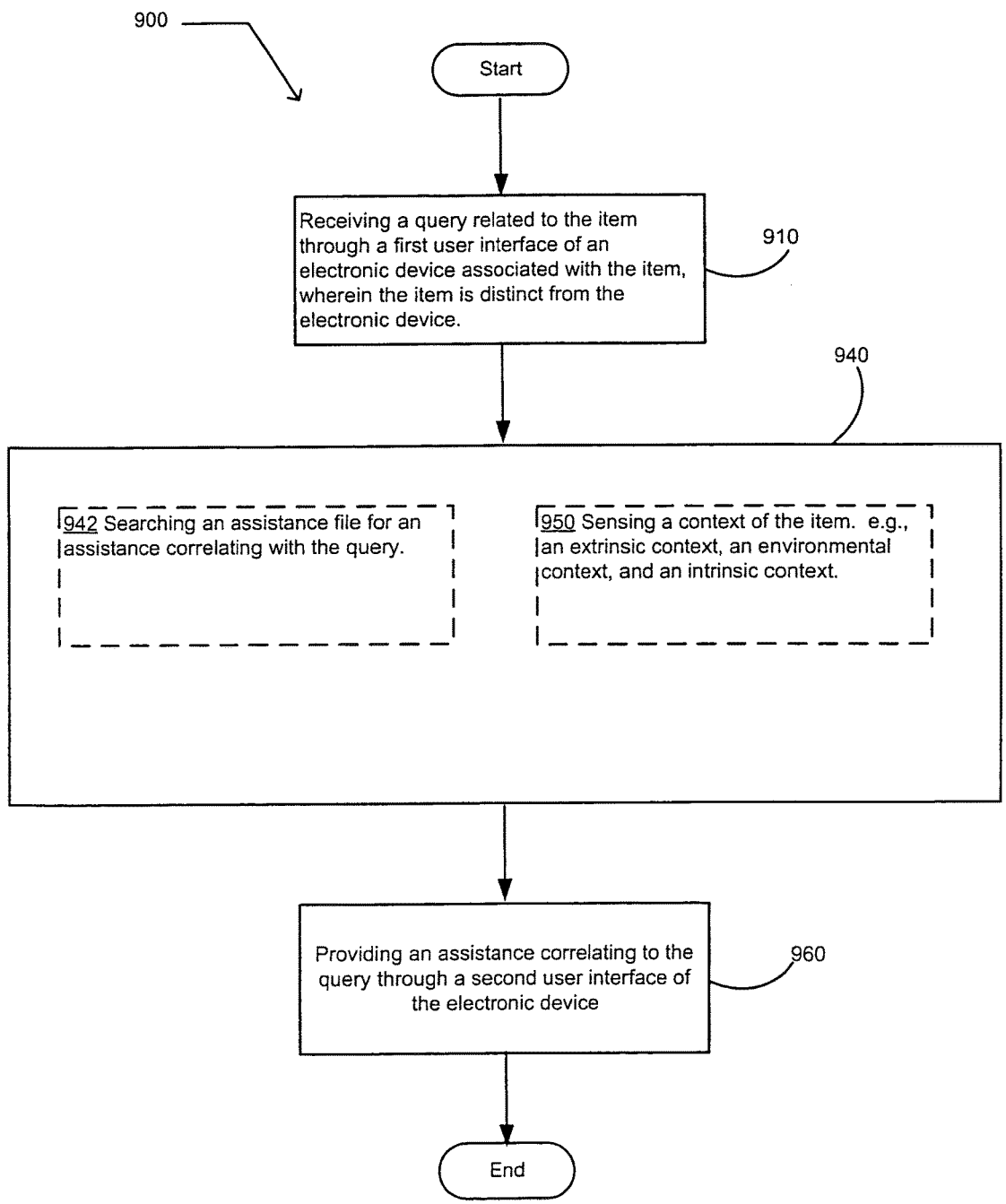
FIG. 22 illustrates an alternative embodiment of the exemplary operational flow of FIG. 19 that provides user assistance for an item.

FIG. 22 illustrates an alternative embodiment of the exemplary operational flow 900 of FIG. 19 that provides user assistance for an item. The alternative embodiment illustrated in FIG. 22 includes at least one additional operation 940. The additional operation 940 may include a search operation 942. At the search operation 942, an assistance file is searched for an assistance correlating with the query. The additional operation may include a context operation 950, where a context of the item is sensed. The context maybe sensed in a manner similar to context operation 515 of FIG. 9.

FIG. 23 illustrates a partial view of an exemplary computer-readable medium product 970 that may serve as an illustrative environment of and/or for subject matter technologies that provide user assistance for an item. The computer-readable medium product 972 includes computer-executable instructions 974. The computer-executable instructions include an operability that receives a query related to the item through a first user interface of an electronic device. The first user interface is associatable with the item, and the item is distinct from the electronic device. The computer-executable instructions 974 further include operability that provides an assistance correlating to the query through a second user interface of the electronic device. The computer-readable medium product may include a computer storage medium product, which may be carried by a computer-readable carrier. The computer-readable medium product may include a communications medium product.

Figure 24:
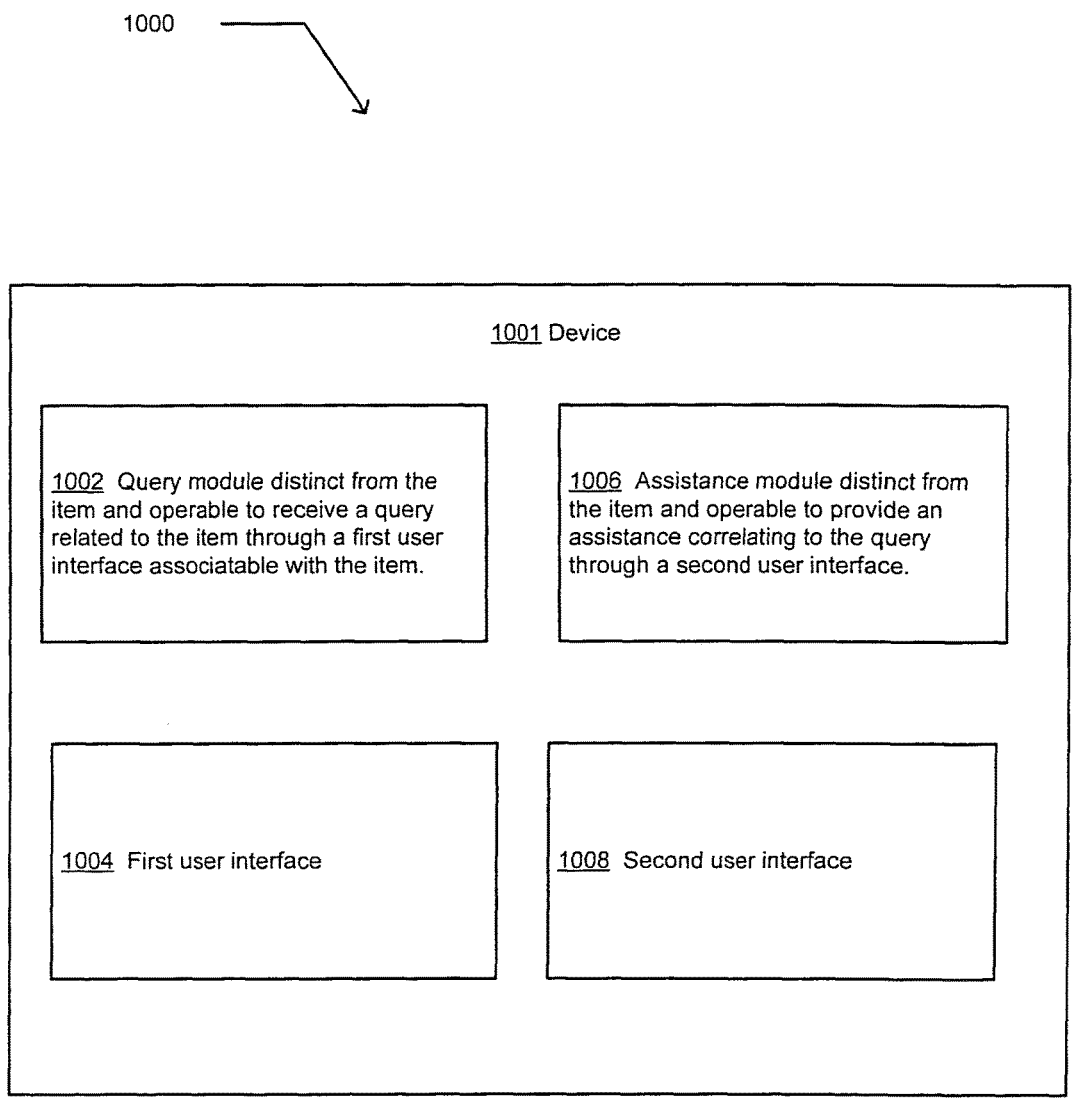
FIG. 24 illustrates a partial view of an exemplary apparatus that may serve as an illustrative environment of and/or for subject matter technologies that provide user assistance for an item.

FIG. 24 illustrates a partial view of an exemplary apparatus 1000 that may serve as an illustrative environment of and/or for subject matter technologies that provide user assistance for an item, such as the item 800. The exemplary apparatus 1000 includes a device 1001. The device 1001 includes a query module 1002 operable to receive a query related to the item through a first user interface 1004. The first user interface 1004 includes a structure a associatable with the item. The exemplary apparatus 1000 further includes an assistance module operable 1006 operable to provide an assistance correlating to the query through a second user interface 1008. The item is distinct from the exemplary apparatus 1000.

Figure 25:
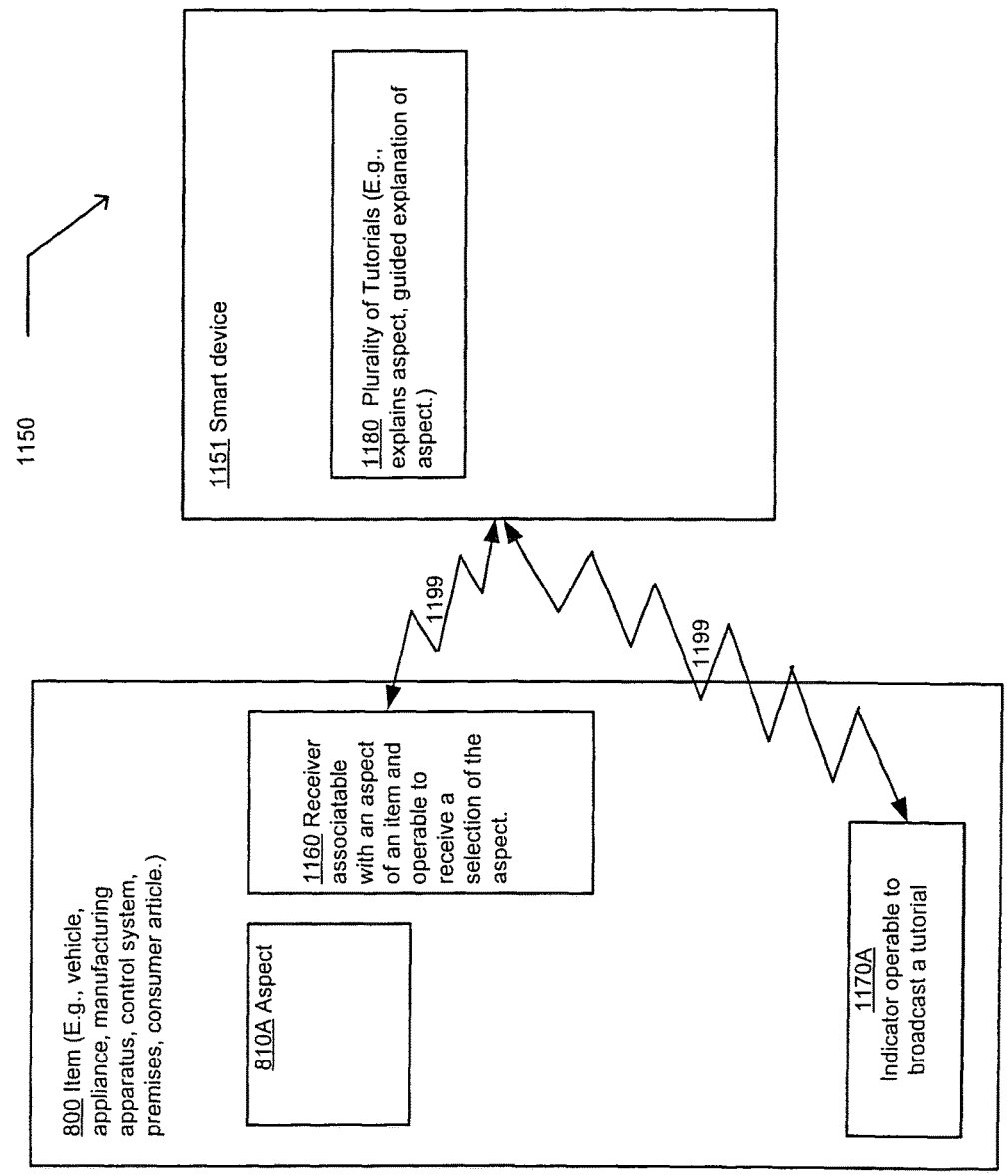
FIG. 25 illustrates a partial view of an exemplary apparatus that may serve as an illustrative environment of and/or for subject matter technologies that provide user assistance for an item.

FIG. 25 illustrates a partial view of an exemplary apparatus 1150 that may serve as an illustrative environment of and/or for subject matter technologies that provide user assistance for an item. The exemplary apparatus 1150 is distinct from the item and includes a smart device 1151. The smart device 1151 includes a receiver 1160 associatable with an aspect 810A of the item 800 and operable to receive a selection of the aspect. The smart device 1151 further includes an indicator 1170A operable to broadcast a tutorial. In an embodiment, the indicator 1170A may be associated with the item 800 and/or an aspect 810A of the item. The exemplary apparatus 1150 further includes a plurality of tutorials 1180 that include information related to the item. In an embodiment, the plurality of tutorials are saved in a computer-readable medium product associated with the smart device 1151.

Figure 26:
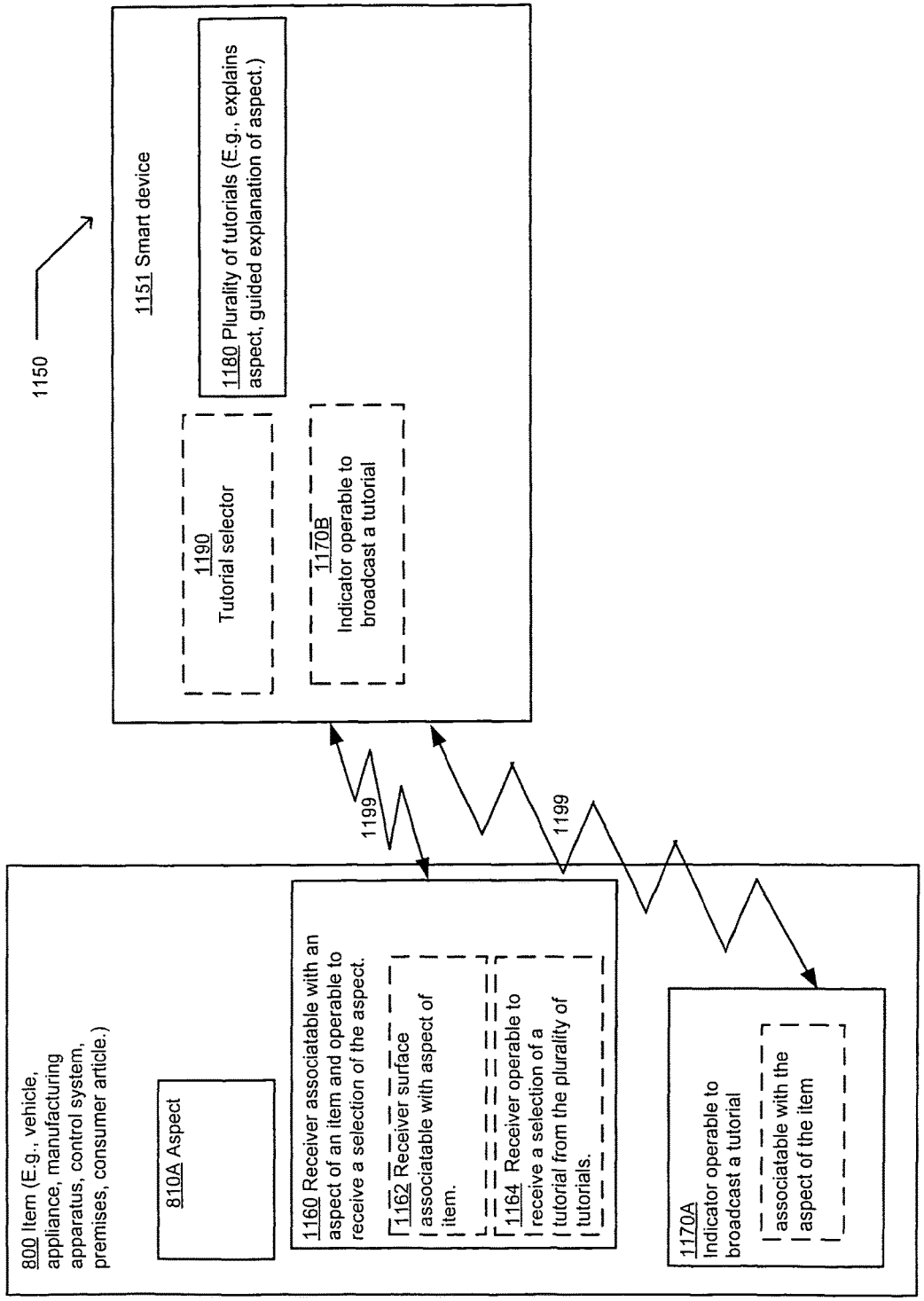
FIG. 26 illustrates a partial view of an alternative embodiment of the exemplary apparatus of FIG. 24.

FIG. 26 illustrates a partial view of an alternative embodiment of the exemplary apparatus 1150 of FIG. 24. The smart device 1151 further may include a tutorial selector 1190 operable to receive the selection of the aspect 810A. The tutorial selector 1190 may include operability to select a tutorial correlating with the selection of the aspect from the plurality of tutorials 1180. In an alternative embodiment, the tutorial selector 1190 may be associated with the item 800 (not shown). The information related to the aspect 810A of the item may include an explanation of the aspect of the item, and/or may include a guided explanation related to the aspect of the item. The receiver 1160 further may include a receiver surface 1162 associatable with an aspect of an item. The receiver 1160 further may include a receiver 1164 operable to receive a selection of a tutorial from the plurality of tutorials. The indicator 1170A may include an indicator associatable with the aspect 810A of the item. The smart device 1151 may further include an indicator 1170B not associated with the item 800, and is operable to broadcast a tutorial.

Figure 27:
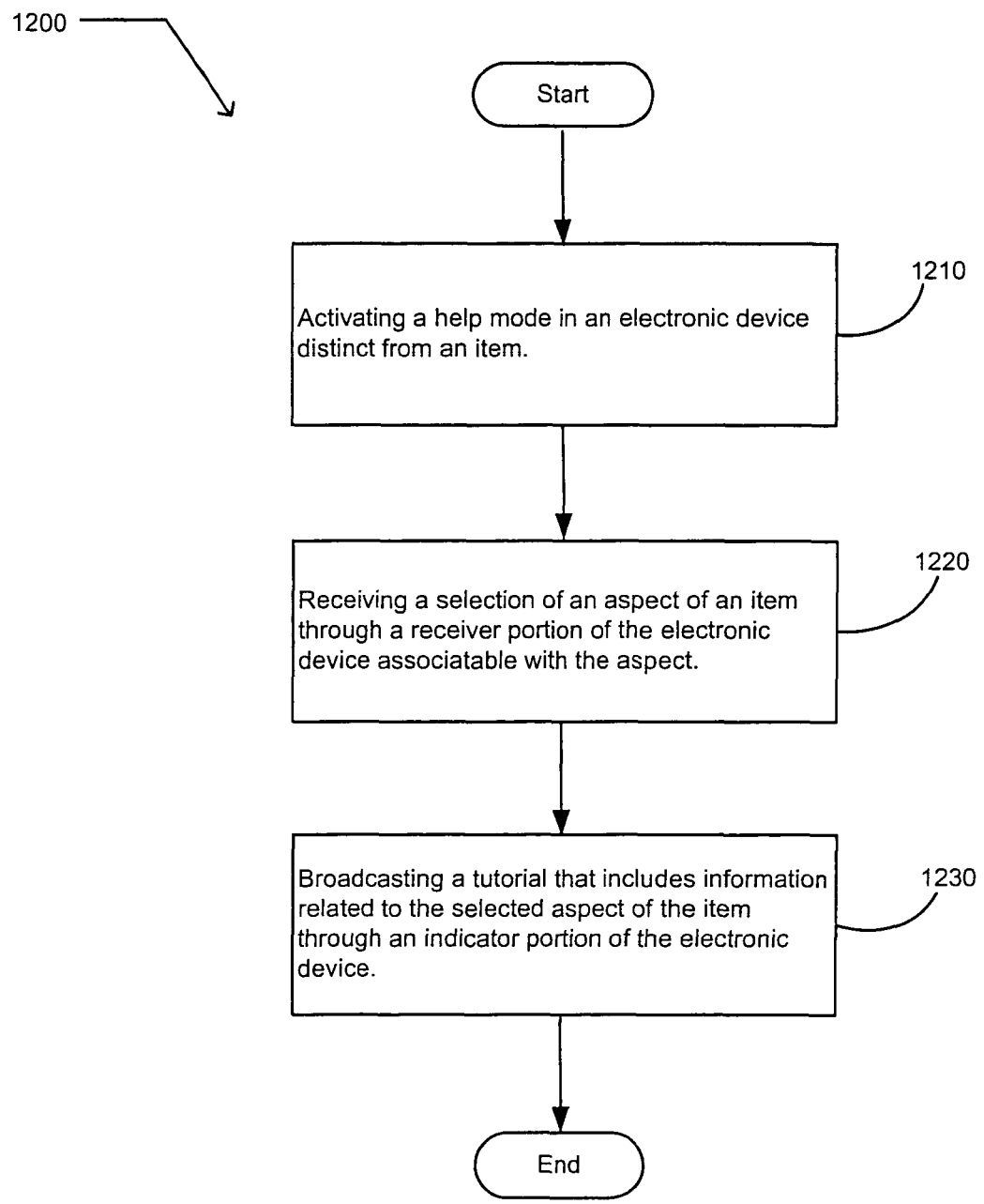
FIG. 27 illustrates an exemplary operational flow that provides a user assistance with an item.

FIG. 27 illustrates an exemplary operational flow 1200 that provides a user assistance with an item. After a start operation, the flow moves to an activation operation 1210. At the activation operation 1210, a help mode is activated in an electronic device distinct from the item. At query operation 1220, a selection of an aspect of an item is received through a receiver portion of the electronic device associatable with the aspect. At broadcast operation 1230, a tutorial is broadcast that includes information related to the selected aspect of the item through an indicator portion of the electronic device. The operational flow 1200 then proceeds to an end operation.

Figure 28:
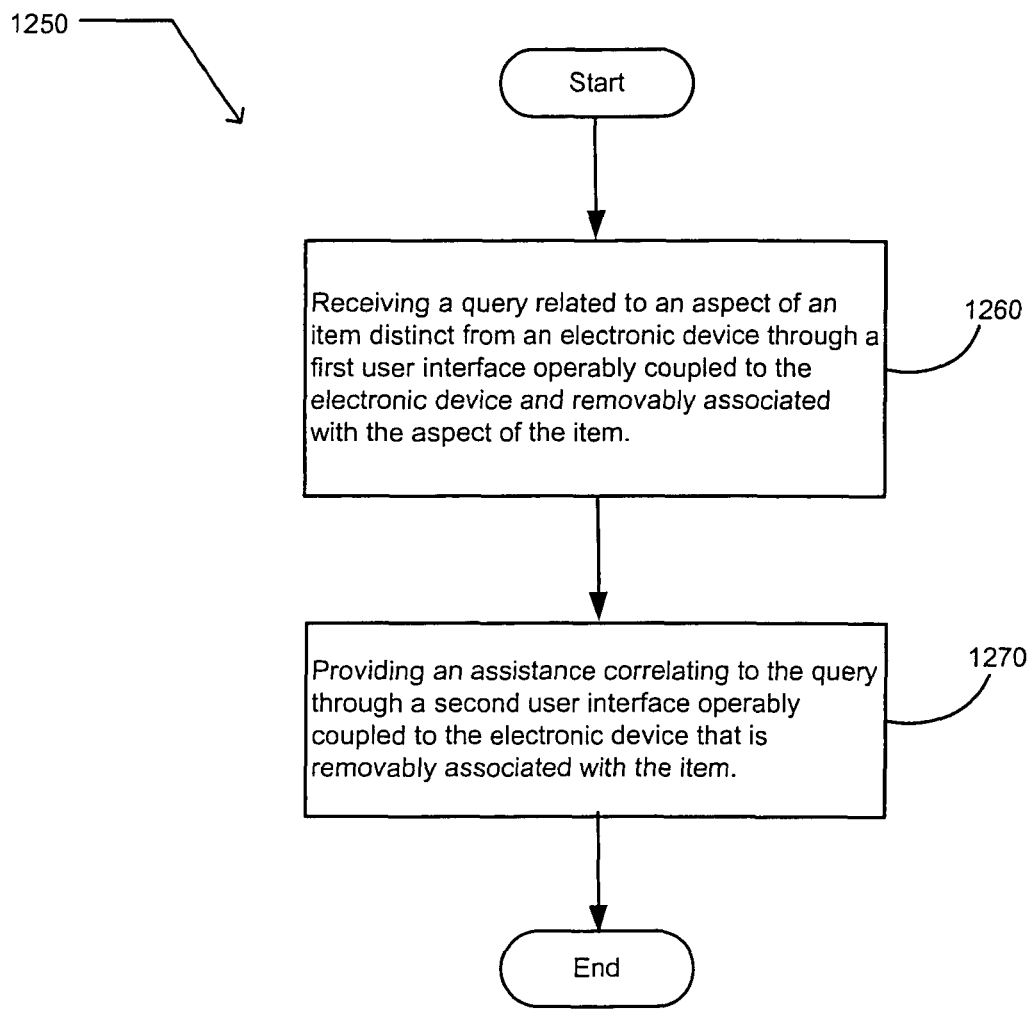
FIG. 28 illustrates an exemplary operational flow that provides a user assistance with an item.

FIG. 28 illustrates an exemplary operational flow 1250 that provides a user assistance with an item. After the start of operation, the flow moves to a query operation 1260. At the query operation 1260, a query related to an aspect of an item distinct from an electronic device is received. The query is received through a first user interface operably coupled to the electronic device and removably associated with the aspect of the item. At help operation 1270, an assistance is provided correlating to the query through a second user interface operably coupled to the electronic device, the second user interface being removably associated with the item. The operational flow 1250 then proceeds to an end operation.

Figure 29:
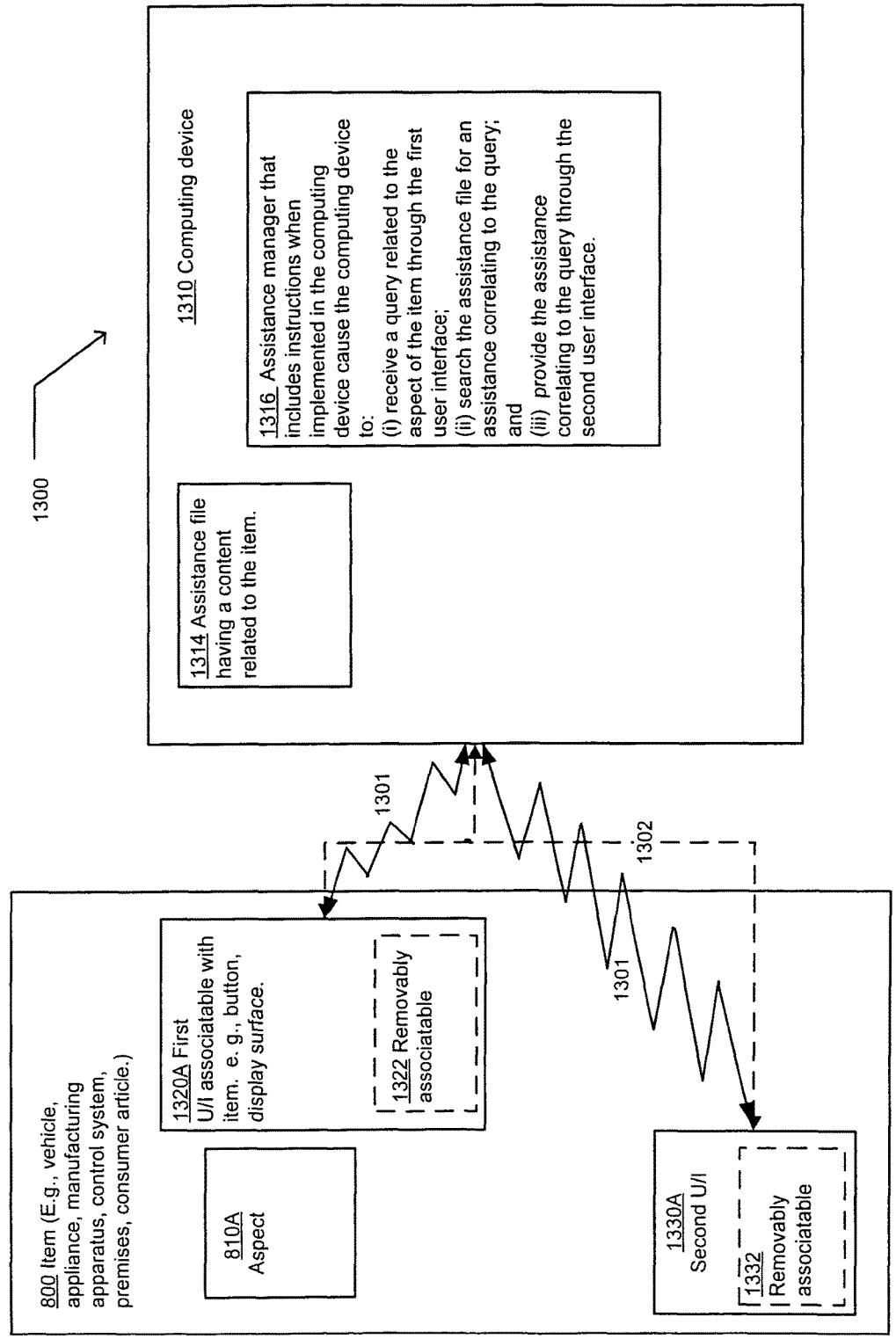
FIG. 29 illustrates a partial view of an exemplary apparatus that may serve as an illustrative environment of and/or for subject matter technologies that provide user assistance for an item.

FIG. 29 illustrates a partial view of an exemplary apparatus 1300 that may serve as an illustrative environment of and/or for subject matter technologies that provide user assistance for an item, such as the item 800. The exemplary apparatus 1300 is distinct from the item and includes a computing device 1310. The exemplary apparatus 1300 also includes a first user interface 1320A associatable with the item, and a second user interface 1330A. The exemplary apparatus 1300 further includes an assistance file 1314 having an assistance content related to the item, and an assistance manager 1316 that includes instructions. The instructions, when implemented in the computing device 1310 cause the computing device to perform operations. The operations include receive a query related to the aspect of the item through the first user interface, search the assistance file for an assistance correlating to the query, and provide the assistance correlating to the query through the second user interface.

The first user interface 1320A associatable with an item may include a first user interface removably associatable 1322 with the item. The first user interface 1320A may include a first user interface wirelessly couplable with the computing device through a wireless coupling 1301. The first user interface 1320A may include a first user interface electrically couplable with the computing device through a wired coupling 1302. The second user interface 1330A may include a second user interface wirelessly couplable with the computing device through a wireless coupling 1301 The second user interface 1330A may include a second user interface electrically couplable with the computing device through a wired coupling 1302.

Figure 30:
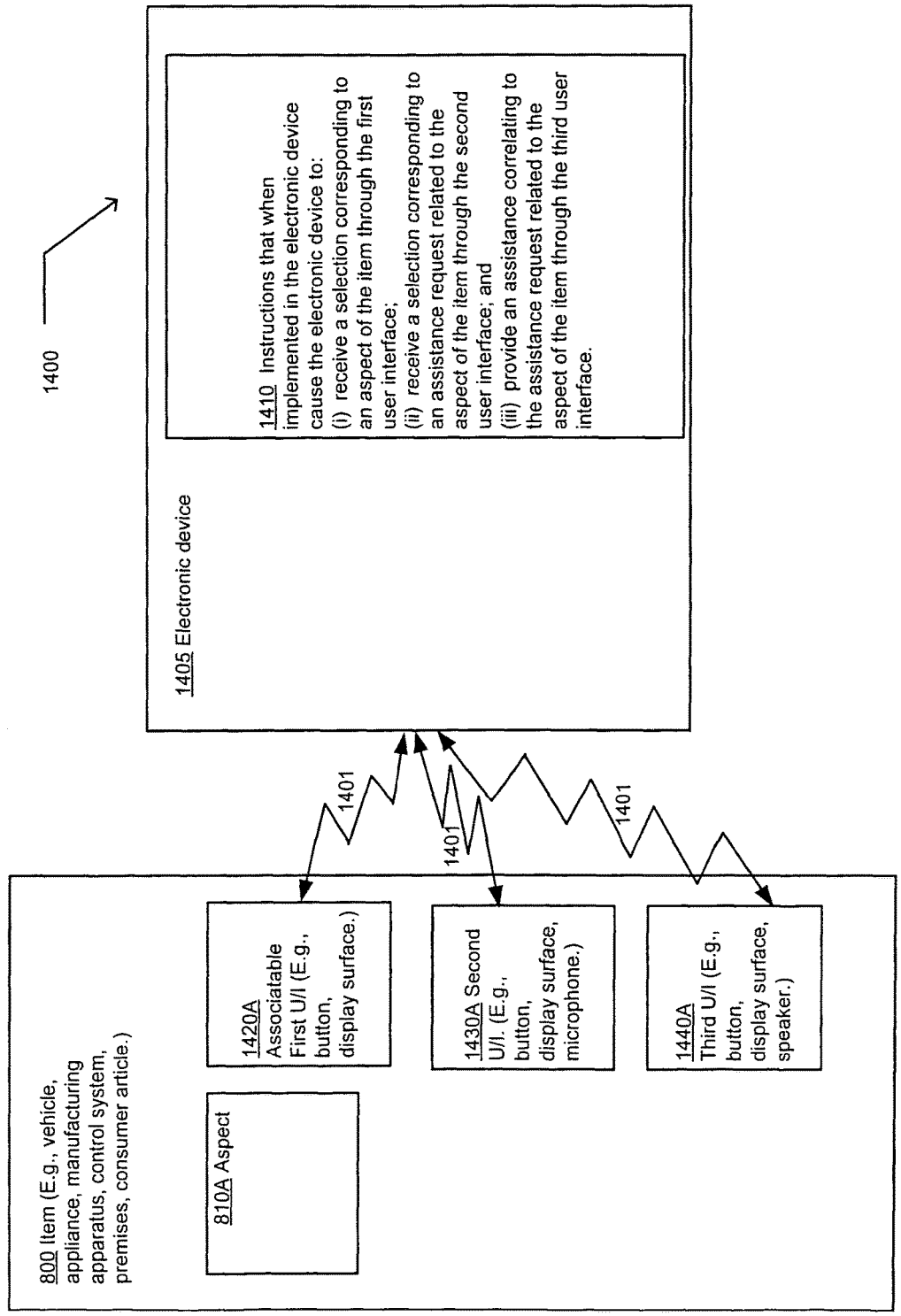
FIG. 30 illustrates a partial view of an exemplary apparatus that may serve as an illustrative environment of and/or for subject matter technologies that provide user assistance for an item.

FIG. 30 illustrates a partial view of an exemplary apparatus 1400 that may serve as an illustrative environment of and/or for subject matter technologies that provide user assistance for an item, such as the item 800. The exemplary apparatus 1400 is distinct from the item and includes an electronic device 1405. The electronic device 1405 includes a first user interface 1420A associatable with an aspect 810A of the item 800, a second user interface 1430A, and a third user interface 1440A. The electronic device 1405 further includes instructions that when implemented in the electronic device cause the electronic device to perform certain operations. Operations include receive a selection corresponding to an aspect of the item through the first user interface 1420A, receive a selection corresponding to an assistance request related to the aspect of the item through the second user interface 1430A, and provide an assistance correlating to the assistance request related to the aspect of the item through the third user interface 1440A.

Figure 31A:
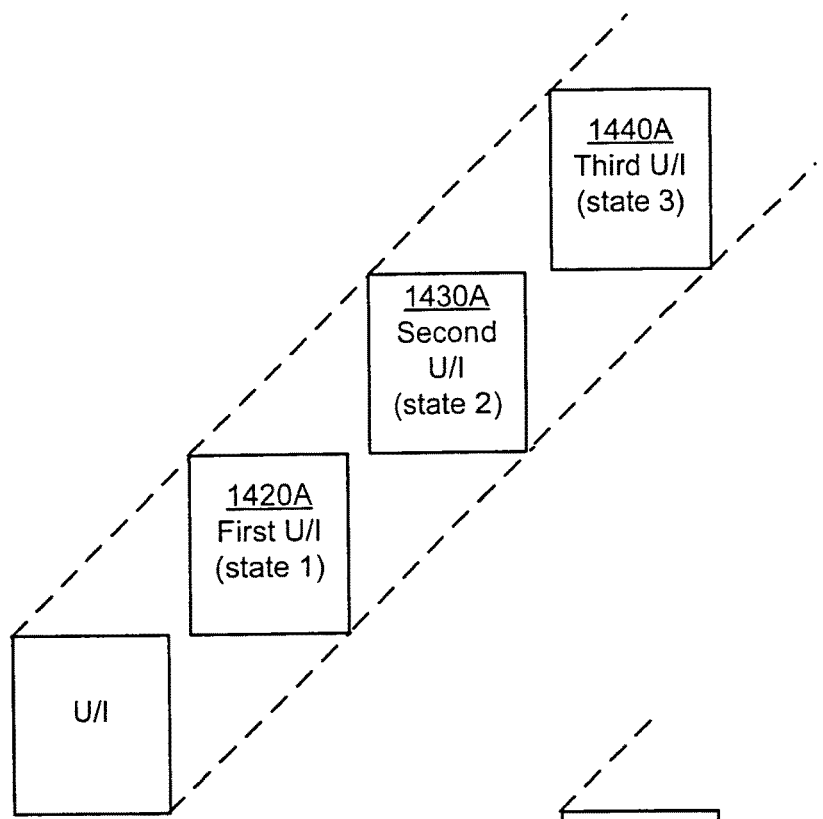
FIG. 31A illustrates an exemplary embodiment where the user interface includes a plurality of states.
Figure 31B:
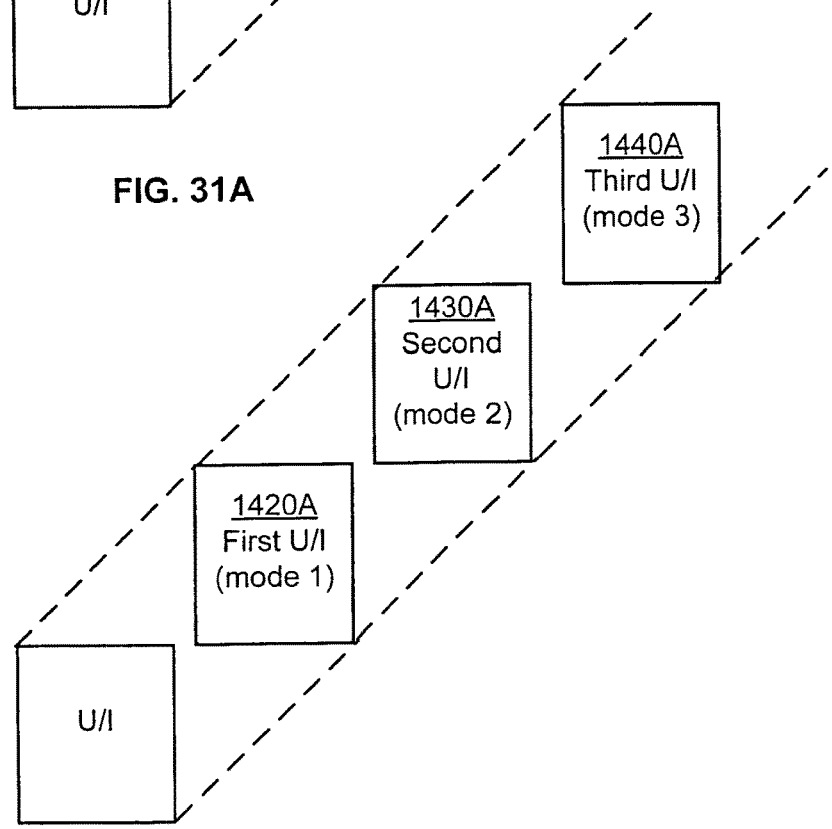
FIG. 31B illustrates an exemplary embodiment where the user interface includes a plurality of modes.

FIGS. 31A and 31B illustrate exemplary embodiments of states and modes of a user interface U/I that may serve as an illustrative environment of and/or for subject matter technologies that provide user assistance for an item. FIG. 31A illustrates an exemplary embodiment where the user interface U/I includes a plurality of states. In a pre-user assistance state, the user interface may have any function. If initially in an optional pre-assistance state, the user interface U/I transitions to a first state, which includes operability that receives a selection related to the item 800. Using FIG. 30 as an example, the user interface U/I transitions to the first state, which is the first user interface 1420A positioned proximate to the aspect 810A. The user interface U/I in the first state includes an operability that receives a selection of an aspect, such as the aspect 810A. After receiving a selection corresponding to an aspect of the item 800 through the user interface U/I in the first state (first user interface 1420A), the user interface transitions from the first state to a second state, which is the second user interface 1430A. The user interface U/I in the second state includes an operability that receives an assistance request selection, such as a help selection. After receiving a selection corresponding to an assistance request through the second user interface U/I in the second state (second user interface 1430A), the user interface transitions from the second state to a third state, which is the third user interface 1440A. The user interface U/I in the third state includes an operability that provides an assistance.

FIG. 31B illustrates an exemplary embodiment where the user interface U/I includes a plurality of modes. Using FIG.

30 as an example, the user interface U/I includes operability responsive to plurality of modes. A first mode may occur upon reception of a first pattern. For example, the first pattern may include receiving a single, quick touch to the user interface U/I. The first mode may include an operability that receives a selection of an aspect of the item, such as the aspect 810A. A second mode may occur upon reception of a second pattern. The second mode may include an operability that receives a selection corresponding to assistance request related to the aspect of the item. The second pattern may include receiving a single, long-touch to the user interface U/I. Alternatively, the second pattern may include receiving two spaced-apart quick touches to the user interface U/I. A third mode may include a user-assistance presentation mode. For example, a user-assistance presentation mode may include one or more of light emitting diodes of various colors that can be appropriately switched and/or blinked to provide an assistance. By way of further example, a user assistance presentation mode may include emitting a sound, providing a graphical display, an animated display, and/or visual display.

Returning to FIG. 30, the first user interface 1420A of the electronic device 1405 may include a first user interface of the electronic device associatable with the aspect of the item 800. The first user interface may be removably associatable with the item. The first user interface may include a first user interface wirelessly couplable with the electronic device, such as through a wireless connection 1401. The second user interface 1430A may include a second user interface wirelessly couplable with the electronic device, such as through a wireless connection 1401.

Figure 32:
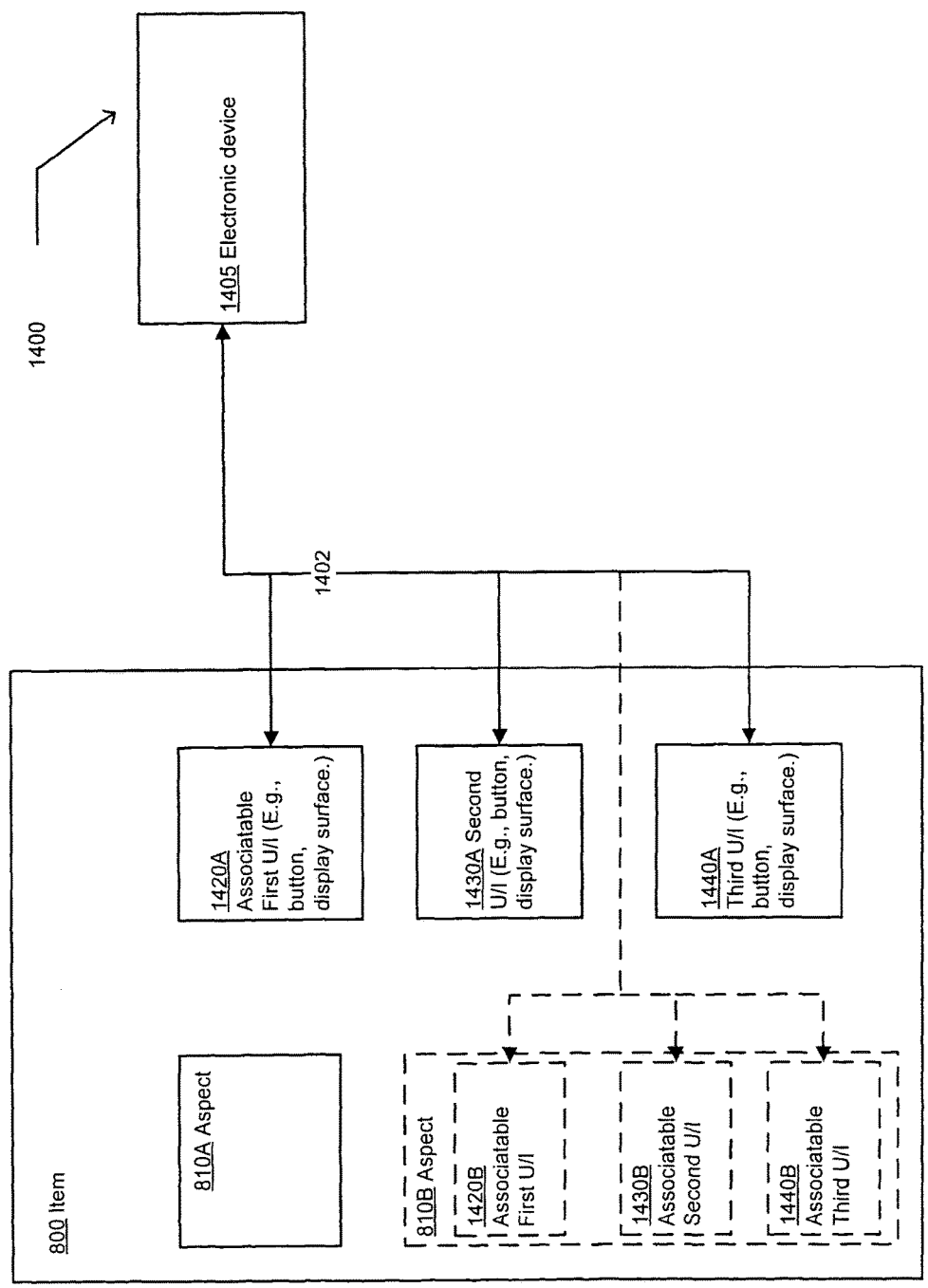
FIG. 32 illustrates a partial view of an alternative embodiment of the exemplary apparatus of FIG. 30.

FIG. 32 illustrates a partial view of an alternative embodiment of the exemplary apparatus 1400 of FIG. 30. In this alternative embodiment, the item 800 includes an aspect 810B. The exemplary apparatus 1400 includes an associatable first user interface 1420B, and associatable second user interface of 1430B, and an associatable third user interface 1440B. In this alternative embodiment, these three associatable user interfaces are all associated with the aspect 810B. In addition, these three associatable user interfaces may be electrically coupled or couplable with the exemplary apparatus 1400 through an electrical coupler, such as a coupler 1402.

Figure 33:
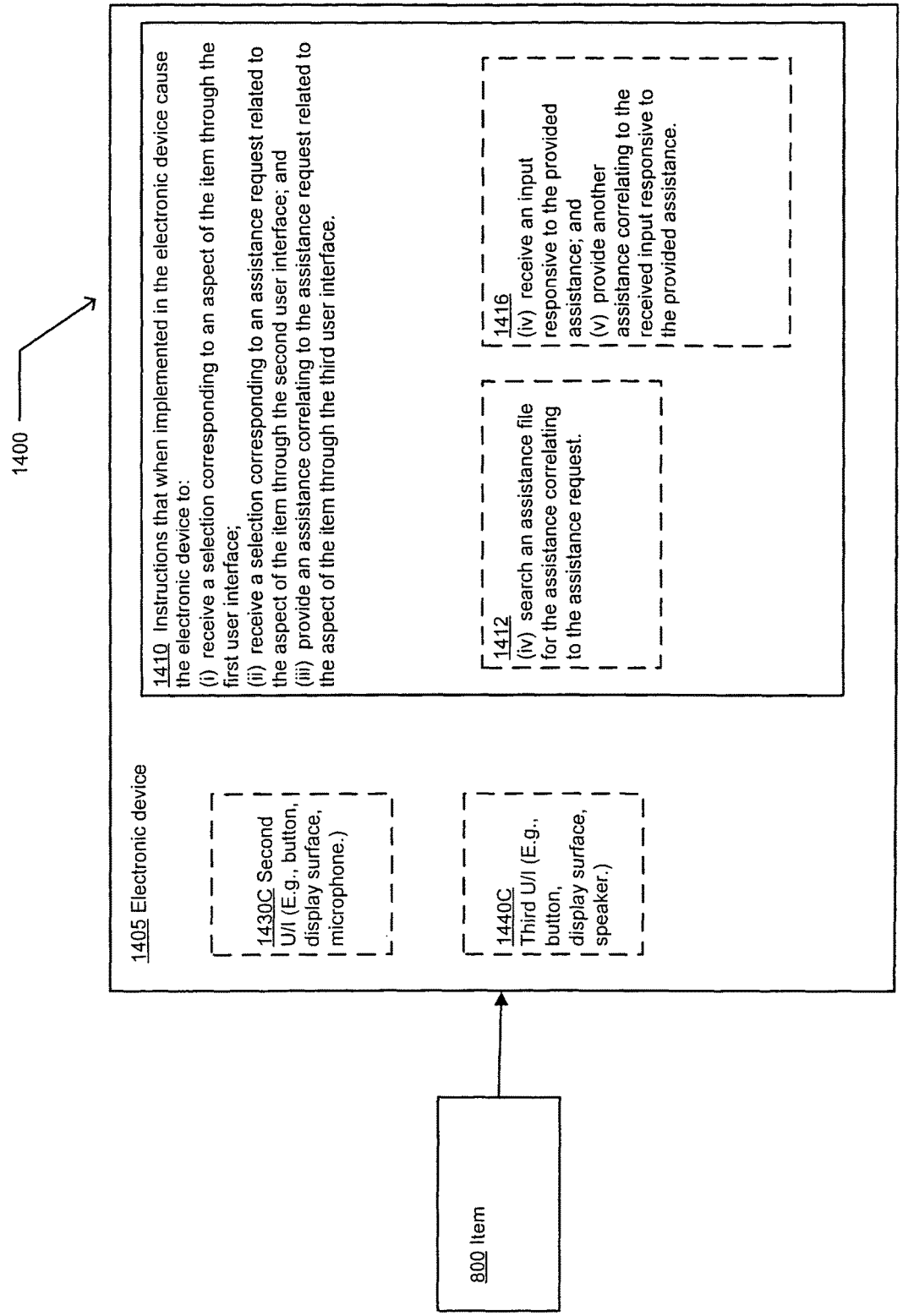
FIG. 33 illustrates a partial view of an alternative embodiment of the exemplary apparatus of FIG. 30.

FIG. 33 illustrates a partial view of an alternative embodiment of the exemplary apparatus 1400 of FIG. 30. The exemplary apparatus 1400 may include a second user interface 1430C and a third user interface 1440C that are not associatable with the item 800. The instructions 1410 may further include an operation that searches an assistance file for the assistance correlating to the assistance request. The instructions may additionally include an operation that receives an input responsive to the provided assistance, and provides another assistance correlating to the received input responsive to the provided assistance.

FIG. 34 illustrates a partial view of an exemplary apparatus of 1450 that may serve as an illustrative environment of and/or for subject matter technologies that provide user assistance for an item, such as the item 800. The exemplary apparatus 1451 is distinct from the item 800 and includes a first associatable means 1452 for receiving a selection corresponding to an aspect of an item. The exemplary apparatus 1451 includes a second means 1454 for receiving a selection corresponding to an assistance request related to the aspect of the item. The exemplary apparatus 1451 includes a third means 1456 for providing an assistance correlating to the assistance request related to the aspect of the item.

Figure 35:
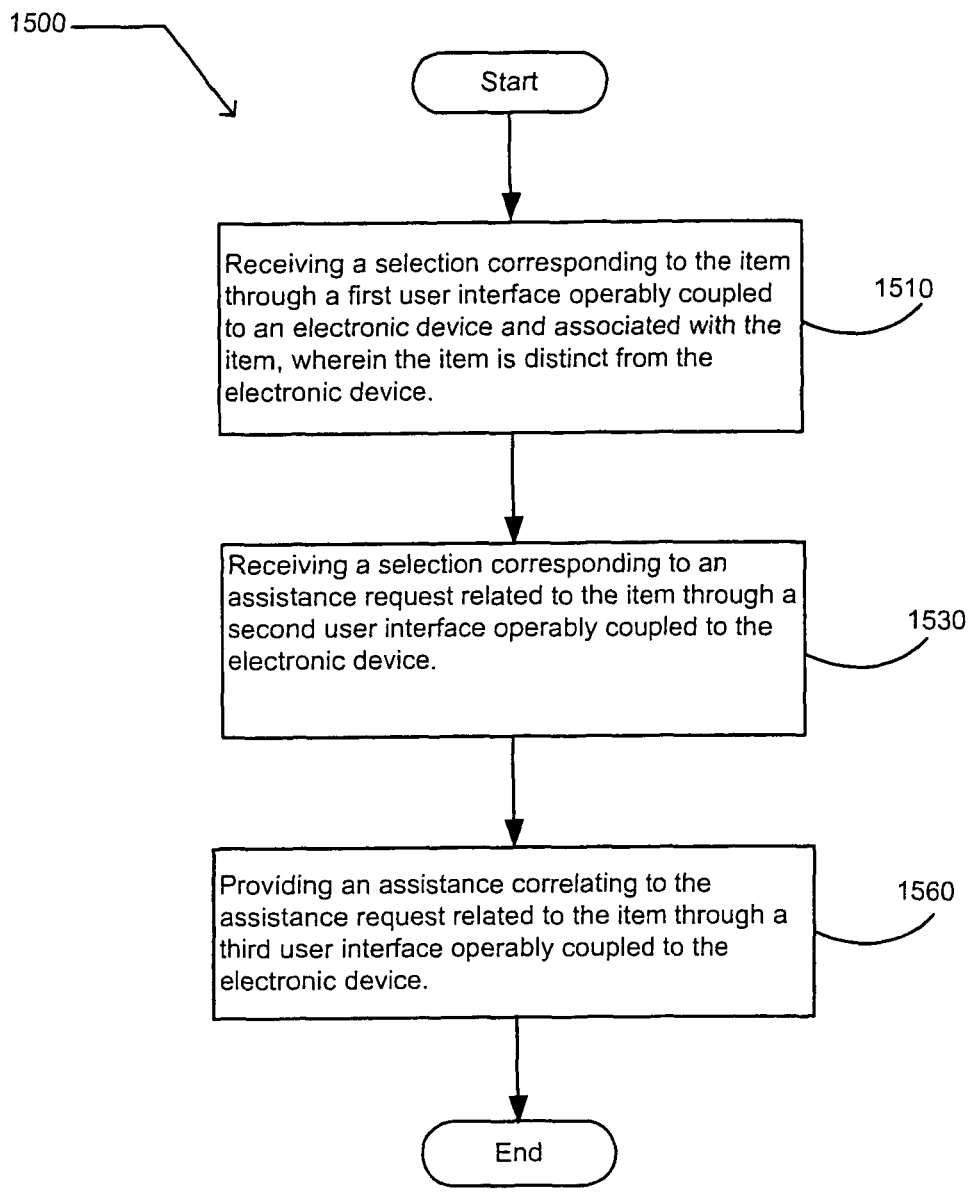
FIG. 35 illustrates an exemplary operational flow that provides a user assistance with an item.

FIG. 35 illustrates an exemplary operational flow 1500 that provides a user assistance with an item, such as the item 800. After the start of operation, the flow moves to a selection operation 1510. At the selection operation 1510, a selection corresponding to the item is received through a first user interface operably coupled to an electronic device and associated with the item. The item is distinct from the electronic device. At a request operation 1530, a selection is received corresponding to an assistance request related to the item through a second user interface operably coupled to the electronic device. At a broadcast operation 1560, an assistance is provided a correlating to the assistance request related to the item through a third user interface operably coupled to the electronic device. In certain embodiments, a user interface of the first use interface, the second user interface, and/or the third user interface a may include a plurality of states and/or a plurality of modes. FIGS. 31A and 31B illustrate several exemplary embodiments of states and modes of a user interface.

Figure 36:
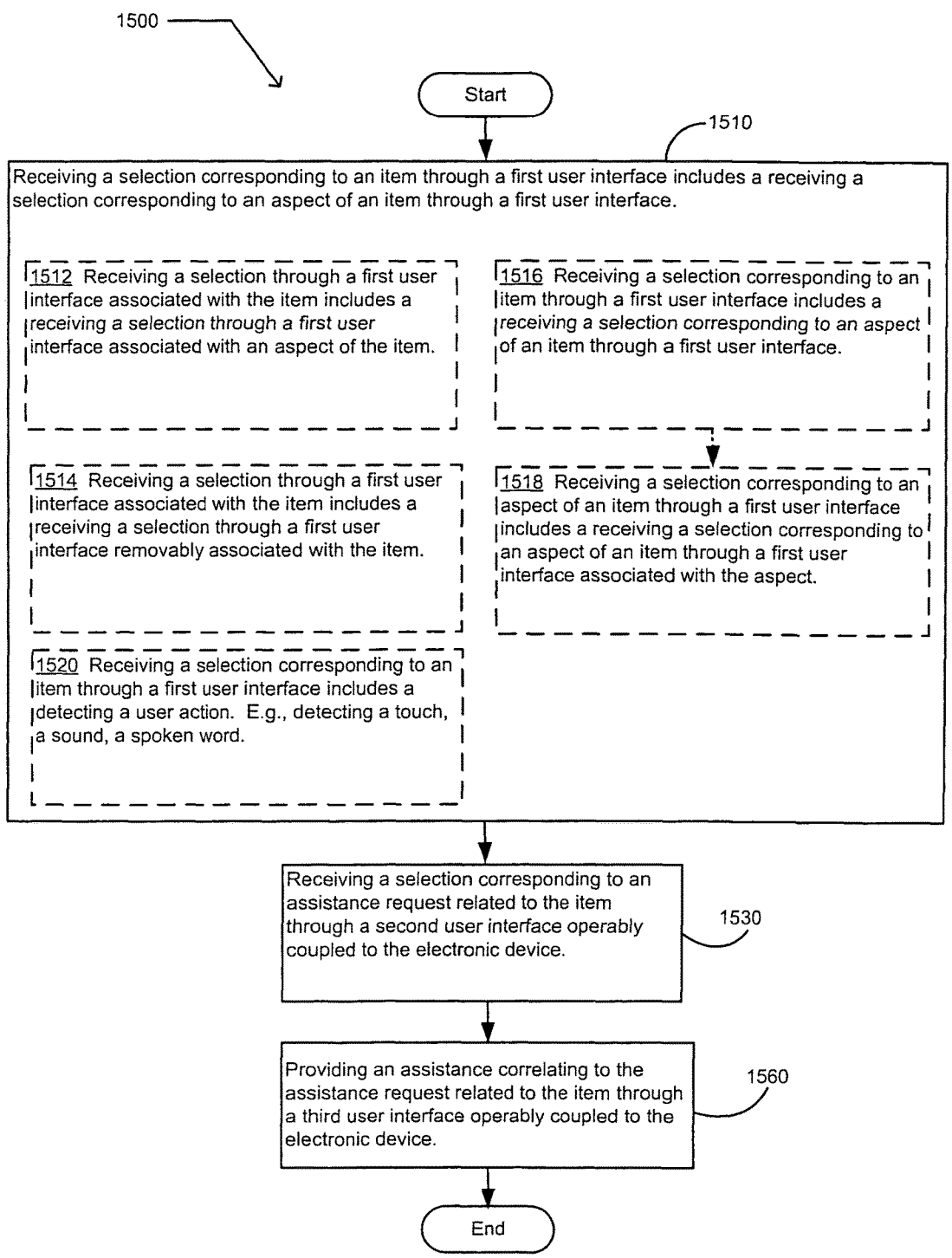
FIG. 36 illustrates an alternative embodiment of the exemplary operational flow of FIG. 35.

FIG. 36 illustrates an alternative embodiment of the exemplary operational flow 1500 of FIG. 35. FIG. 36 illustrates an embodiment where of the selection operation 1510 may include at least one additional operation. Additional operations may include operation 1512, operation 1514, operation 1516, operation 1518, and/or operation 1520. At operation 1512, the receiving a selection through a first user interface associated with the item may include a receiving a selection through a first user interface associated with an aspect of the item. At operation 1514, the receiving a selection through a first user interface associated with the item may include a receiving a selection through a first user interface removably associated with the item. At operation 1516, the receiving a selection corresponding to an item through a first user interface may include a receiving a selection corresponding to an aspect of an item through a first user interface. The operation 1516 may further include operation 1518. At operation 1518, the receiving a selection corresponding to an aspect of an item through a first user interface may include a receiving a selection corresponding to an aspect of an item through a first user interface associated with the aspect. At operation 1520, the receiving a selection corresponding to a an item to a first user interface includes detecting a user action. The detected user action may include detecting a touch, a sound, and/or a spoken word.

Figure 37:
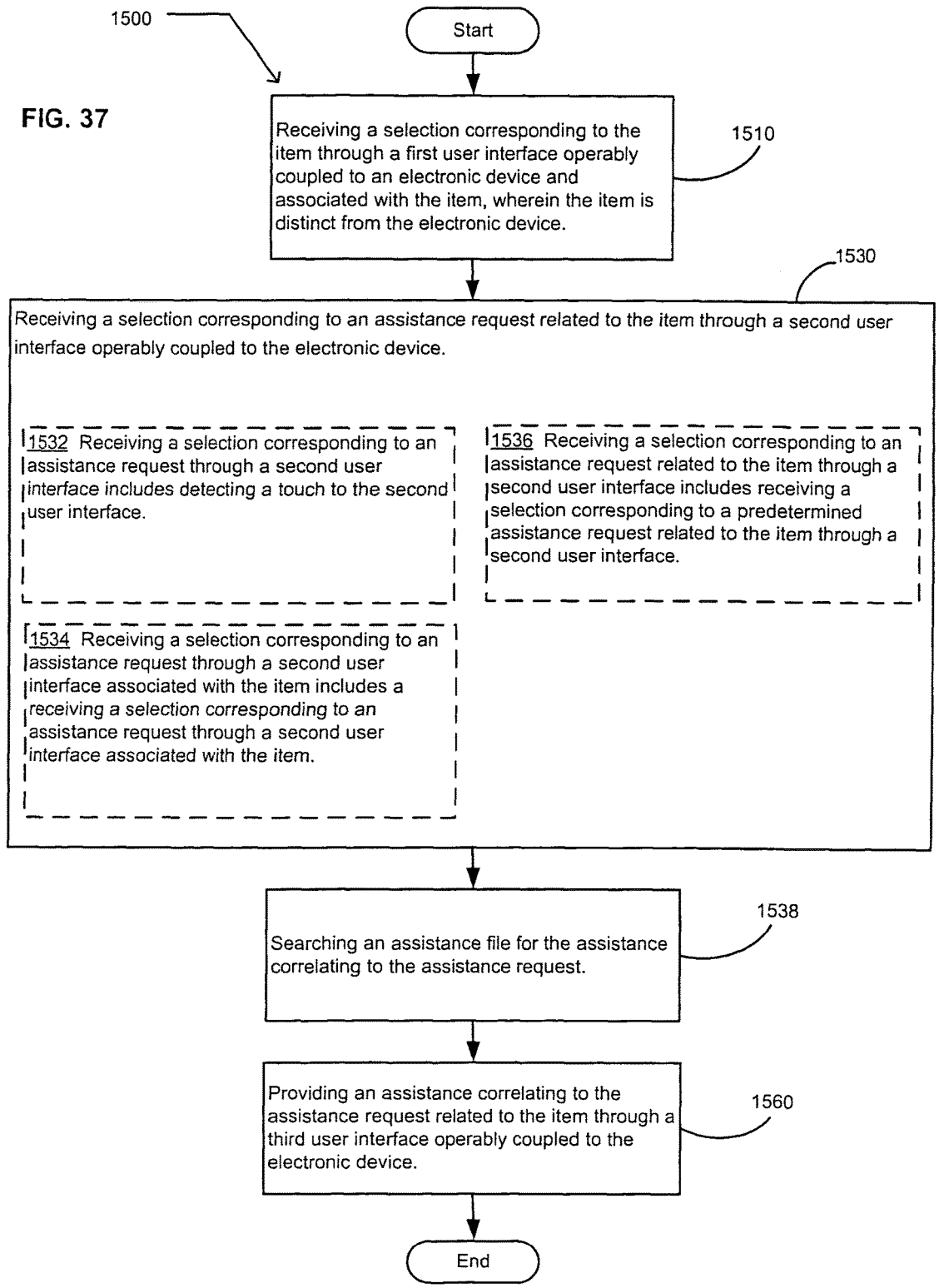
FIG. 37 illustrates an alternative embodiment of the exemplary operational flow of FIG. 35.

FIG. 37 illustrates an alternative embodiment of the exemplary operational flow 1500 of FIG. 35. FIG. 37 illustrates an embodiment where the selection operation 1530 may include at least one additional operation. Additional operations may include operation 1532, operation 1534, operation 1530, and/or operation 1538. At operation 1532, the receiving a selection corresponding to an assistance request through a second user interface may include detecting a touch to the second user interface. At operation 1534, the receiving a selection corresponding to an assistance request through a second user interface associated with the item may include a receiving a selection corresponding to an assistance request through a second user interface associated with the item. At operation 1536, the receiving a selection corresponding to an assistance request related to the item through a second user interface may include receiving a selection corresponding to a predetermined assistance request related to the item through a second user interface. FIG. 37 also illustrates an alternative embodiment where the exemplary operational flow 1500 further includes searching an assistance file for the assistance correlating to the assistance request.

Figure 38:
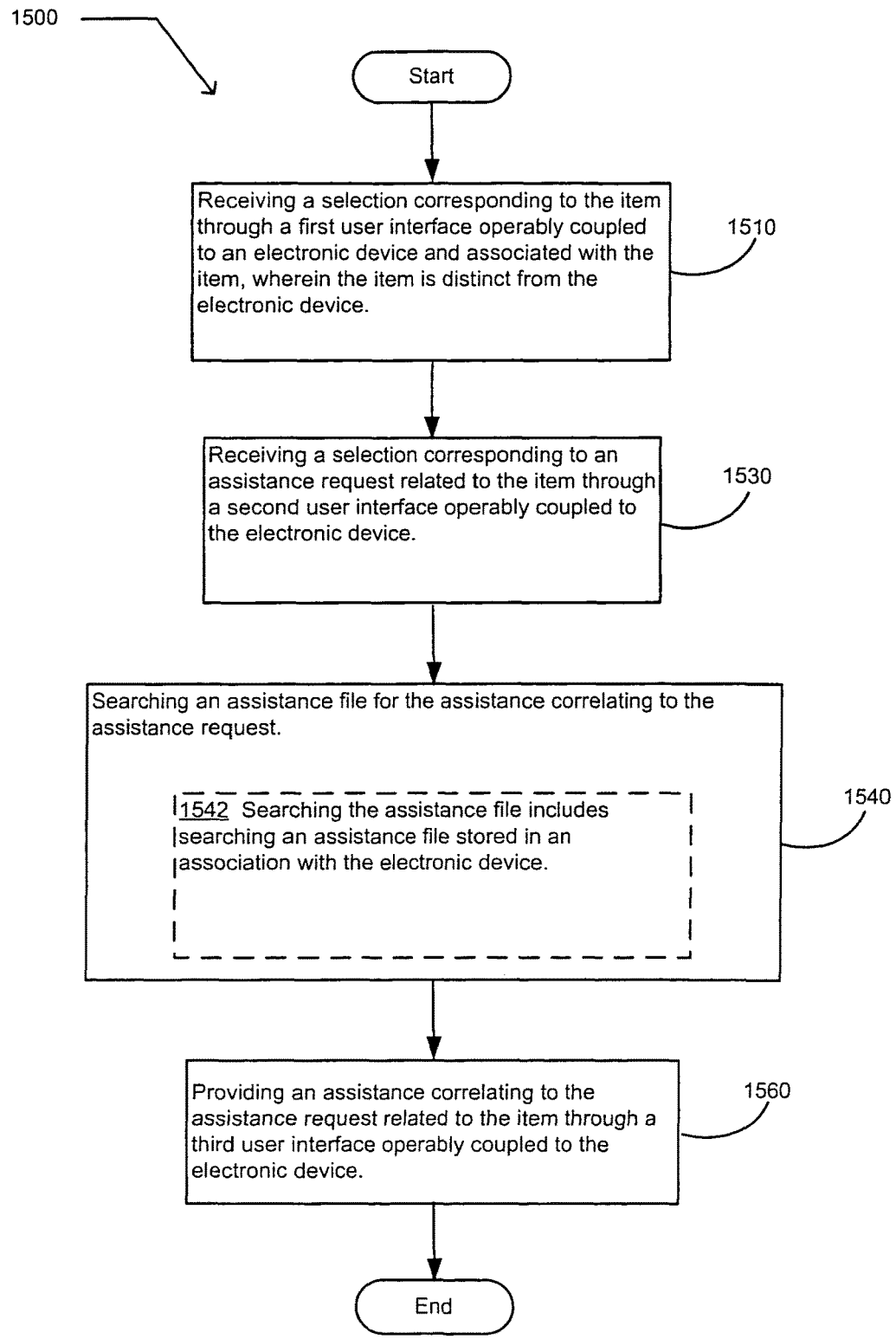
FIG. 38 illustrates an alternative embodiment of the exemplary operational flow of FIG. 35.

FIG. 38 illustrates an alternative embodiment of the exemplary operational flow 1500 of FIG. 35. FIG. 38 illustrates an embodiment where the exemplary operation flow 1500 may include operation 1540. At operation 1540, an assistance file is searched for the assistance correlating to the assistance request. The operation 1540 may further include operation 1542. At operation 1452, searching the assistance file may include searching an assistance file stored in an association with the electronic device.

Figure 39:
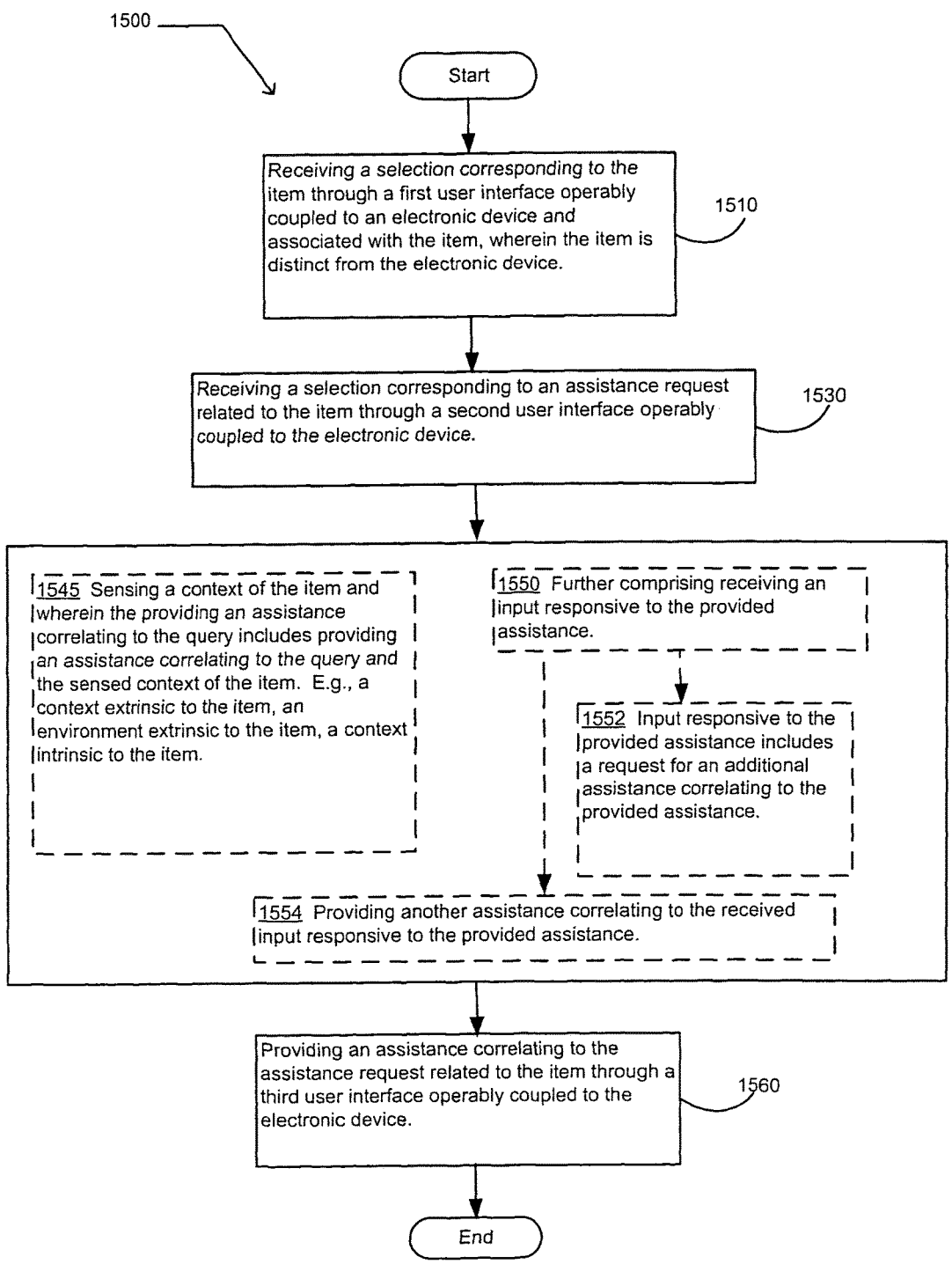
FIG. 39 illustrates an alternative embodiment of the exemplary operational flow of FIG. 35.

FIG. 39 illustrates an alternative embodiment of the exemplary operational flow 1500 of FIG. 35. FIG. 39 illustrates an embodiment where the selection operation 1510 may include at least one additional operation. The additional operation may include an operation 1545, and/or an operation 1550. At operation 1545, a context of the item is sensed. The sensed context may include a context extrinsic to the item, an environment extrinsic to the item, and/or a context intrinsic to the item. The providing an assistance correlating to the query at the operation 1560 includes providing an assistance correlating to the query and the sensed context of the item. At operation 1550, an input is received responsive to the provided assistance. The exemplary operation flow 1500 may then flow from operation 1550 to operation 1552. At operation 1552, the input responsive to the provided assistance may include a request for an additional assistance correlating to the provided assistance. Alternatively, the exemplary operation flow 1500 may then flow from operation 1550 to operation 1554. At operation 1554, another assistance is provided correlating to the received input responsive to the provided assistance.

FIG. 40 illustrates a partial view of product 1570 that includes an exemplary computer-readable medium product 1572 that may serve as an illustrative environment of and/or for subject matter technologies that provide user assistance for an item. The computer-readable medium product 1572 includes computer-executable instructions 1574. The computer-executable instructions include an operability to receive a selection corresponding to the item through a first user interface operably coupled to an electronic device and associatable with the item, wherein the item is distinct from the electronic device. The computer-executable instructions a further include an operability to receive a selection corresponding to an assistance request related to the item through a second user interface operably coupled to the electronic device. The computer executable instructions also include an operability to provide an assistance correlating to the assistance request related to the item through a third user interface operably coupled to the electronic device. The computer-readable medium product may include a computer storage medium product, which may be carried by a computer-readable carrier. The computer-readable medium product may include a communications medium product.

Figure 41:
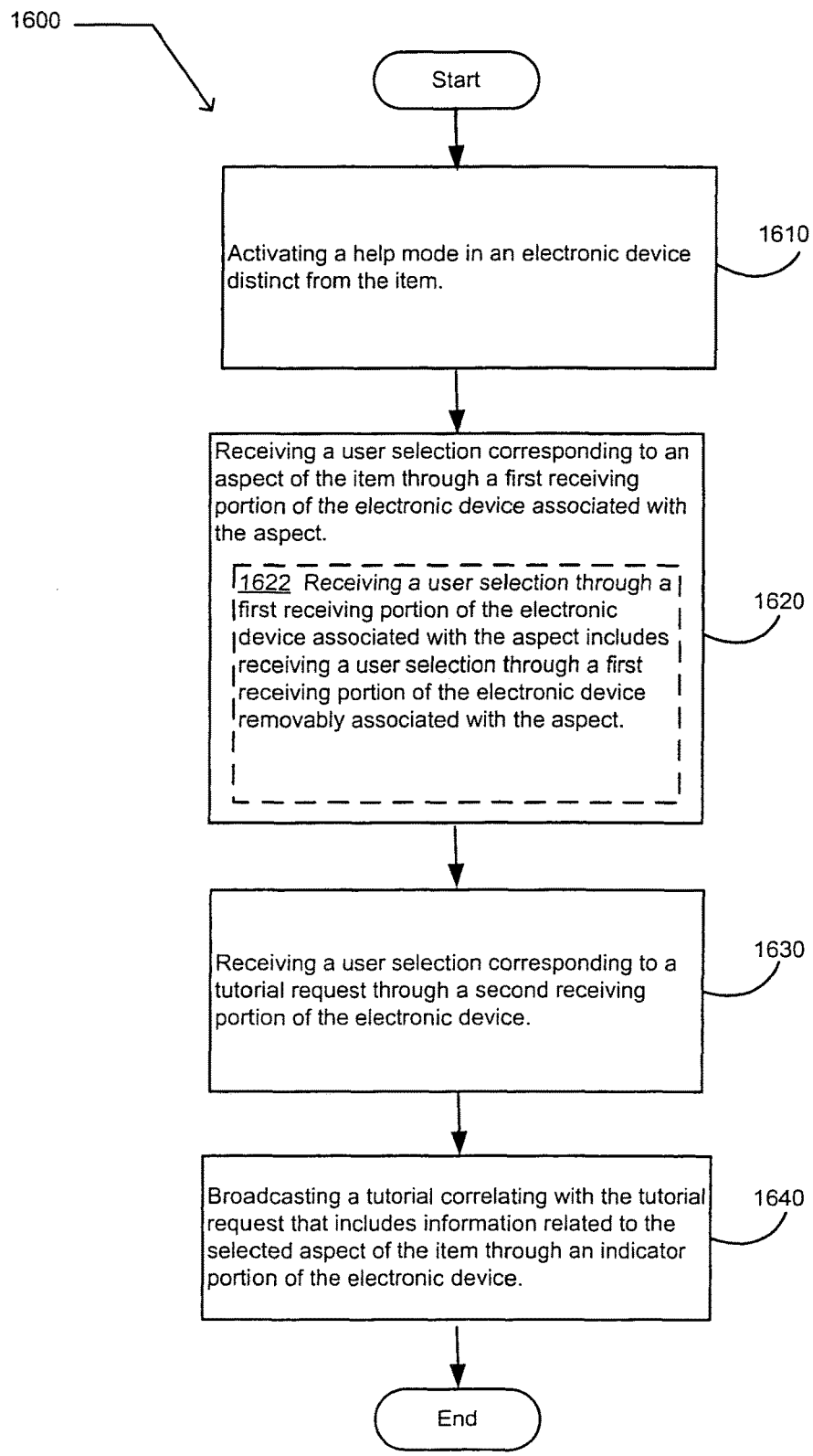
FIG. 41 illustrates an exemplary operational flow that provides a user assistance with an item, such as the item.

FIG. 41 illustrates an exemplary operational flow 1600 that provides a user assistance with an item, such as the item 800. After the start of operation, the flow moves to an activation operation 1610. At the activation operation 1610, a help mode is activated in an electronic device distinct from the item. At feature selection operation 1620, a user selection is received a corresponding to an aspect of the item through a first receiving portion of the electronic device associated with the aspect. At a request operation 1630, a user selection is received corresponding to a tutorial request through a second receiving portion of the electronic device. At a tutorial operation 1640, a tutorial correlating with the tutorial request that includes information related to the selected aspect of the item is broadcast through an indicator portion of the electronic device.

In an alternative embodiment, the feature selection operation of 1620 includes an operation 1622. At the operation 1622, the receiving a user selection through a first receiving portion of the electronic device associated with the aspect may include receiving a user selection through a first receiving portion of the electronic device removably associated with the aspect. The first receiving portion of the electronic device and the second receiving portion of the electronic device may be at least substantially a same portion of the electronic device.

Figure 42:
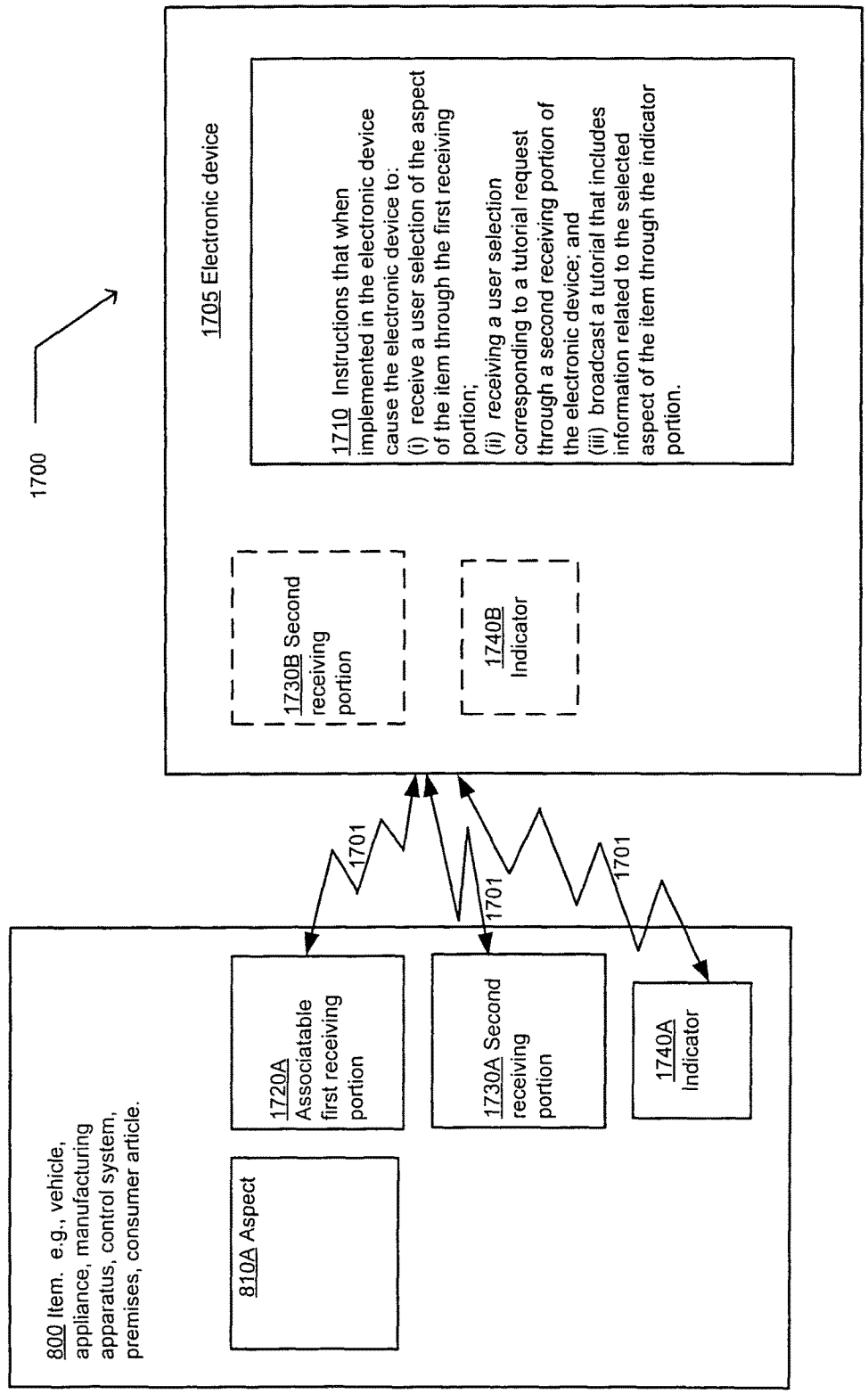
FIG. 42 illustrates a partial view of an exemplary apparatus that may serve as an illustrative environment of and/or for subject matter technologies that provide user assistance for an item, such as the item.

FIG. 42 illustrates a partial view of an exemplary apparatus of 1700 that may serve as an illustrative environment of and/or for subject matter technologies that provide user assistance for an item, such as the item 800. The exemplary apparatus 1700 is distinct from the item 800, and may include an electronic device 1705 having a first receiving portion 1720A associatable with an aspect 810A of the item 800, a second receiving portion 1730A, and an indicator portion 1740A. The exemplary apparatus 1700 also includes instructions 1710. The instructions 1710, when implemented in the electronic device 1705 cause the electronic device to perform certain operations. The operations include a user selection of the aspect of the item through the first receiving portion, receiving a user selection corresponding to a tutorial request through a second receiving portion of the electronic device, and broadcast a tutorial that includes information related to the selected aspect of the item through the indicator portion.

The first receiving portion 1720A, the second receiving portion 1730A, and/or the indicator portion 1740A may include a coupling with the computing device through a wireless coupling 1701. In an alternative embodiment, the first receiving portion 1720A, the second receiving portion 1730A, and/or the indicator portion 1740A may include an electrical coupling with the computing device through a wired coupling (not shown).

In an alternative embodiment, the exemplary apparatus 1700 may also include a second receiving portion 1730B and an indicator 1740B that are not associatable with the item 800.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

What is claimed is:
1. A system comprising:
a plurality of interfaces configured to operate in a first state, wherein the plurality of interfaces operating in the first state respectively perform a first function; and
an electronic assistance device including a display, the electronic device implemented with instructions that configure the electronic assistance device to:
receive a query related to a first interface of the plurality of interfaces while the plurality of interfaces are operating in the first state based on detecting a first user selection of the first interface, wherein the plurality of interfaces correspond to buttons;

responsive to receipt of the query related to the first interface, transition the plurality of interfaces to a second state, wherein the plurality of interfaces operating in the second state respectively perform a second function that is different from the first function and that is related to the first interface and wherein the display displays the second function corresponding to a subset of the plurality of interfaces operating in the second state;

receive a query related to an assistance request related to the first interface through a second user selection of one of the subset of the plurality of interfaces of the system that is operating in the second state;

wherein the system is configured to receive contextual information associated with the system including at least environmental information extrinsic to the system that is sensed by the system; and wherein the electronic assistance device is further implemented with instructions that configure the electronic assistance device to:

responsive to receipt of the assistance request and receipt of the contextual information associated with the system, determine an assistance correlating operation of the first interface based on the environmental information extrinsic to the system, and provide assistance based on the operation via a user interface.

2. The system of claim 1, wherein the step of determining an assistance correlating operation of the first interface based on the environmental information extrinsic to the system includes:

searching an assistance file via a network.

3. The system of claim 1, wherein the step of providing assistance via a user interface includes:

providing a user interface visually indicating an association with the first interface.

4. The system of claim 1, wherein the step of providing assistance based on the operation via a user interface includes:

providing a user interface visually indicating an association with the first interface.

5. The system of claim 1, further comprising a user interface that is wirelessly couplable with the electronic assistance device.

6. The system of claim 1, further comprising a user interface that is electrically couplable with the electronic assistance device.

7. The system of claim 1, wherein the system is at least a portion of a vehicle, an appliance, a manufacturing apparatus or a processing apparatus.

8. The system of claim 1, wherein the system includes at least one control system.

9. The system of claim 1, wherein the step of determining an assistance correlating operation of the first interface based on the environmental information extrinsic to the system includes:

searching an assistance file of the electronic assistance device.

10. The system of claim 1, wherein the electronic assistance device is further implemented with instructions that configure the electronic assistance device to:

receive one user input responsive to the provided assistance; and provide another assistance correlating to the one user input responsive to the provided assistance.

11. The system of claim 1, wherein the first interface is a shutter button.

12. The system of claim 11, wherein the step of determining an assistance correlating operation of the first interface based on the environmental information extrinsic to the system includes:

determining an assistance correlating operation of shutter speed of the shutter button based on temperature sensed by a temperature sensor in the system.

13. The system of claim 11, wherein the step of determining an assistance correlating operation of the first interface based on the environmental information extrinsic to the system includes:

determining an assistance correlating operation of shutter speed of the shutter button based on light intensity sensed by a light intensity sensor in the system.

14. The system of claim 11, wherein the step of determining an assistance correlating operation of the first interface based on the environmental information extrinsic to the system includes:

determining an assistance correlating operation of shutter speed of the shutter button based on temperature and light intensity sensed by a temperature sensor and a light intensity sensor in the system.

15. A method for providing user assistance for a system using an electronic assistance device, the system having a plurality of interfaces configured to operate in a first state that respectively perform a first function, comprising:

receiving a query related to a first interface of the plurality of interfaces while the plurality of interfaces are operating in the first state based on detecting a first user selection of the first interface, wherein the plurality of interfaces correspond to buttons;

responsive to receipt of the query related to the first interface, transitioning the plurality of interfaces to a second state, wherein the plurality of interfaces operating in the second state respectively perform a second function that is different from the first function and that is related to the first interface;

displaying the second function corresponding to a subset of the plurality of interfaces operating in the second state;

receiving a query related to an assistance request related to the first interface through a second user selection of one of the subset of the plurality of interfaces of the system that is operating in the second state;

receiving contextual information associated with the system including at least environmental information extrinsic to the system that is sensed by the system; and responsive to receipt of the assistance request and receipt of the contextual information associated with the system, determining an assistance correlating operation of the first interface based on the environmental information extrinsic to the system, and provide assistance based on the operation via a user interface.

16. The method of claim 15, wherein the step of determining an assistance correlating operation of the first interface based on the environmental information extrinsic to the system includes:

searching an assistance file via a network.

17. The method of claim 15, wherein the step of providing assistance based on the operation via a user interface includes:

providing a user interface visually indicating an association with the first interface.

18. The method of claim 15, wherein the step of receiving a query related to the first interface while the plurality of interfaces are operating in the first state includes:

detecting a touch to the first interface.

19. The method of claim 15, wherein the step of receiving a query related to the first interface while the plurality of interfaces are operating in the first state includes:
   detecting a sound through the system.

20. The method of claim 19, wherein the step of detecting a sound includes detecting at least one spoken word.

21. The method of claim 15, wherein the step of determining an assistance correlating operation of the first interface based on the environmental information extrinsic to the system includes:
   determining an assistance correlating operation of a camera control of a camera specified by the assistance request based on a background in an image captured by the camera.

22. The method of claim 15, wherein the step of determining an assistance correlating operation of the first interface based on the environmental information extrinsic to the system includes:
   determining an assistance correlating operation of protection of a camera lens of a camera specified by the assistance request based on a temperature sensed by a temperature sensor in the camera.

23. The method of claim 15, wherein the step of receiving a query related to an assistance request related to the first interface through a second user selection of one of the subset of the plurality of interfaces of the system that is operating in the second state includes:
   receiving a selection corresponding to a predetermined assistance request related to the system.

24. The method of claim 15, wherein the step of determining an assistance correlating operation of the first interface based on the environmental information extrinsic to the system includes:
   searching an assistance file for the assistance correlating to the assistance request.

25. The method of claim 24, wherein the step of searching an assistance file includes searching an assistance file stored remotely via at least one network.

26. The method of claim 15, wherein the method is configured to provide user assistance for a system that is at least a portion of a vehicle, an appliance, a manufacturing apparatus or a processing apparatus.

27. The method of claim 15, further comprising receiving an input responsive to the provided assistance.

28. The method of claim 27, wherein the step of receiving an input responsive to the provided assistance includes a request for an additional assistance correlating to the provided assistance.

29. The method of claim 28, further comprising providing another assistance correlating to the input responsive to the provided assistance.

30. The method of claim 15, further comprising activating a help mode of the electronic assistance device.

31. The method of claim 15, wherein the step of providing assistance based on the operation via a user interface includes:
   providing a guided response assistance related to the first interface, an interactive tutorial assistance related to the first interface, an assistance correlating with a physical element of the system, a guidance correlating with a process associated with the first interface, showing how the first interface operates, or a description of the first interface.

32. The system of claim 1, wherein the step of providing assistance based on the operation via a user interface includes:
   providing a guided response assistance related to the first interface, an interactive tutorial assistance related to the first interface, an assistance correlating with a physical element of the system, a guidance correlating with a process associated with the first interface, showing how the first interface operates, or a description of the first interface.

33. The method of claim 15, wherein the step of receiving a query related to a first interface of the plurality of interfaces while the plurality of interfaces are operating in the first state includes:
   receiving a query related to a shutter button of the plurality of interfaces while the plurality of interfaces are operating in the first state.

34. The method of claim 33, wherein the step of deter lining an assistance correlating operation of the first interface based on the environmental information extrinsic to the system includes:
   determining an assistance correlating operation of shutter speed of the shutter button based on temperature sensed by a temperature sensor in the system.

35. The method of claim 33, wherein the step of determining an assistance correlating operation of the first interface based on the environmental information extrinsic to the system includes:
   determining an assistance correlating operation of shutter speed of the shutter button based on temperature and light intensity sensed by a temperature sensor and a light intensity sensor in the system.

36. The method of claim 33, wherein the step of determining an assistance correlating operation of the first interface based on the environmental information extrinsic to the system includes:
   determining an assistance correlating operation of shutter speed of the shutter button based on light intensity sensed by a light intensity sensor in the system.

* * * * *